US00RE39090E

(19) United States
(12) Reissued Patent
Beauregard et al.

(10) Patent Number: US RE39,090 E
(45) Date of Reissued Patent: May 2, 2006

(54) SEMANTIC USER INTERFACE

(75) Inventors: Serge Pierre Beauregard, Winter Park, FL (US); Jesus Roberto Armijo-Tamez, Santa Teresa, NM (US)

(73) Assignee: ActiveWord Systems, Inc., Winter Park, FL (US)

(21) Appl. No.: 09/983,981

(22) Filed: Oct. 26, 2001

Related U.S. Patent Documents

Reissue of:
(64) Patent No.: 5,974,413
Issued: Oct. 26, 1999
Appl. No.: 08/886,011
Filed: Jul. 3, 1997

(51) Int. Cl.
*G06F 17/30* (2006.01)

(52) U.S. Cl. ..... 707/6; 707/2; 707/3; 707/10; 707/101; 707/1; 345/781

(58) Field of Classification Search ..... 707/1, 707/2, 3–6, 100, 101, 103 R, 104.1, 202, 707/10; 704/251, 252, 270, 271, 9, 10; 379/88.22; 345/781
See application file for complete search history.

(56) References Cited

U.S. PATENT DOCUMENTS 4,689,737 A 8/1987 Grant ..... 345/781
4,724,521 A 2/1988 Carron et al. ..... 717/11

(Continued)

FOREIGN PATENT DOCUMENTS

WO WO 99/01831 1/1999

OTHER PUBLICATIONS

"Perfect Keyboard", Version 2.01, from http://softwareutilities.com/pkindex.htm and http://softwareutilities.com/pk_history.htm, date unknown.*

"Netword," URL:http://www.netword.com, Copyright 1998 Netword LLC, and www.netword.com/whyuse.html.*

"Microsystems HandiWORD", URL:http://www.microsys.com/handiw/hw_word.htm, pp. 1–3, undated.*

(Continued)

*Primary Examiner*—Shahid Alam
(74) *Attorney, Agent, or Firm*—Sterne, Kessler, Goldstein & Fox PLLC

(57) ABSTRACT

A system and method that allows a user to use their everyday language or user defined words to operate the computer in a highly efficient way. In short, every word, letter, control character and symbols is potentially actionable. A computer user's productivity is dramatically increased by making available those functions that enable a user to produce most of his work through simple, language-based commands. The present invention provides an intuitive interface, referred to as a semantic user interface (SUI), that enhances the operation of the current standard window-based interface in a manner that is simple, richer and natural. By leveraging all of the richness and power inherent in a user's language, the present invention provides an important tool that allows the personal computer to operate in a manner that is much closer to our natural way of interacting. A user is allowed to enter "commands" in his everyday natural language in order to control the operations of the computer. All commands are language-based and user-defined. These commands can be entered from any context of the user's computer (e.g., any application or operating system workspace). The commands allows a user to launch applications and navigate within applications by using language rather than clicks from a pointing device such as a mouse. It also allows the replacement of keystrokes with stored words or keystrokes. The system keeps a complete archive record of all the text content the user provides as input, regardless of which application program or operating system window the user is operating in at the time. The combined set of all user defined commands and the memory of all the input text that is stored in the archive constitutes the personality profile and is transportable from one computer to another.

100 Claims, 30 Drawing Sheets

U.S. PATENT DOCUMENTS

| | | | | | |
|---|---|---|---|---|---|
| 4,907,283 | A | * | 3/1990 | Tanaka et al. | 382/176 |
| 4,955,066 | A | * | 9/1990 | Notenboom | 358/1.9 |
| 4,974,191 | A | * | 11/1990 | Amirghodsi et al. | 345/700 |
| 5,252,951 | A | | 10/1993 | Tannenbaum et al. | 345/156 |
| 5,287,514 | A | | 2/1994 | Gram | 395/700 |
| 5,418,717 | A | * | 5/1995 | Su et al. | 704/9 |
| 5,421,012 | A | | 5/1995 | Khoyi et al. | 709/107 |
| 5,434,963 | A | | 7/1995 | Kuwamoto et al. | 345/708 |
| 5,530,861 | A | * | 6/1996 | Diamant et al. | 705/8 |
| 5,544,352 | A | * | 8/1996 | Egger | 707/5 |
| 5,551,020 | A | * | 8/1996 | Flax et al. | 707/101 |
| 5,555,288 | A | | 9/1996 | Wilson et al. | 379/88.01 |
| 5,598,557 | A | * | 1/1997 | Doner et al. | 345/835 |
| 5,623,406 | A | * | 4/1997 | Ichbiah | 704/3 |
| 5,704,060 | A | * | 12/1997 | Del Monte | 704/7 |
| 5,724,594 | A | * | 3/1998 | Pentheroudakis | 704/10 |
| 5,729,730 | A | * | 3/1998 | Wlaschin et al. | 707/1 |
| 5,754,712 | A | * | 5/1998 | Tanaka et al. | 345/163 |
| 5,760,768 | A | | 6/1998 | Gram | 345/333 |
| 5,764,906 | A | * | 6/1998 | Edelstein et al. | 709/203 |
| 5,768,578 | A | * | 6/1998 | Kirk et al. | 707/100 |
| 5,899,996 | A | | 5/1999 | Dysart et al. | 707/103 |
| 5,900,004 | A | | 5/1999 | Gipson | 707/530 |
| 5,915,001 | A | * | 6/1999 | Uppaluru | 379/88.22 |
| 5,974,413 | A | | 10/1999 | Beauregard et al. | 707/6 |
| 5,987,446 | A | * | 11/1999 | Corey et al. | 707/3 |
| 6,026,388 | A | | 2/2000 | Liddy et al. | 707/1 |
| 6,077,077 | A | | 6/2000 | Geipe | 434/30 |

OTHER PUBLICATIONS

"Unisyn Macro Magic", URL:http://ww.unisyn.com/macromagic/. pp. 1□2, Copyright 1997, and www.unisyn.com/macromagic/pics/wizard.gif, and www.unisyn.com/macromagic/pics/main.gif. and mvw.unisyn.com/macromagic/pics/properties.gif.*

"Instant Text—Textware Solutions", URL:http://www.twsolutions.com, Copyright 1997 Textware Solutions, (Last modified Oct. 27, 1997), and www.twsolutions.com/new/version2.htm, and www.twsolutions.com/product/products.htm, and www.twsolutions.com/overview/overview.htm, and www.twsolutions.com/overview/wordabbv.htm, and www.twsolutions.com/overview/phrsabbv.htm, and www.twsolutions.com/overview/markers.htm, and www.twsolutions.com/overview/custmglo.htm, and www.twsolutions.com/overview/glocomp.htm, and www.twsolutions.com/overview/actiglo.htm, and www.twsolutions.com/overview/advisory.htm, and www.twsolutions.com/overview/continue.htm, and www.twsolutions.com/overview/workit.htm, and www.twsolutions.com/overview/stalone.htm, and www.twsolutions.com/overview/wordpro.htm.*

Ettore, R., "TypeIt4Me: *The tool to speed up your typing*", User Manual for Version 4.7.0, pp. 1–15, Mar. 22, 1997.*

"Lifestreams Project Home Page", URL:http://www.cs.yale.edu/homes/freeman/lifestreams.html, pp. 1–3, Copyright 1996 Eric T. Freeman and Yale University.*

"Why Take The Long Way When You Can Take A Shortcut!", (advertisement describing Tempo Shortcutter software), and Brief description of Version 1.5.*

"Shortkeys Home Page", URL:http://www.smartcode.com/isshtml/shortk.htm, p. 1, date unknown.*

"Insight Software Solutions, Inc.—ShortKeys Software", URL:http://www.smartcode.com/isshtml/shortk2.htm, pp. 1–2, undated.*

"ShortKeys v1.0 Press Release", URL:http://www.smartcode.com/isshtml/shtpress.htm, pp. 1–2, Sep. 12, 1996.*

Stearns , T., "The utility Windows is missing", *LANTIMES*, Jul. 21, 1997.*

*SpellCatcher™ User Manual*, Copyright 1996, Casady & Greene, Inc.*

"Product Information for LaunchBoard V2.0 for Windows", from http://software–depot.netscape.com/PKSN020479/prod.htm, pp. 1–3, date unknown.*

"Product Information for 3–D KEYBOARD V2.5", from http://software–depot.netscape.com/PKSN020076/prod.htm, pp. 1–4, date unknown.*

"Product Information for Shortcuts v1.1 for Win 95", from http://software–depot.netscape.com/PKSN100239/prod.htm, pp. 1–3, date unknown.*

Microsoft MS–Dos, Operating System version 5.0, User's Guide and Reference, Microsoft Corporation, Redmond, Washington. QA 76.76.063 M52 1991 c.2.*

Microsoft MS–DOS Operating System, Version 5.0, "User's Guide and Reference", Microsoft Corporation, Redmond, Washington. QA 76.76.O63 M52 1991 c.2.*

*AIM Keys, The All–in–One Macro Utility* (Copyright 1996–1999) http://www.aimsoft.com/aimkeys/index.htm, 2 pages.

*ActiveWords—the Semantic User Interface for Windows 95 and NT*, Copyright 1997, 1998, ActiveWord Systems, Inc., 2 pages.

*ActiveWords™: The Semantic User Interface™*, 1998, ActiveWord Systems, Inc., 4 pages.

Cowart, Robert, *Mastering Windows 3.1 Special Edition,* 1993 Sybex Inc. 2021 Challenger Drive, Alameda, CA 94501.

*How can you use AIM keys to save time?* (Copyright 1996–1999) http://www.aimsoft.com/aimkeys/akyshow.htm, 2 pages.

"*Index", "Company Background", "The Technology Behind Autonomy Agentware", "Autonomy Agentware Technology Whitepaper*" and *"ActiveKnowledge*", all printed from http://www.autonomy.com/ and hyperlinks, 20 pages.

Pike, Rob, "*Acme: A User Interface for Programmers*," URL: http://www.cs.bell–labs.com/sys/doc/acme/acme.html, Copyright 2000 Lucent Technologies Inc., 16 pgs.

"*TextWise: Information Access and Analytic Software and Services*," URL:http"//www.textwise.com Copyright 1999–2000, 1 pg., and www.textwise.com/knowit.html, 1 pg., www.textwise.com/news.html. 1 pg. and www.textwise.com/cindor.html, 3 pgs.

*Welcome!, Project: DR–LINK, "Project Cindor", "Eva", "Know–It"* and "Chess", all printed from http://www.textwise.com/ and hyperlinks, 9 pages, Copyright 1997.

*What is AIM Keys*? (Copyright 1996–1999) <http://www.aimsoft.com/aimkeys/akyswhat.htm>, 2 pages.

"Netword," URL:http://www.netword.com. Copyright 1998 Netword LLC, and www.netword.com/whyuse.html.

"Unisyn Macro Magic", URL:http://www.unisyn.com/macromagic/. pp. 1–2, Copyright 1997, and www.unisyn.com/macromagic/pics/wizard.gif, and www.unisyn.com/macromagic/pics/main.gif. and www.unisyn.com/macromagic/pics/properties.gif.

Rue, T.V., *Knowledge Navigational Mapping and Exploration/Expression Tools and The Knowledge Calculator*, 29 pages (1994).

Rue, T.V., *First VIC Command—AI*, 8 pages (1994).

Rue, T.V., *PK Command*, 9 pages (1994).

Rue, T.V., *OI command*, 2 pages (1994).
Rue, T.V., *IP Command*, 2 pages (1994).
Rue, T.V., *OP command*, 2 pages (1994).
Rue, T.V., *SF Command*, 2 pages (1994).
Rue, T.V., *IQ Command*, 5 pages (1994).
Rue, T.V., *ID Command*, 3 pages (1994).
Rue, T.V., *KE command*, 3 pages (1994).
Rue, T.V., *Virtual Interaction Configuration Objective*, 13 pages (1988).
Rue, T.V., *Project: Virtual Interaction Configuration*, 7 pages (1975).
ActiveWords™ The Semantic User Interface™: Run the World's Most Powerful Software: English! ActiveWord Systems, Inc, Copyright 1997, 1998, 2 pages.
ActiveWords™: The Semantic User Interface™, http://www.ActiveWords.com, date and publisher unknown, 4 pages.
Ettore Riccardo, "TypeIt4Me: The Tool to Speed Up Your Typing," Version 4.7.0 User Manual, Copyright 1989–1997, R. Ettore, pp. 1–15.
Autonomy, "Company," http://www.autonomy.com/company/index.html, last visited Apr. 26, 1999, 2 pages.
Autonomy, "Company Background," http://autonomy.com/company/background.htm, last visited Apr. 26, 1999, 5 pages.
Autonomy, "Technology: The Technology Behind Autonomy Agentware™," http://www.autonomy.com/tech/index.html, last visited Apr. 26, 1999, 2 pages.
Autonomy, "Technology: Autonomy Agentware™ Technology Whitepaper," http://www.autonomy.com/tech/wp.html, last visited Apr. 26, 1999, 8 pages.
Autonomy, "Active Knowledge," http://www.autonomy.com/activeknowledge.html, last visited Apr. 26, 1999, 3 pages.
Press Release, "Insight Software Solutions, Inc. ShortKeys Software for Windows 3.1, 95 or NT," date unknown, 2 pages.
Press Release, "Text Replacement Made Easy with New ShortKeys Macro Utility," Insight Software Solutions, Inc., Sep. 12, 1996, 2 pages.
"Lifestreams™ Organizing Your Electronic Life," http://www.cs.yale.edu/homes/freeman/lifestreams.html, Copyright 1994–1996, Eric T. Freeman and Yale University, 3 pages.
Microsoft® MS–DOS, Operating System Version 5.0, User's guide and Reference, Microsoft® Corporation, date unknown.
"HandiWORD and HandiWORD International: Word Prediction for Windows and DOS," http://www.microsys.com/handiw/hw_word.htm, 3 pages.
Network®, "Networds Are the Fastest, Easiest Way to Get Around the Internet: URLs are for Computers. Networds are for People." Network LLC, 1998, http://www.network.com/, 1 page.
Network®, "Why Use Networds?: URLs are for Computers. Networds are for People." Network LLC, 1998, http://www.network.com/whyuse.html, 2 pages.
"Perfect Keyboard Main Page," Pitrinec Software, 1998, http://www.softwareutilities.com/pkindex.htm, last visited Jul. 8, 1998, 2 pages.
"Perfect Keyboard History," Pitrinec Software, 1998, http://www.softwareutilities.com/pk_history.htm, last visited Jul. 13, 1998, 2 pages.
Fingertip Software, "3–D Keyboard 2.5," software.net, 1998, http://www.software–depot.netscape.com/PKSN020076/prod.htm, last visited Jun. 22, 1998, 4 pages.
LaunchBoard V2.0 for Windows, "The Quickest, Easiest Way to Launch Applications and Web Sites!" software.net, 1998, http://www.software–depot.netscape.com/PKSN020479/prod.htm, last visited Jun. 22, 1998, 3 pages.
ShortCuts v1.1 for Win 95, "Personalize Your Function Keys," software.net, 1998, http://www.software–depot.netscape.com/PKSN100239/prod.htm, last visited Jun. 22, 1998, 3 pages.
ShortKeys, "The Ultimate Text Replacement Utility for Windows 3.1, 95, NT," http://www.smartcode.com/isshtml/shortk.htm, date unknown, 1 page.
SpellCatcher™ User Manual, Copyright 1996, Casady & Greene, Inc.
Stearns Tom, "The Utility Windows Is Missing," LANTIMES, Jul. 21, 1997.
Unisyn Macro Magic, "Blast Through the Net! And All other Repetive Tasks . . . " Unisyn Software, LLC, 1997, http://www.unisyn.com/macromagic/, date unknown, 2 pages.
Unisyn, "Macro Setup Wizard," http://www.unisyn.com/macromagic/pics/wizard.gif, date unknown, 1 page.
Unisyn, "Macro Magic," http://www.unisyn.com/macromagic/pics/main.gif, date unknown, 1 page.
Unisyn, "Macro Properties," http://www.unisyn.com/macromagic/pics/properties.gif, date unknown, 1 page.
TextWise™, "Welcome!" TextWise, LLC, Copyright 1997, http://www.textwise.com/index.html, last visited Jun. 7, 1999, 1 page.
TextWise™, "Project: DR–LINK," TextWise, LLC, Copyright 1997, http://www.textwise.com/drlink.html, last visited Jun. 7, 1999, 1 page.
TextWise™, "Project: CINDOR," TextWise, LLC, Copyright 1997, http://www.textwise.com/cindor.html, last visited Jun. 7, 1999, 1 page.
TextWise™, "EVA: Evolving Intelligent Text–Based Agents for Geospatial Information," TextWise, LLC, Copyright 1998, http://www.textwise.com/eva.html, last visited Jun. 7, 1999, 2 pages.
TextWise™, "KNOW–IT: KNOWledge Base Information Tools," TextWise, LLC, Copyright 1998, http://www.textwise.com/abs.html, last visited Jun. 7, 1999, 2 pages.
TextWise™, "CHESS: Chronological Information Extraction System," TextWise, LLC Copyright 1998, http://www.textwise.com/chess.html, last visited Jun. 7, 1999, 2 pages.
"Why Take The Long Way When You Can Take A Shortcut: Tempo Shortcutter Macros Simplify Your Work," publisher and date unknown, 1 page.
"About Tempo Shortcutter Version 1.5," publisher and date unknown, 2 pages.
AIM Keys The All–in–One Macro Utility, "New Electronic Version 2.0," Aimsoft Development Corporation, Copyright 1996–1999, http://www.aimsoft.com/aimkeys/index.htm, date unknown, 2 pages.
"What is AIM Keys?" Aimsoft Development Corporation, Copyright 1998, 1999, http://www.aimsoft.com/aimkeys/akyswhat.htm, 2 pages.
"How Can You Use AIM Keys to Save Time?" Aimsoft Development Corporation, Copyright 1998, 1999, http://www.aimsoft.com/aimkeys/akyshow.htm, 2 pages.

TextWare™ Solutions, "InstantText™ Makes a Few Letters Worth a Thousand Words," Textware Solutions, Copyright 1997, last modified Oct. 27, 1997, http://www.twsolutions.com/, 1 page.
Instant Text Version 2.0 Now Available, "Instant Text 2.0 for Windows 95 and NT 4: Textware Solutions Just Released Instant Text 2.0," Textware Solutions, Copyright 1997, http://www.twsolutions.com/new/version2.htm, date unknown, 3 pages.
Textware Solutions Product List, Textware Solutions, Copyright 1997, http://www.twsolutions.com/product/products.htm, date unknown, 2 pages.
Instant Text–Overview, "Instant Text—The Fastest Way from Thought to Type!" http://www.twsolutions.com/overview/overview.htm, publisher and date unknown, 1 page.
Word Abbreviations, Textware Solutions, Copyright 1996, http://www.twsolutions.com/overview/wordabbv.htm, date unknown, 2 pages.
Phrase Abbreviations, Textware Solutions, Copyright 1997, http://www.twsolutions.com/overview/phrsabbv.htm, date unknown, 1 page.
Markers, Textware Solutions, Copyright 1997, http://www.twsolutions.com/overview/markers.htm, date unknown, 1 page.
Custom Glossaries, Textware Solutions, Copyright 1997, http://www.twsolutions.com/overview/custmglo.htm, date unknown, 1 page.
Glossary Compilation, Textware Solutions, Copyright 1997, http://www.twsolutions.com/overview/glocomp.htm, date unknown, 1 page.
Active Glossaries, Textware Solutions, Copyright 1997, http://www.twsolutions.com/overview/actiglo.htm, date unknown, 1 page.
Advisories, Textware Solutions, Copyright 1997, http://www.twsolutions.com/overview/advisory.htm, date unknown, 3 pages.
Continuations, Textware Solutions, Copyright 1997, http://www.twsolutions.com/overview/continue.htm, date unknown, 2 pages.
Working With Instant Text, "Start With Glossary Compilation," Textware Solutions, Copyright 1997, http://www.twsolutions.com/overview/workit.htm, date unknown, 1 page.
Instant Text Can Be Used as a Stand–Alone Editor, Textware Solutions, Copyright 1997, http://www.twsolutions.com/overview/stalone.htm, date unknown, 1 page.
Instant Text Can Be Used With A Word Processor, Textware Solutions, Copyright 1997, http://www.twsolutions.com/overview/wordpro.htm, date unknown, 2 pages.
Cowart, Robert, Mastering Windows 3.1 Special Edition, 1993 Sybex Inc. 2021 Challenger Drive, Alameda, CA 94501.
"TextWise: Information Access and Analytic Software and Services," URL: http://www.textwise.com, Copyright 1999–2000, 1 pg., and www.textwise.com/know–it.htm), 1 pg., www.textwise.com/news.html, 1 pg., and www.textwise.com/cindor.html, 3pgs.
"As–U–Type—Correct Spelling Errors and Increase Typing Productivity as You Tpe," URL: http://www.fanix.com/asutype/index.htm, Copyright 1999–2000, 2 pgs.
Rob Pike, "Acme: A User Interface for Programmers," URL: http://www.cs.bell–labs.com/sys/doc/acme/acme.html, Copyright 2000 Lucent Technologies Inc., 16 pgs.

* cited by examiner

TABLE: [A WORD]

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| C | CW | D | DW | COMMENT | ACTION | CATEGORY | EDITING STYLE | ACTION TYPE | EXTRA | CWCount | DWCount | Xid | MODIFIED | ACCESSED |
| B | TXT 80 | B | TXT 80 | TXT 255 | TXT 255 | TXT 110 | TXT 50 | TXT 80 | MEMO 64 k | LONG | LONG | LONG | TIME/ DATE | TIME/ DATE |

| 16 | 17 |
|---|---|
| SIGNATURE | FLAGS |
| TXT 255 | LONG |

FIG. 21

PROFILES

CURRENT PROFILE: MY PROFILE

APPLICATIONS | FOLDERS

| PRIORITY | DRAWERS | FOLDERS | ON | OFF |
|---|---|---|---|---|
| * | HOBBY | ASTRONOMY | ● | ○ |
| 1 | PLACES | CITIES | ○ | ● |
| 1 | PLACES | STATES | ○ | ● |
| 1 | PLACES | COUNTRIES | ○ | ● |
| * | PLACES | INSTITUTIONS | ● | ○ |
| 3 | SPANISH | DICTIONARY | ○ | ● |
| * | SPB CONTROLS | WORD | ● | ○ |
| 2 | SPB CONTROLS | EXCEL | ○ | ● |
| * | SPB CONTROLS | EUDORA PRO | ● | ○ |
| 3 | SPB CONTROLS | INTERNET | ○ | ● |
| 3 | SPB CONTROLS | WINDOWS | ○ | ● |
| 1 | STANDARD ENGLISH | CONTRACTIONS | ○ | ● |
| 1 | STANDARD ENGLISH | CAPITALIZATIONS | ○ | ● |
| 1 | STANDARD ENGLISH | EXPANSIONS | ○ | ● |
| * | WORK | METALURGY | ● | ○ |

SET PRIORITY | OK | CANCEL | APPLY

FIG. 29

MULTI-ITEM RESOLUTION

CALL

| COMMENT | ACTION | LOCATION | CODE | DUAL |
|---|---|---|---|---|
| ○ PETE J. WELDON | DIAL | HOME | PWDH | PETEH |
| ● PETE J. WELDON | DIAL | OFFICE | PWDO | PETEO |
| ○ ROBERTO ARMIJO | DIAL | OFFICE | RADH | ROBERTOO |
| ○ THE VACA TEAM | DIAL | OFFICE | VTDO | VACAO |
| ○ BURTON L. BRUGGERMAN | DIAL | OFFICE | BZD | BUZZO |
| ○ ROB SOKOHL | DIAL | OFFICE | RSD | ROBO |
| ○ JOHN MILLER | DIAL | HOME | JMD | JOHNMH |

○ OK ● CANCEL

FIG. 31A

MULTI-ITEM RESOLUTION

JOHN MILLER

| COMMENT | ACTION | LOCATION | CODE | DUAL |
|---|---|---|---|---|
| ● HUMAN RESOURCE | OPEN | DATABASE | JMHR | |
| ○ JOHN MILLER | DIAL | HOME | JMDH | |
| ○ JOHN MILLER | DIAL | OFFICE | JMDO | |
| ○ JOHN MILLER | DIAL | EXTENSION | JMDE | |
| ○ JOHN MILLER | DIAL | CELLULAR | JMDC | |
| ○ JOHN MILLER | DIAL | FAX | JMDF | |
| ○ JOHN MILLER'S PHOTO/BIO | OPEN | PHOTO/BIO | JMPB | |
| ○ JOHN MILLER'S ADDRESS | GO | ADDRESS | JMAD | |
| ○ JOHN MILLER IN YAHOO | FIND | INTERNET | JMYH | |
| ○ JOHN MILLER IN BIG BOOK | FIND | INTERNET | JMBB | |

○ OK ● CANCEL

FIG. 31B

SEMANTIC USER INTERFACE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates generally to a semantic interface for a computer system, and more particularly, to a system and method of providing a semantic interface that allows a user to access via a set of user defined words a plurality of services, including command, navigation and substitution, within all contexts of his/her computer system.

2. Related Art

Computers have revolutionized the way individuals in all aspects of life perform tasks. A user interface provides a mechanism for individuals to access all the features and functionalities of their computer. Without a user friendly interface, these features and functions are typically inaccessible to the computer operator. The prevalent user interface in the industry todays uses windows, icons, menus and pointing devices. The text stream entered by the user, however, has been essentially ignored.

This window-based user interface (also referred to as a graphical user interface or GUI) was first conceived by Xerox, commercialized by Apple Computers (e.g., the Macintosh), and brought to the mainstream by Microsoft Corporation (e.g., Windows 95). The GUI is powerful for organizing the capabilities and resources available in a computer. It enables the user to incrementally explore and discover his computer's capabilities and controls. It keeps everything in a conventional visual context, using helpful metaphors, like desktops and windows.

The GUI provides a menu hierarchy which is accessible via a pointing device or mouse. One of the cornerstones of this interface is the ability for the user to interact directly with objects and elements. This can be a great advantage in some cases, but it can result in making simple tasks that are often repeated into tedious choirs of navigation through a maze of GUI windows. To provide the ability to directly manipulate the elements or objects, you must enable the user to work at an "atomic" level, losing the ability to group a related series of basic actions into one high level action or use of conditionals.

Under this paradigm, we can no longer access or work with objects that are not visible or unknown to us. This situation is not unlike going to eat in another country where we do not known the language. We are thus forced to go to the kitchen and point to whatever food we want. It is clear that we do not want to go to the kitchen in order to eat; we would rather express ourselves using all the richness that our natural language allows. In order to accomplish this goal, the computer has to respond to human language and not the other way around. In reality, we want to be able to go to our favorite restaurant and say "give me my usual order" and receive exactly what we ordered. This is personal attention and awareness of your eating profile. This is, in essence, what we want from our personal computer.

Advocates of the window-based user interface firmly believe that the user should always be in control. The window-based user interface provides permanent feedback to the user by providing windows with means. The down side of this is that the user must always be in control even if he does not want to be or he cannot be because of the complexity of the task. Window 95, for example, has started a trend in allowing the user to delegate his control to an agent, through a concept of smart and thoughtful "agents." Such tasks like un-installing software, are, for example, automatically performed by Windows 95.

There are many tasks that a user must repeat again and again when using a GUI, such as opening certain files and activating certain controls. For such tasks, the GUI presents the user with a single logic set, implemented within the limited screen real estate of his computer monitor. Also, the GUI recognizes none of the user's words. Even the simplest functions requires the user to change mode from the keyboard to hand/eye mouse control. To use the GUI, he must lift his hand from the keyboard to the user. He must also lift his eyes to the screen to locate the desired graphical element, and then manipulate the mouse while visually monitoring the result. This is like having to look at someone every time you want to say a word to that person.

Computer systems must provide users with a mechanism to undo a previous action when a mistake has been made. These same systems must also provide a strong warning if an intended action will be irreversible. This is not a great concern when you are a novice user, but when you become a more experienced user, this feature will turn against you and unnecessarily increase your workout. Take for instance the simple task of copying a file to a floppy that does not have enough free space. The Macintosh window-based interface provides a warning that you must throw away X Kb in order to make space. The user, in an attempt to make space, discards X Kb of data from the floppy and places it in the trash. The user once again attempts to copy the file onto the floppy, only to be told that there is not enough room, but would you like to throw out the trash. This is what you wanted from the start! What was a good feature quickly becomes a nuisance.

The problem stems from the inability of the computer to fully understand even our simplest intentions; it lacks our personality profile. In order to overcome this problem, the computer needs to build a deeper model of each user's intentions and history in order to better serve the user's needs and to eliminate unnecessarily repetitive activities. The core requirement here is to provide mechanisms to ascertain how users work and to track their activities in an unobtrusive way.

Current wisdom states that the more static and unchanging our environments, the simpler and better it is for us. As we grow in knowledge and understanding of what the computer can do for us, we are willing to accept changes and learn to cope with them in our quest to increase our personal productivity. Unfortunately, current computer user interfaces have limited abilities to allow a user to express themselves. If computers could communicate with a richer language, it would not be so important that everything have a uniform look and feel.

The computer interface should allow the user to perform any task at any time, irrespective of the application that are currently running. In other words, if a user is working on a word processor and needs to make some calculations, he should not be required to leave his work and open another application via a menu driven user interface to complete the necessary arithmetic operations.

Every computer user has a unique pattern of use. Typically, 80% of a user's work product is accomplished through repeated use of only 20% of his software's available features. This is commonly referred to as Pareto's Rule, and the 20% of the tasks are often referred to as the "vital few." The 80% of available software features and functions that are not needed or used by any particular user must still be available to all other users through the GUI system of menus and windows. Every user's "80/20" profile is unique. Nevertheless, it is the need to organize 100% of the available functionality that necessitates the depth, nesting and complexity of current GUI system. As a result, the GUI is an inefficient fit, to a greater or lesser degree, for every individual user.

Over the years, a number of approaches have been invented to tackle this problem of inefficient fit. Because of their inherent limitations, none have been successful enough to reach the mainstream user. Software entrepreneurs have developed "shortcut" utilities of various designs. While not specifically marketed as such, the intention of these utilizes is to address each user's "80/20" pattern of often repeated tasks. These "shortcut" utilities take two forms: macros triggered by key combinations and icon palette macros.

Macros triggered by key combinations typically take one or both of two forms, macro utilities and text replacement utilities. Macro utility programs provide shortcuts to functions and processes such as opening applications and files, making menu selections, and performing multi-step operations. Macro utilities, such as Tempo, MacroMagic, and Keyboard Express for the "WinTel" platform and QuicKeys for the Macintosh are all activated by the user via keystroke combinations. Microsoft's Windows interface offers many key combination shortcuts macros to operate various controls, menus and etc. To activate these macros, the user must press at least one "control" key (e.g., <alt>), combined with pressing a single "non-control" character (e.g., <x>). Users find it very difficult to develop a mnemonically consistent scheme for remembering such key combinations, for two reasons. First, the combinations are mnemonically so arbitrary that it is difficult to use mnemonic logic to memorize the cryptic key combinations. Also, many key combinations only work a given way in specific application programs, further restricting the combinations that are available. The user's limited ability to remember and reflexively recall more than a few cryptic key combinations severely limit's the usability of macro utilities. Many people are so intimidated by the cryptic nature of macros they refuse to even consider their use.

Text substitution utilities provide the ability to replace a short string of types text with long and/or formatted text. For example, a user may define the code word "evp" to trigger the substitution to "Executive Vice President", or define a short code word like "and" to be replaced by a series of pre-defined text lines (name and address in this case). There are several utility software products available to do that within single applications. Text replacement utilities for single applications are, for example, included with Word 7.0 for Windows95. Other examples include ShortKeys for Windows and both SpellCatcher and TypeIt4Me on the Macintosh platform. Recognition of the user's words by these utilities is limited to the purpose of replacing one text string with another. These utilities are writer's aids only. They do not enable the user to also use words for controlling computer processes and functions.

Icon palette utilities are used to give macros a visual presence and context. The macros are activated via mouse clicks. The Icon pallets are an attempt to use a visual interface to overcome the cryptic and therefore hard-to-remember keystroke interface for macro utilities. Often, macro utility products offer icon palletes as a second, alternative interface for accessing the macros. In this approach, a computer macro (process or function) is assigned to a graphical icon, which is presented on an icon bar on the user's screen. Examples of such utilities are included in Norton Navigator for Window95 and in both QuickKeys and OneClick on the Macintosh platform.

By definition, these Icon pallet utilities are an extension of the GUI. Screen size, display resolution, and the user's preference in allocating scarce screen real estate limit the number of icons it makes sense for the user to display on his screen. Given that the users "vital few" can involve scores or hundreds of items, the Icon approach is severely limited by the visual real estate available and the amount of visual complexity the user can tolerate. Moreover, the user must memorize the relationship between the graphic depiction of each icon and the function or process each executes. As the users icon pallet population increases, the distinctiveness of each icon is reduced.

The existing shortcut utilities do not offer the user an integrated approach to creating, managing and using shortcuts for content services, retrieval services and command. Their interfaces are inconsistent and far too difficult to organize and remember. Because the user must assemble his shortcuts using a collection of different software products. he loses a lot of his gains in dealing with cumbersome and time-consuming management of his shortcuts.

It is clear from the above, that the current trend to rely solely on window-based user interfaces has seriously constrained a user's ability to fully utilize their computer. Although the window-based user interface has revolutionized the computer system, and has allowed millions of people to use computers, we have replaced a point where a user's ability to fully appreciate and utilize all of the features and functionalities of their computer system has done compromised. Thus, what is needed is a system and method that provides a user with an efficient, convenient and natural way to utilize his everyday language to work with applications, files, control commands, and the like, that form his/her "vital few."

SUMMARY OF THE INVENTION

The present invention allows a user to use their everyday language competency or user defined code words to operate a computer in a highly efficient way. In short, every word, letter, control character and symbol is actionable. The present invention is based on Pareto's law, which applies to how people work. Pareto's law states that people use 20% of all available tools and functionality to accomplish 80% of their tasks. Similarly, 80% of people's work is accomplished by repeating 20%, or the vital few, or their tasks. By focusing on those activities that enable us to produce most of our work and making them available through simple, natural language-based commands, the present invention enhances a computer user's productivity dramatically. The present invention provides a more intuitive interface that enhances the operation of the current standard graphical user interface (GUI) in a manner that is simple, richer and natural. By leveraging all of the richness and power inherent in our language, the present invention provides an important tool that allows the personal computer to operate in a manner that is much closer to out natural way of interacting; that is, the way people interact with each other.

The present invention provides a language awareness paradigm, which was born out of a very practical need: to do more with current resources. The basic principles of the language awareness paradigm can be stated very simply:

all commands are natural language-based and/or user-defined.

the basic set of commands are designed to allow users to gain access to their vital few (e.g., applications, documents, controls and functions), which defines such user's "sweet spot" of activity, using a least effort path.

all operations and functionality are unobtrusive.

all user's input is recorded in a context rich format for future reference.

the combined set of all user word preferences, defined commands, and the order in which the commands are stored in memory constitutes a personality profile and are transportable from one computer to another.

Based on the above principles, the present invention provides a user environment, referred to as a semantic user interface (SUI), that compliments the GUI. Via the SUI, the user is enabled to enter action words and interact with the system to control the operations of the computers. The SUI is always monitoring the user's input text stream in the background.

The SUI thus makes the computer responsive, on a system-wide basis, to the user's every word. Accordingly, the SUI allows a user to enter action words from any context (i.e., any application or operating system workspace). Action words are a new category or words introduced by the present invention. Action words are thus words that users place into the text stream as requests for specific services from the present invention. There are two types of action words: code words and dual words. Code words are action words the user makes up or which are not part of his natural language lexicon (e.g., not in the standard dictionary). For example, typing "msword" to launch Microsoft's Word application is an example of entering an code word. Dual words are utterances that can be either ordinary content words or action words, depending on the user's intention in typing the word. The user may type "excel" because he intends it to be a content word in his application text, or, alternatively, he may type it because he wants to use it as an action word for opening Microsoft Excel.

The action words are then checked against the contents of a wordbase. The wordbase includes a plurality of item records. Each item record includes an action word (i.e., code word and/or dual word) and an associated service script. The service script may perform a content, retrieval, navigation or command service, or a combination of these. If the action word entered by the user is located within the wordbase, the service script associated therewith is executed. Otherwise, the utterance entered by the user is a content word and is ignored by the present invention.

Action words allow a user to launch applications, navigate within applications and control application functions by using their natural language rather than dragging and clicking with a pointing device such as a mouse. The language used is personalized for each user. That is, the action words can be user defined, thus allowing a user to utilize his own lexicon of words to control his/her computer. The present invention allows the user to identify a variety of repetitive tasks and trigger them via their predefined action words. It also enables new types of computer access, information retrieval, and other services to be performed. The present invention works with, and independently of, any software application (e.g., word processor, spreadsheet, presentation package, Internet navigator, and the like). It is thus a context-free semantic user interface, software tool and an application environment.

The present invention saves all information that is entered by the user, and stores this information in a maintenance free environment, referred to as an ActiveWords archive. The present invention records and archives the user's input text on the fly from whatever application he is working in at that time. The present invention further creates a so called 7×7 data repository, which is a database that is divided into seven categories, each category having seven subcategories. The 7×7 categorization allows a user to record notes, expenses, to do lists, and the like. Finally, the present invention is completely portable. It goes wherever the user goes simply by providing for the user's personal profile to be downloadable from one computer to any other computer that has the present invention installed.

The user can create a user profile to match his unique language personality. The present invention keeps an archive record of the user's language preferences, word frequencies, and his utterance behavior. It provides the user with tools for using that archive, in combination with his user profile, to refine his SUI and tailor it to match his habit's and preferences. Using the SUI thus becomes reflexive, like the use of a mouse becomes reflexive, because it is so easy to learn and operate, and because it operates the same way in all contexts. Finally, the SUI establishes a platform others can use to develop and sell application products that leverage the SUI. By linking the SUI via software agents, any software product can become language aware.

The foregoing and other features and advantages of the invention will be apparent from the following, more particular description of a preferred embodiment of the invention.

BRIEF DESCRIPTION OF THE FIGURES

The present invention will be described with reference to the accompanying figures, wherein:

FIG. 21 illustrates a wordbase item record.

FIGS. 28 and 29 illustrate the concept of a user profile.

FIGS. 31A and 31B are screen shots of a window that allows multi-item resolution.

In the figures, like reference numbers generally indicate identical, functionality similar, and/or structurally similar elements. The figure in which an element first appears is indicated by the leftmost digit(s) in the reference number.

DETAILED DESCRIPTION OF THE PREFERRED EMBODIMENTS

Figure 1:
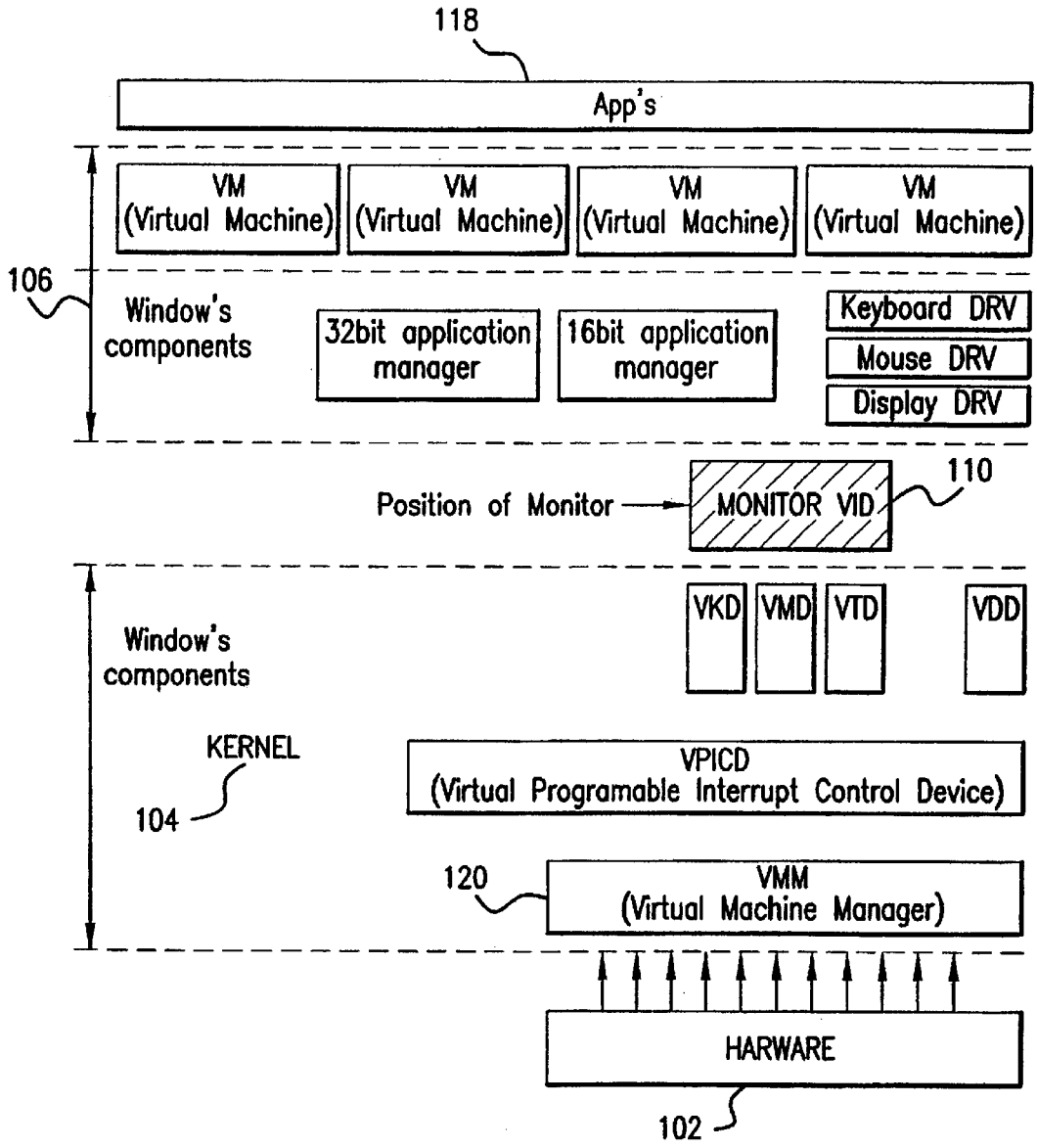
FIG. 1 illustrates the placement of the present invention within an operating system in order to be able to monitor all user inputs.

I. Overview
A. The AciveWords System
B. ActiveWord Services
1. Action Services
2. Archive Services
II. Exemplary Environment
III. Capturing Utterances Entered by the User
IV. Architecture and Operation of the Present Invention
A. Action Words and Content Words
B. Runtime Operation
1. Wordbase 340
2. Services performed by the ActiveWords System
3. MIKE 300
4. Monitor 110
5. State Table 450
6. Archiving User Text
7. The Control Center
8. Run-Time Operation of the ActiveWords System
9. The Toggle function. Pop-Up Window, Charm Box
10. Charm Words
C. The Application Programing Interface
D. Agents
E. Multi-Item Resolution
F. Portability
G. Third Party Application Programs
V. Examples of Using the ActiveWords System
VI. Conclusion I. Overview A. The ActiveWords System The present invention, referred to herein as the ActiveWords system, provides a semantic user interface (SUI). The SUI allows a user to use his everyday natural language or user defined words to operate a computer and/or manipulate the user's content in a highly efficient manner. In short, every keystroke, every word, or group of words is actionable. Consequently, a computer user's productivity can be dramatically increased by using action words that the user designates to activate controls and features. This allows the user to produce most of his work through simple, natural language commands. The present invention provides an intuitive interface that enhances the operation of the current standard window-based interface (also referred to herein as a Graphical User Interface (GUI)) in a simple natural manner. By leveraging the richness and power inherent in a user's language, the present invention allows the personal computer to operate in a manner that is much closer to the way people interact with each other using words.

The present invention provides a simpler and more natural way to work with the objects, applications, information requests (i.e., queries), and the like that constitute each user's "vital few." The vital few is each users unique pattern of using objects (e.g., applications, files, folders) and processes (e.g., computer controls and applications features) that comprise the user's sweet spot. The SUI allows the user to activate his/her vital few, much more quickly and efficiently than he can using the GUI. Because the GUI is ideal for organizing the 100% of what is available, the user will continue to rely on the GUI to explore, discover and activate the80% of things he seldom uses. For example, Windows 95 installs approximately 9000 items (applications, files, parameters, etc), all of which are accessible via the GUI. However, only a subset of 50–300 of these items comprise the average user's vital few. As such, in accordance with the present invention, the SUI provides a mechanism to access this subset of information, referred to as the vital few, in an effective way.

The present invention is a system that acts upon human language text that arrives at the user's desktop computer. Text can be entered directly by the user via keyboard or voice. In the case of voice, voice-to-text software is provided to translate the voice signals. Alternatively, text may arrive via e-mail text, Internet page text, or other forms of text from other sources. This text, referred to as "given text," can be selected by the user using conventional point and click technology. Once text has been entered or selected in this fashion, the text is passed to the present invention to determine its actionability. If the text is actionable, the present invention executes the designated action.

The present invention uses the same text input stream that the user employs to input data to applications and applications documents. The present invention constantly monitors the text input stream and takes appropriate action when it senses a command from the user. The ActiveWords system works all of the time and in all contexts (i.e., within any application program or within the operating system workspace). The ActiveWords system accesses that text input stream prior to its access by an application the user may be using at any given time.

ActiveWords system exploits natural language by providing a single-word (or multi-word) logic interface, referred to herein as the SUI. That is, every word (or for that matter keystroke) entered or selected by a user is actionable. The term "single-word" as used in this document means any word that has meaning in the user's natural language (e.g., "word" for wordprocessor) or a set of letters that only has a predefined meaning to the user (e.g., "wp" for word processor). The present invention also provides for multi-word expressions. That is, two or more words may activate a service. Implemenation of a multi-word embodiment will be readily apparent to one skilled in the art after reading the detailed description provided below for the single-word embodiment.

As a result of the present invention, the rich naming logic of natural language can be incorporated into a user interface. Computer users can now leverage their natural language abilities to assign names of their choosing for all their computer activities, including launching application programs, controlling application program operations, replacement of text, searching, retrieval of information, and the like.

A user is enabled to enter "utterances." Each utterance has the potential to control the operations of the computer. An "utterance" is any natural language word or group of words, string of letters or symbols, etc. followed by an delineator (e.g., a space bar or punctuation mark). The present invention checks each utterance against a wordbase to determine whether it is an action word (i.e., a word than when entered or selected triggers an action). The present invention thus senses the text stream for action words and automatically erases them when they are encountered. Action words are user defined. The action words allow a user to launch applications and navigate within applications by using language rather than clicks from a pointing device such as a mouse. The present invention, alternatively, replaces an utterance with designated words. The combined set of all user-defined action words, as well as a history of the user's past actions, constitute an ActiveWords user profiles. That profile is transportable from one computer to another.

The present invention creates an environment where there are two classes of utterances that users can enter into their computers; content words and action words. Action words are divided into two groups: dual words or code words. Content words are words entered into the text stream that the user intends as input to some document, file, or directory. Examples include word processing text in a memo, file names in the Microsoft Windows directory, numbers in spreadsheet.

Action words a new category of words introduced by the present invention that are actionable within the SUI. Action words are thus words that users place into the text stream as requests for specific services from the present invention. Code words are action words the user makes up or which are not part of his natural language lexicon (e.g., not in the standard dictionary). For example, typing "msword" to launch Microsoft's Word application is an example of entering an code word. Dual words are utterences that can be either ordinary content words or action words, depending on the user's intention in typing the word. The user may type "excel" because he intends it to be a content word in his application text, or, alternatively, he may type it because he wants to use it as an action word for opening Microsoft Excel. Content words are not action words because the user does not intend them to be action words. As will be shown below, the present invention provides a simple mechanism for designating whether an entered word is an action word or a content word.

For many functions, the SUI offers the user a faster and simpler alternative to reaching for the mouse and using the graphic user interface (GUI). On a case by case basis, the user decides which interface (GUI or SUI) is most convenient for accomplishing his intended result. Typically, the SUI becomes the preferred, least effort path, for accessing the vital few. In a short time, the user settles into an optimum routine that combines his use of the GUI with his use of the SUI.

B. Active Word Services

The ActiveWords system provides two types of services: action services and archive services. The action services sense keystrokes, symbols and words within the text stream. If an action word is entered, the ActiveWord system takes whatever action the user has specified (i.e., each action word has at least one associated action associated therewith) for that action word. Action services are divided into five groups: command functions, content functions, navigation functions, information functions and complex functions. The archive services maintains are cord of all the text the user enters as input via keyboard or voice. As stated above, these action and archive services are designed to be available at all times and within any context, so long as the computer's operating system is running. Both types of services will be discussed below.

1. Action Services

The present invention can be used to activate command functions. Command functions include, for example, window controls (e.g., resizing a window) and applications controls (e.g., save print, search, view, open, etc.).

The present invention can also be used to activate content functions. Thus, action words can be used to achieve content results, such as text substitutions, punctuation, text formatting, text content transformation, and the like. In particular, the ActiveWords system can be used to perform text content substitutions, such as the detection and a correction of double capitals (e.g., THe becomes The), abbreviations, expansions (e.g., ceo becomes Chief Executive Officer) and large text insertions. The content functions further include insertion of punctuation, such as quotes and contractions. Still further, the content functions include formatting, such as complex formatting for programming, or for name and addresses. Finally, the content functions include content transformations, such as language translations (e.g., English to French), number to text conversion, currency conversation (e.g., dollars to pounds or yen), in-place arithmetic (e.g., replace "100+300" with "400"), date transformations (e.g., 7/1/97 to July 1, 1997), data conversions (e.g., chemistry symbols and acronyms), and the like.

The present invention can further be used to activate navigation functions. Thus, active words can be used to launch application programs and navigate within an application program. For example, a single-word, such as "excel," can be used to launch a spreadsheet program from anywhere within the working environment of a user's computer. The user can use action words to navigate between different views in an application (e.g., navigating between months, dates, weeks in a calendar/planning application, such as Ecco). Documents within a wordprocessor can also be opened via an action word. Accordingly, each of any number of documents or files in a user's computer can be assigned an action word. Furthermore, the user can launch various services that affect her computer (e.g., backup of the hardrive) via an action word. These services can be launched within the user's computer or across a network of computers.

The present invention can also be used to locate information within a user's computer or from external sources. For example, an action word can be used to trigger a directory search or a database search. Another action word may be used to trigger an Internet search (e.g., final "xxxx" at the Wall Street Journal web site). Yet another action word can retrieve a specific file or record available via the Internet, extranet or intranet.

Finally, the ActiveWords system can be used to trigger and/or perform complex functions, such as dialing a person's telephone number or dialing a person's beeper service and send a message to that beeper. The ActiveWords system also provides four information and software resources, which are described in greater detail below, referred to as the toggle function, pop-up window function, charm-box function and charm-word function.

Note that most of the computer services and functions discussed above are already available within a user's computer (e.g., launching a program) or within a single application program (e.g., text replacement or searching a database). However, access to these services and functions is almost always context dependent in that the user has to leave where sheet is (e.g., Excel) and navigate to a specific tool or application service (e.g. Windows 95 start find menu) to obtain the service or control she needs. From the perspective of the user, that is a cumbersome and time consuming method. The user must find the service within the GUI's maze of pull-down windows or to use difficult to remember keystrokes that include control characters (e.g., ctrl. alt). The present invention allows a user to utilize his everyday language to activate these services, programs, functions, etc. form any context in the computer. The service script will navigate to the appropriate tool or context and perform designated action.

2. Archive Services

The archive service records and stores all the text a user inputs via keyboard or voice-to-text. The ActiveWord system tags the text with identifying information, such as date, application name and/or document or file name. The archive can thus be searched based on the actual text entered by the user in combination with the identifying information. The present invention further creates a so called 7×7 data repository, which is a database that is divided into seven categories, each category having seven subcategories.

Provided below is a detailed description of a system architecture for implementing a preferred embodiment of the ActiveWords system, along with an operational description of the present invention. Finally, this document concludes with a set of examples that illustrate practical applications for the present invention.

II. Exemplary Environment

Figure 8:
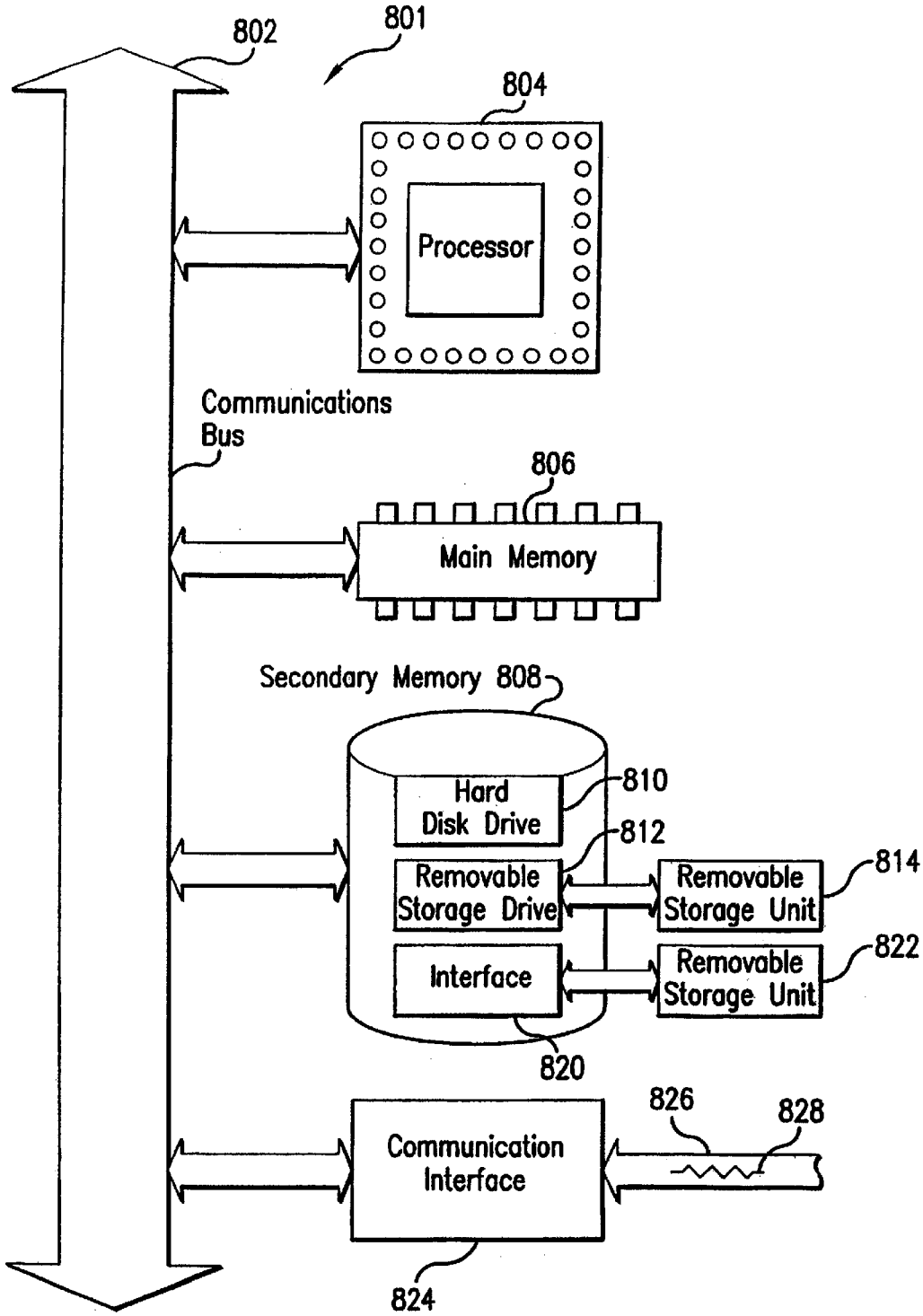
FIG. 8 illustrates an exemplary environment for the present invention.

The present invention may be implemented using hardware, software or a combination thereof and may be implemented in a computer system or other processing system. An example computer system 801, which can be installed with the present invention, is shown in FIG. 8. The computer system 801 includes one or more processors, such as processor 804. The processor 804 is connected to a communication bus 802. Various software embodiments are described in terms of this example computer system. After reading this description, it will become apparent to a person skilled in the relevant art how to implement the invention using other computer systems and/or computer architectures.

Computer system 802 also includes a main memory 806, preferably random access memory (RAM), and can also include a secondary memory 808. The secondary memory 808 can include, for example, a hard disk drive 810 and/or a removable storage drive 812, representing a floppy disk drive, a magnetic tape drive, an optical disk drive, or the like. The removable storage drive 812 reads from and/or writes to a removable storage unit 814 in a well known manner. Removable storage unit 814, represents a floppy disk, magnetic tape, optical disk, or the like, which is read by and written to by removable storage drive 812. As will be appreciated, the removable storage unit 814 is a computer usable storage medium having stored therein computer software and/or data.

In alternative embodiments, secondary memory 808 may include other similar means for allowing computer programs or other instructions to be loaded into computer system 801. Such means can include, for example, a removable storage unit 822 and an interface 820. Examples of such can include a program cartridge and cartridge interface (such as that found in video game devices), a removable memory chip (such as EEPROM, or PROM) and associated socket, and other removable storage units 822 and interfaces 820 which allow software and data to be transferred from the removable storage unit 822 to computer system 801.

Computer system 801 can also include a communications interface 824. Communications interface 824 allows software and data to be transferred between computer system 801 and external devices. Examples of communications interface 824 can include a modem, a network interface (such as an Ethernet card), a communications port, a PCMCIA slot and card, etc. Software and data transferred via communications interface 824 are in the form of signals which can be electronic, electromagnetic, optical or other signals capable of being received by communications interface 824. These signals 826 are provided to communications interface via a channel 828. This channel 828 carries signals 826 and can be implemented using wire or cable, fiber optics, a phone line, a cellular phone link, an RF link and other communications channels.

In this document, the terms "computer program medium" and "computer usable medium" are used to generally refer to media such as removable storage device 812, a hard disk installed in hard disk drive 810, and signals 826. These computer program products are means for providing software to computer system 801.

Computer programs (also called computer control logic) are stored in main memory and/or secondary memory 808. Computer programs can also be received via communications interface 824. Such computer programs, when executed, enable the computer system 801 to perform the features of the present invention as discussed herein. In particular, the computer programs, when executed, enable the processor 804 to perform the features of the present invention. Accordingly, such computer programs represent controllers of the computer system 801.

The present invention may be implemented using hardware, software or a combination thereof and may be implemented in a computer system or other processing system. An example computer system 801, which can be installed with the present invention, is shown in FIG. 8. The computer system 801 includes one or more processors, such as processor 804. The processor 804 is connected to a communication bus 802. Various software embodiments are described in terms of this example computer system. After reading this description, it will become apparent to a person skilled in the relevant art how to implement the invention using other computer systems sand/or computer architectures.

Computer system 802 also includes a main memory 806, preferably random access memory (RAM), and can also include a secondary memory 808. The secondary memory 808 can include, for example, a hard disk drive 810 and/or a removable storage drive 812, representing a floppy disk drive, a magnetic tape drive, an optical disk drive, or the like. The removable storage drive 812 reads from and/or writes to a removable storage unit 814 in a well known manner. Removable storage unit 814, represents a floppy disk, magnetic tape, optical disk, or the like, which is read by and written to by removable storage drive 812. As will be appreciated, the removable storage unit 814 is a computer usable storage medium having stored therein computer software and/or data.

In alternative embodiments, secondary memory 808 may include other similar means for allowing computer programs or other instructions to be loaded into computer system 801. Such means can include, for example, a removable storage unit 822 and an interface 820. Examples of such can include a program cartridge and cartridge interface (such as that found in video game devices), a removable memory chip (such as EEPROM, or PROM) and associated socket, and other removble storage units 822 and interfaces 820 which allow software and data to be transferred from the removable storage unit 822 to computer system 801.

Computer system 801 can also include a communication interface 824. Communications interface 824 allows software and data to be transferred between computer system 801 and external devices. Examples of communications interface 824 can include a modem, a network interface (such as a Ethernet card), a communications port, a PCMCIA slot and card, etc. Software and data transferred via communications interface 824 are in the form of signals which can be electronic, electromagnetic, optical or other signals capable of being received by communications interface 824. These signals 826 are provided to communications interface via a channel 828. This channel 828 carries signals 826 and can be implemented using wire or cable, fiber optics, a phone line, a cellular phone link, an RF link and other communications channels.

In this document, the terms "computer program medium" and "computer usable medium" are used to generally refer to media such as removable storage device 812, a hard disk installed in hard disk drive 810, and signals 826. These computer program products are means for providing software to computer system 801.

Computer programs (also called computer control logic) are stored in main memory and/or secondary memory 808. Computer programs can also be received via communications interface 824. Such computer programs, when executed, enable the computer system 801 to perform the features of the present invention as discussed herein. In particular, the computer programs, when executed, enable the processor 804 to perform the features of the present invention. Accordingly, such computer programs represent controllers of the computer system 801.

In an embodiment where the invention is implemented using software, the software may be stored in a computer program product and loaded into computer system 801 using removable storage drive 812, hard drive 810 or communications interface 824. The control logic (software), when executed by the processor 804, causes the processor 804 to perform the functions of the invention as described herein.

In another embodiment, the invention is implemented primarily in hardware using, for example, hardware components such as application specific ingredient circuits (ASICs). Implementation of the hardware state machine to as to perform the functions described herein will be apparent to persons skilled in the relevant art(s).

In yet another embodiment, the invention is implemented using a combination of both hardware and software.

III. Capturing Utterances Entered by the User

A preferred embodiment of the present invention is designed to operate with Windows 95, an operating system designed and distributed by Microsoft Corporation. However, the present invention contemplates operating with any present future developed operating system, including Windows NT. For convenience, the present invention is described with reference to the Windows 95 Operating System. The present invention is configured to always be active in the background, similar to a real-time monitoring system. Every time a computer implementing the present invention is turned on, the operating system launches the present invention.

FIG. 1 illustrates how the present invention captures the keystrokes (i.e., data entered by a user via a keyboard attached to computer system 801) of the user. The present invention operates with an architecture capable of monitoring for system wide inputs. This broad I/O capability can be provided under the Viral Machine Manager (VMM 120) that is available under Win32. The VMM 120 is an extensible operating system whose core and standard components are operating system whose core and standard components are provided by Microsoft Corporation. By writing additional modules called V×Ds (virtual device drivers), software and hardware vendors can complement the VMM 120. The core of the present invention, monitor 110, is implemented as a V×D (referred to as a Virtual Input Driver or VID) under the Win32 bit environment.

The heart of the Windows 95 architecture consists of two features: the dynamic V×D loader (VXDLDR.386) and the layered I/O system provider V×D (ISO.386). It is the main responsibility of the IOS V×D to catch I/O calls that user-mode applications perform to file storage devices and route them to a set of layered V×Ds that will cooperately process the calls.

Under Windows 95, a V×D can be loaded dynamically from another V×D, from a 16-bit user-mode Windows or DOS based application, or from a Win32-based application. To load a V×D from another V×D, the services from the VXDLDR V×D can be used. A 16-bit user-mode application obtains the VXDLDR's entry point and passes the location of the V×D to load to the V×D loader. Once the V×D needs to be unloaded, the application passes the module name of the V×D to unload to the V×D loader. Unfortunately, there is no such thing as a V×D handle that the user-mode application could use for that purpose; either the module name or the V×D ID must be known to the application in order to unload the V×D. A Win32-based application must open the V×D using the CreateFile Win32 API to obtain a handle to the V×D, and use the DeviceIOControl API to communicate with the V×D.

FIG. 1 shows the location of where the monitor VID 110 is placed under the Windows 95 Operating System in order to be able to monitor all inputs (i.e. keystrokes and mousestrokes). Hardware 102 includes a keyboard, mice, microphone, or the like. The hardware 102 forwards the users input to a kernel 104. The operating system includes kernel or inner layer 104 and upper layer 106. Both components include a plurality of window components. The components (i.e., VM's, mangers, drivers; V×D's, and VPICD) illustrated in FIG. 1 are well known in the art of operating systems, and do not directly affect the present invention. As such, for the sake of brevity, these components will not be explained in detail herein.

The monitor [VIDI] *VID* 110 is positioned between the two operating system components 104, 106 such that a user's keystrokes or mouse signals are captured prior to being forwarded to application program(s) 118. The present invention requires that the keystrokes entered by the user be captured prior to the operating system forwarding the keystrokes to the foremost application program 118. Voice signals are treated separately since they require additional processing to convert to text, which is done using third party voice-to-text software. The ActiveWords system will capture the text characters from the voice-to-text software before it is provided to the application program 118. Once captured, the source of the text is irrelevant to the present invention.

Figure 14:
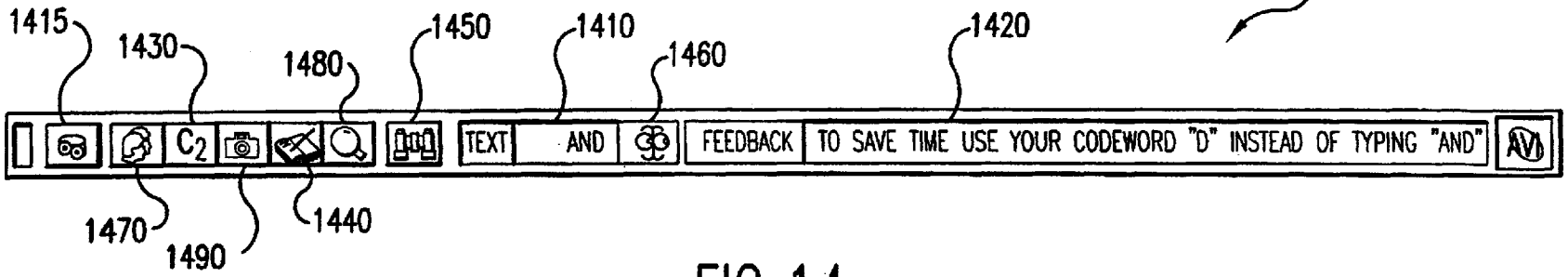
FIG. 14 illustrates a screen shot of a monitoring bar in accordance with the present invention.
Figure 19:
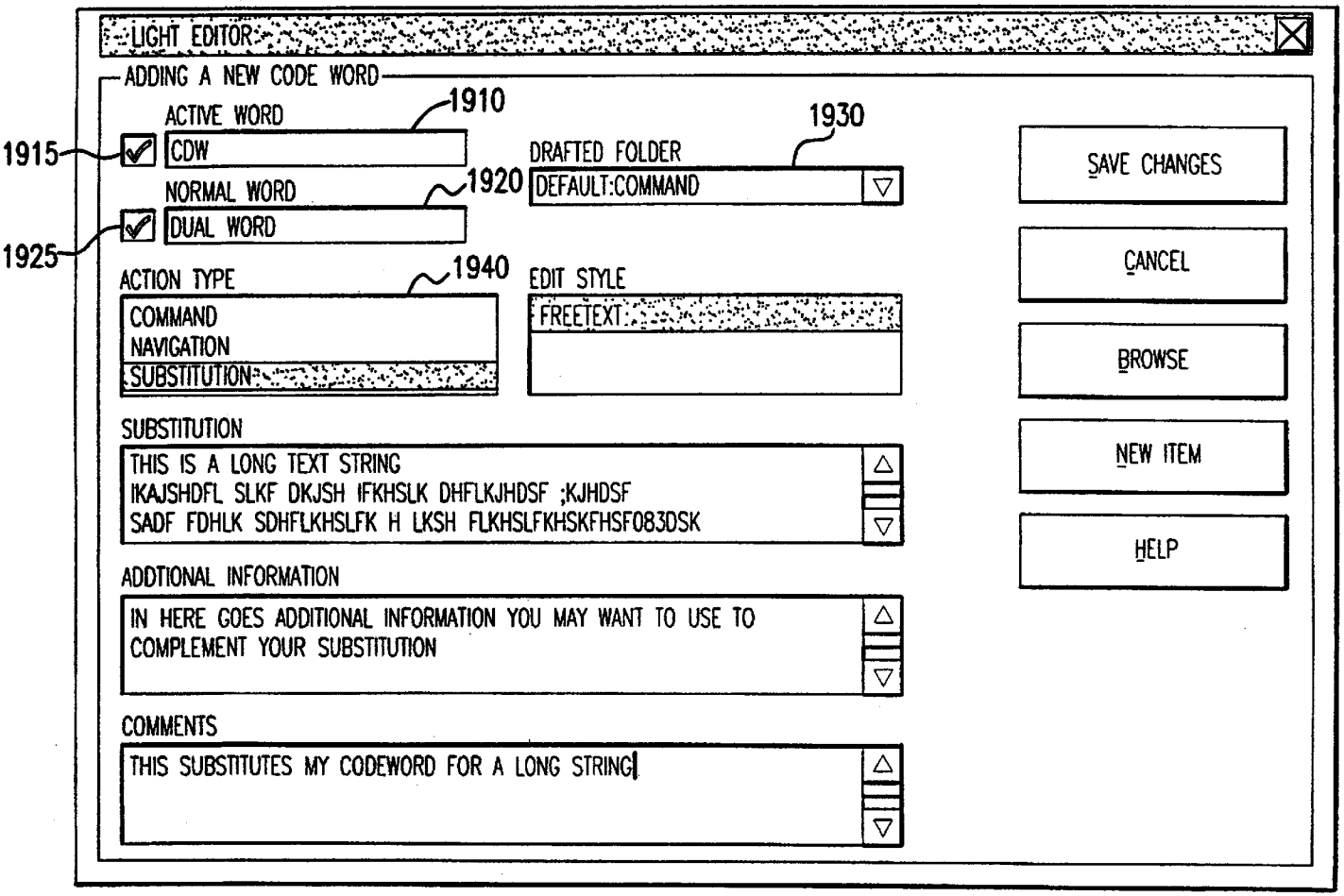
FIG. 19 is a screen shot of a LightEditor for adding code words and dual words to the ActiveWords Wordbase in accordance with the present invention.
Figure 25:
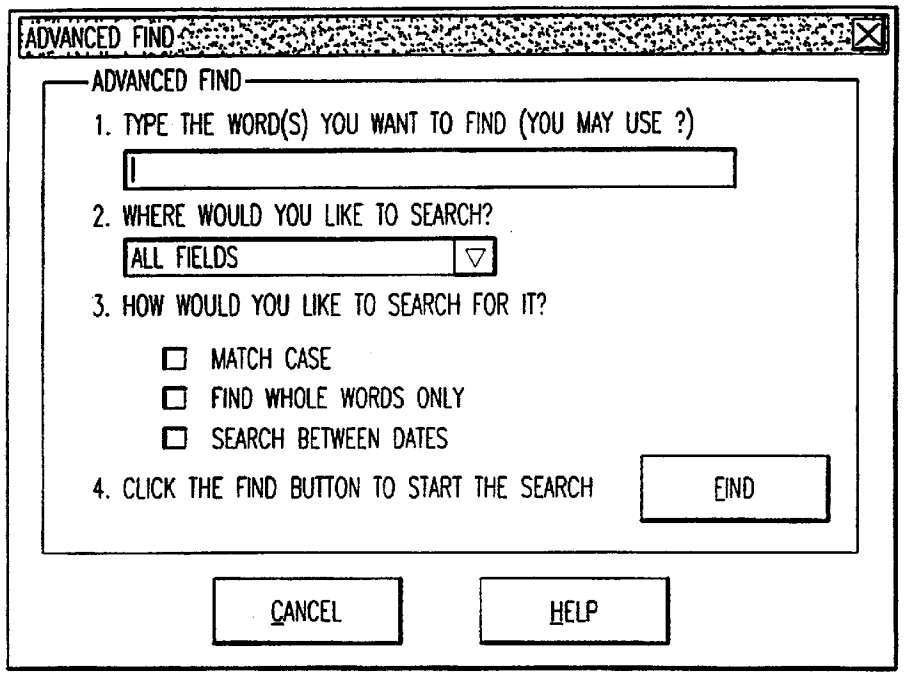
FIGS. 25 and 26 are screen shots illustrating the Advanced Find and Find functions of the present invention, respectively.
Figure 26:
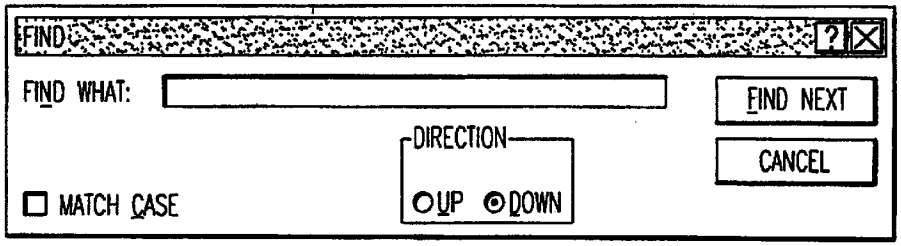
Figure 27:
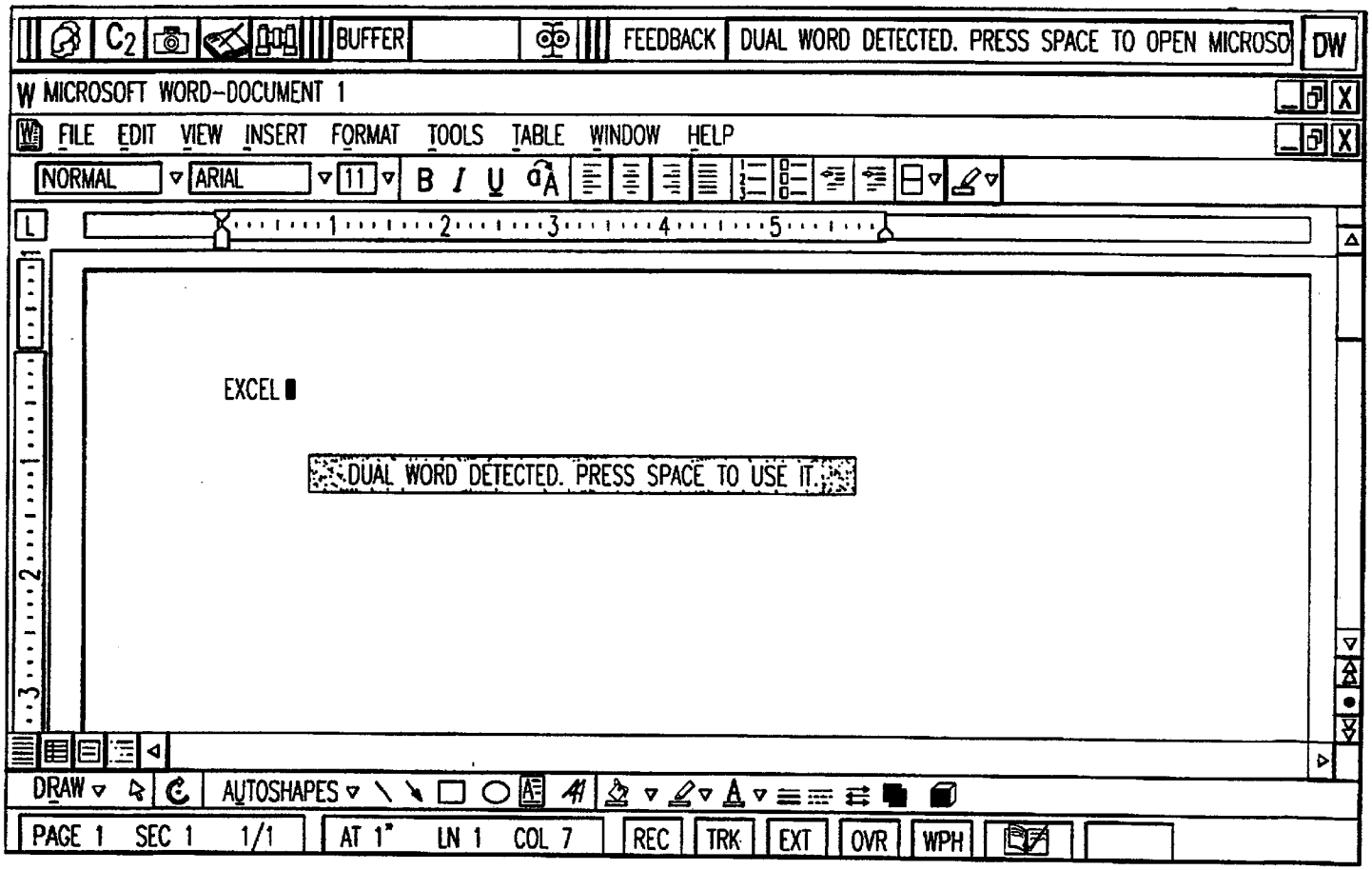
FIG. 27 is a screen shot illustrating a banner that is displayed in a preferred embodiment when a dual word has been entered by the user.

The [Monitor] *monitor* VID 110 is graphically represented to the user in accordance with the present invention via a monitoring bar [325] *315*, as shown in FIG. 14. The monitoring bar 315 will be described in greater *detail* below in Section IV.*B*.4. Generally, the monitoring bar 315 has two data fields: text field 1410 and feedback field 1420 and a number of icons. Icon 1415 provides access to a productivity center. Icon 1430, shown as $C^c$, provides the user with access to a control center, which is a central place to manage the present invention. Icon 1460 is referred to as "Mr. Ibeam." Icon 1470 allows a user's profile to be changed. Icon 1440 provides access to a LightEditor (FIG. 19). Icon 1450 provides the user with a find function (FIG. 26). Icon 1480 provides an advance find feature (FIG. 25). Icon 1490 allows a user to select text, e.g., from a notepad, spreadsheet, e-mail, word processing document, etc.

IV. Architecture and Operation of the Present Invention

As discussed above, the present invention provides semantically driven functionality, thereby making the user's computer "language aware." The present invention is responsive to action words, which are the natural language text entered by the user either via keyboard or voice. Additionally, the user can select a word from a document, e-mail, database or Internet via his mouse and submit the word to the ActiveWord system as a potential action word. If the word is an action word, the system will react exactly as if input by the user via a keyboard.

The present invention operates in the background and takes appropriate action when it senses an action word. The present invention is seamlessly integrated with the operating system of the user's computer thereby making it unobtrusive to the user. In an alternate embodiment, the present invention is incorporated into the operating system software. For the user's convenience, the present invention provides a number of user signals and graphical aids that help the user work with the SUI. Described below is the general architecture and operation of the SUI, and its associated components.

the ActiveWords system monitors the user's data input whenever his computer is running, unless the ActiveWords system is turned off by the user. In a preferred embodiment, the user can place the ActiveWords system in "sleep" mode (via, for example, an action word), such that inputted text is not monitored. The services of the present invention are available in all contexts and at all times. Being context free and "aware" of the user's natural language and language(s)-of-art enables the ActiveWords system to assist the user in many useful ways.

Context independences is essential to the effectiveness of the present invention. The present invention works in the same way, no matter what context the user is working in when he requests a service. It makes no difference if the user is working in an application program, a utility program, an Internet browser, or in an operating system word space. The ActiveWords system does not interfere with whatever text services his applications provide. The user can use the full text services of Microsoft Word, for example, along with the full text services of the Active Words system. It compliments these application text services by providing greater depth of functionality and universal, context free, operation. This context-free operation enables the user to become reflexive in his use of action words.

Reflexive use means that the behavior in question is unconscious on the part of the person that performs that behavior. Stepping on a break pedal, for example, is reflexive for an experienced driver. Pointing with a mouse or other pointing device is reflexive for an experienced GUI user. These behaviors would not become reflexive if the break pedal only worked to slow the car on some streets, or if the pointing device only worked to move the cursor in some applications and not in others. Because these devices are reliable and work in the same way all the time and in all contexts, the user can become unmindful of them, thereby entrusting those behaviours to her reflexes. From then on, she performs the behavior automatically whenever she desires the result of that particular behavior.

The ActiveWords system may be viewed as providing a virtual personal computer within the user's actual computer. With ActiveWords, the user can give his own names (i.e., action words) to his computer's objects, processes, and features. He is no longer a captive of the interface and naming choices that others have provided. Every user's natural language vocabulary is unique to some degree. His SUI needs to reflect that uniqueness. The ActiveWords system enables each user to use and leverage his own terminology, his own mnemonic metaphors, and the structure of his personal language profile. It seems obvious that an English metallurgist who is an amateur astronomer should have an SUI that is significantly different from the SUIT of a French businessman who is interested in soccer.

A. Action Words and Content Words

There are two types of Action Words: code words and dual words. A code word is any character string the user reserves for the purpose of signaling the present invention to provide him with a service. By designating a code word, a user is signaling his intention to never use this combination of letters, symbols, etc. as a content word. The ActiveWords system knows, therefore, that whenever it senses a code word, it may immediately erase it from the text stream. After erasing the code word, the present invention executes a service script associated with that code word. In the rare event when the user wants to type the code word as a content word, he simply turns the SUI off temporarily. In a preferred embodiment, an action word is provided to activate a service script that turns the monitor window off until the next word has been input. Alternatively, an icon on the monitoring bar 315, such as Mr. I-beam, can be used to toggle between sleep and awake mode.

A dual word is any word in the English dictionary (e.g., "file") or a word of-art that has a special meaning in a personal or professional context (e.g., "walkthrough" for programmers). In other words, a user may want a word to have a dual purpose: (1) a content word to be used in an application and (2) an action word to trigger a service. When a dual word is sensed, the present invention recognizes it as an utterance having a dual nature, in that it may be intended either as a content word or action word. Accordingly, when it encounters such an utterance, the present invention must be told by the user that it is an action word (i.e., the user must disambiguate the dual word).

In a preferred embodiment, the present invention provides the user with a simple method for declaring his intentions: a double press of the space bar. If the user's intention is to use the entered dual word as a content word, the user does not press the space bar twice. In that event, the present invention ignores the word and continues sensing for the next action word. If his intention is to use it as an action word, the present invention immediately erases the word from the text stream and executes the service script associated with that action word. As should be readily apparent to one skilled in the art, other techniques can be used for disambiguating a dual word.

The present invention is language neutral. In other words, regardless of the user's natural language, English, Spanish, German, French, etc., the present invention operates the same. The user can designate any word(s) as an action word(s). The user can use any nicknaming logic for creating action words. For example, the user might use "ms" as an Code Word prefix to trigger service scripts related to various Microsoft application programs. Accordingly, "msw" could be the code word used to launch Microsoft Word, "mse" to launch Microsoft Excel, "msp" to launch Microsoft Powerpoint, "msa" to launch Microsoft Access, and so on. Obviously, a suffix can also be used instead of a prefix to trigger service scripts. Alternatively, the user can create code words without mnemonic aids such as suffixes and prefixes.

B. Runtime Operation

Figure 3:
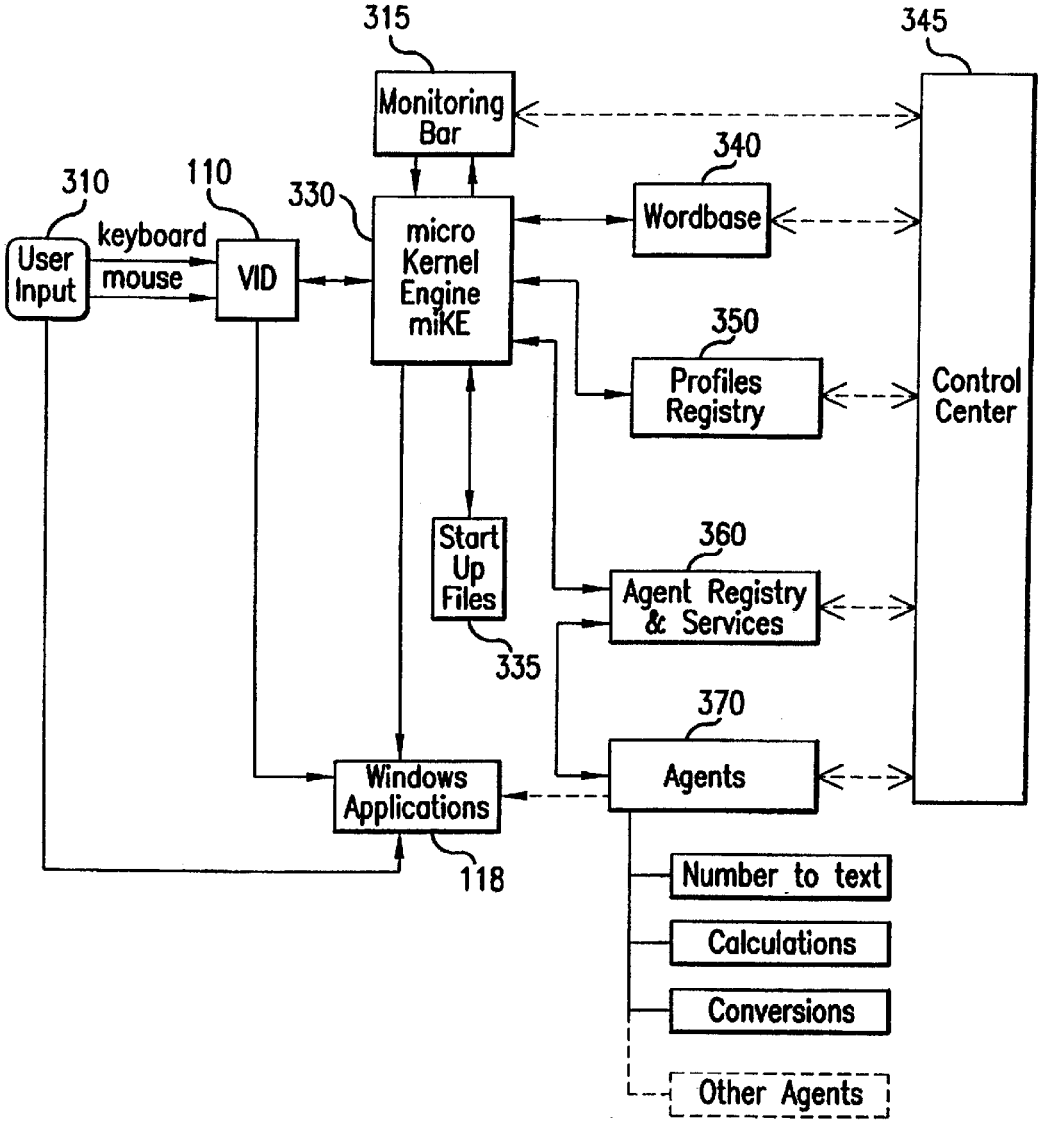
FIG. 3 is an architectural block diagram of the present invention.

FIG. 3 is a block diagram of the present invention during runtime operation. The present invention includes a Virtual Input Driver (VID) 110, a microkernel engine (MIKE) 330, a monitoring bar 315, agents 370, agent registry and services 360, third-party applications 118, a wordbase 340, a profiles registry 350, control center 345 and set-up files 335. Window applications 118 include word processors, spread sheets, presentation software, utilities, and the like. The agents 370 are application programs that are dependent upon the present invention (i.e., require input from MIKE 330 to operate), as described in greater detail below. MIKE 330 uses a scripting language to launch an application program (s) 118 or to control functions and features of application program(s) 118. Each function is performed by a service script, which is associated with each action word within the wordbase 340.

Figure 4:
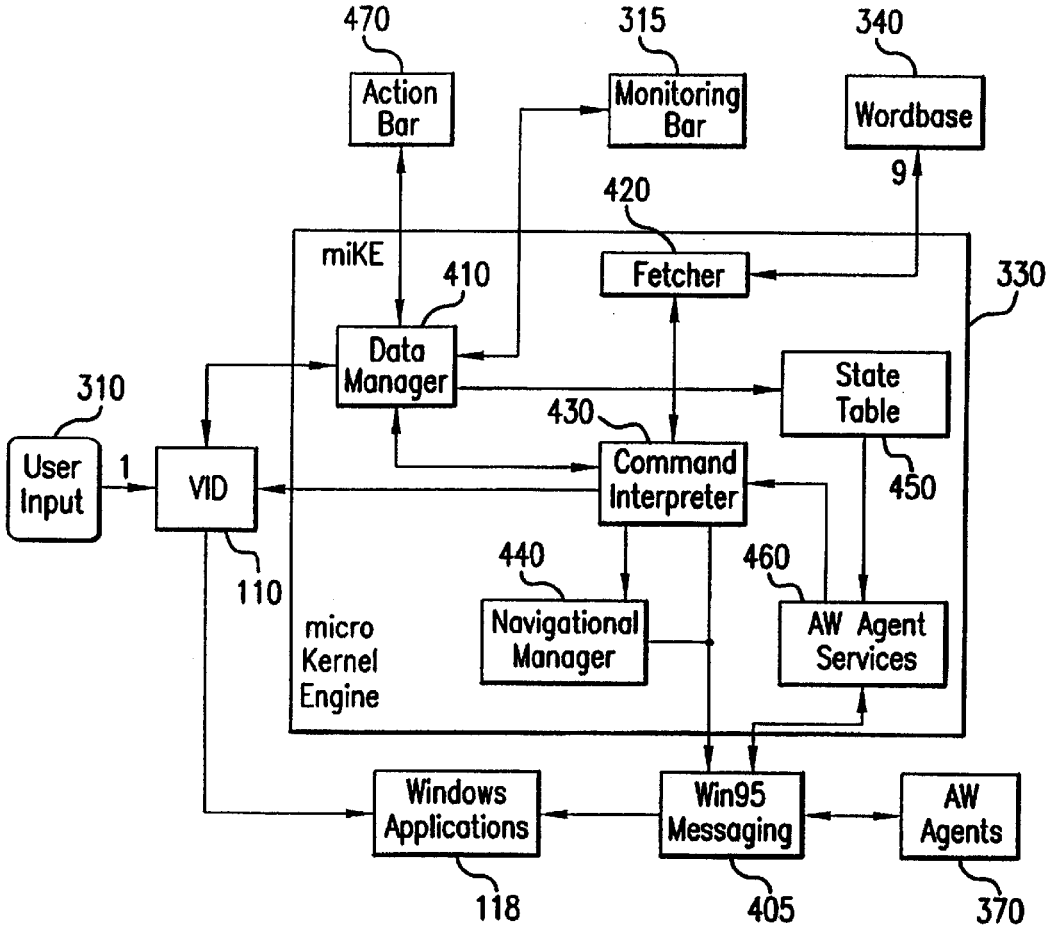
FIG. 4 is a block diagram of a micro kernel engine (MIKE).

MIKE 330 is made up of several components and is shown in further detail in FIG. 4. In operation, a user 310 enters an input via a keyboard or selects text via a mouse. This input is captured by VID 110. All typed keystrokes are received by the VID 110, which extends the functionality of the Win 95 Operating System, before they are dispatched to the application 118. In other words, the input text stream is "hooked" by the VID 110. In a preferred embodiment, a mouse input is received by both the VID 110 and the Windows applications 118. In other words, the VID 110 only monitors and senses the activity of the mouse. (The present invention monitors the mouse since the clicking of the mouse indicates a change of context or the end of an utterance, which is analogous to pressing the space bar.) In an alternate embodiment, user input 310 is entered via a microphone.

The user input is then forwarded to MIKE 330. When MIKE 330 is inactive, the VID 110 retransmits all user inputs back to the foremost Windows application. The initial settings of MIKE 330 and monitoring bar 315 are stored in the start-up files 335, which are read at start-up and written to after changes or shut-down. Each user has their own start-up files 335.

MIKE 330 displays in the monitoring bar 315 the characters input by the user. It also sends feedback messages and displays activity indicators through monitoring bar 330. The user can interact with MIKE 330 through pop-up menus, as well as via the controls associated with monitoring bar 315. These controls include changing the current user profile, capturing selected text, launching the LightEditor, launching the Control Center, bringing in the Advance Find from the Control Center, displaying Mr. IBeams productivity center, turning on/off the monitoring bar 315, and going into "sleep" mode.

The profiles registry 350 is a listing of all available user profiles. The concept of user profiles is discussed in more detail below. All agents are registered in registry 360. The control center, which is a central place to manage the present invention, has access to the wordbase 340, monitoring bar 315, profiles registry 350, agent registry 360 and agents 370. Each major component of the present invention will be described in detail below.

1. Wordbase 340

MIKE 330 searches for action words or dual words stored in the wordbase 340. In a preferred embodiment, wordbase 340 is a relational database that is constructed using Jet Engine® available from Microsoft Corporation. Wordbase 340 is where all third party applications register their set of action words. The present invention contemplates, for example, a law wordbase, a medical wordbase, a business wordbase, etc. Thus, the medical wordbase, for example, will include a set of dual words, code words and associated scripts that are specific to the practice of medicine. Upon installation, each of these "third-party wordbases" will be seamlessly incorporated into a user's wordbase 340.

Each action word and it's associated service script comprise an active wordbase item record. Each wordbase item record includes the code word and/or the dual word that will trigger the execution of the service script. A detailed illustration of each wordbase item record is shown in FIG. 21.

When an action word match is found within wordbase 340. MIKE 330 accesses the wordbase 340 and retrieves the service script associated with the active word or dual word. The service script provides a content, retrieval, navigation, information or command service, or a combination of these. Additionally, the wordbase 340 records statistical information concerning the code word or dual word, such as incrementing a hit count, updating last access time, etc. These counts are recorded in the related wordbase item records and are used by the productivity center (FIG. 11) to provide statistical data to the user. The statistical data is used by the user to leverage the ActiveWords training features and improve his productivity. The operations of add, delete and modify can be performed by a user on wordbase 340 via the control center 345 or via a light editor (FIG. 19, which is described in detail below) as should be apparent to a person skilled in the art.

Every time the present invention senses that the user has finished a word, it searches the wordbase 340 to see if that word is in an item record as a code word or dual word. There are three possible outcomes of searching for a wide in the wordbase 340:

1) A matching code word is found in an wordbase item record. In this case, the typed word is immediately erased and the accompanying service script is executed.

(2) A matching dual word is found in an active wordbase item record. In this case, the ActiveWords system. By using words and thereby incorporating natural language logic directly into the SUI, the ActiveWords System becomes very powerful. The ActiveWords system achieves this power by allowing the user to associate service scripts with either code words or dual words, whichever is easiest for him to recall.

The service script specifies the service to be performed whenever the action word(s) within the item record is sensed. Serving scripts in the ActiveWords system are written in scripting language. For example, a script for using the previous word a user typed as the find target for a search of file directory in Windows 95, looks like this.

<erase last word><winstart>f<[I]/winstart><delay><last word><enter>

(This script erases the last word [type] *typed*-activates the winstart key—types the letter "f" that triggers the windows find tool—closes the winstart key-waits for 600 ms—and calls in the last word typed-and presses enter to launch the find operation).

Those skilled in the art will readily appreciate that the specific scripting language used is implementation specific. In a preferred embodiment, the scripting language syntax is similar to HTML. An exemplary subset of the scripting language used in the present invention is provided below with reference to TABLE 1.

TABLE 1

| | | |
|---|---|---|
| 1 | <F1> | Function 1 key. |
| 2 | <F2> | Function 2 key. |
| 3 | <F3> | Function 3 key. |
| 4 | <F4> | Function 4 key. |
| 5 | <F5> | Function 5 key. |
| 6 | <F6> | Function 6 key. |
| 7 | <F7> | Function 7 key. |
| 8 | <F8> | Function 8 key. |
| 9 | <F9> | Function 9 key. |
| 10 | <F10> | Function 10 key. |
| 11 | <F11> | Function 11 key. |
| 12 | <F12> | Function 12 key. |
| 13 | <LT> | Lower than character"<". |
| 14 | <GT> | Greater than character">". |
| 15 | <ESC> | Escape key. |
| 16 | <DEL[:##]> | Delete key (for deleting) [repeated ## times]. |
| 17 | <TAB[:##]> | Tab key [repeated ## times]. |
| 18 | <BACK SPACE[:##]><br><BACKSPACE[:##]><br><BS[:##]> | Back space key (for deleting) [repeated ## times] |
| 19 | <ENTER[:##]> | Entry key [repeated ## times]. |
| 20 | <UP[:##]> | Up arrow key [repeated ## times]. |
| 21 | <DOWN[:##]> | Down arrow key [repeated ## times]. |
| 22 | <LEFT[:##]> | Left arrow key [repeated ## times]. |
| 23 | <RIGHT[:##]> | Right arrow key [repeated ## times]. |
| 24 | <HOME> | Home key (goes to beginning of line, or top of a list). |
| 25 | <END> | End key (goes to end of line or to bottom of a list). |
| 26 | <WINSTART></WINSTART> | Windows95 special key to activate the "START"button. |
| 27 | <WINMENU> | Windows95 special key to simulate a right mouse click |
| 28 | <ALT></ALT> | <ALT> simulates the Alt key down, </ALT> simulates the Alt key up. An <ALT> must always be closed by an </ALT>. |
| 29 | <CTRL></CTRL> | Same as Alt but with the Control key. |
| 30 | <SHIFT></SHIFT> | Same as Alt but with the Shift key. |
| 31 | <ALTGR></ALTGR> | Same as Alt but with the AltGr key. This key is included in some keyboards for special characters. |
| 32 | <WAIT[:###]<br><DELAY[:###]> | Waits 600 milliseconds (.6 seconds) [or waits the number of milliseconds indicated by the number]. |
| 33 | <MINIMIZE WINDOW> | Minimize window. |
| 34 | <MAXIMIZE WINDOW> | Maximize window. |
| 35 | <RESTORE WINDOW> | Restore window. |
| 36 | <CLOSE WINDOW> | Close window. |
| 37 | <NEXT WINDOW> | Next window. |
| 38 | <PREVIOUS WINDOW> | Previous window. |
| 39 | <MOVE WINDOW> | Moves the window. |
| 40 | <SIZE WINDOW> | Sizes the window. |
| 41 | <MONITOR POWER> | Sets the state of the display. This command supports devices that have power-saving features, such as a battery-powered personal computer. |
| 42 | <SCREEN SAVER> | Executes the screen saver application specified in the [boot] section of the SYSTEM.INI file. |
| 43 | <APP EXIT> | Exists the current application. |
| 44 | <CLOSE DOCUMENT> | Close the current document (only for MDI Application). |
| 45 | <MINIMIZE ALL> | Minimize all windows. |
| 46 | <CLOSE APP> | Close the current application (same as Close Window). |
| 47 | <ActiveWord[:WAIT]> | Can be any ActiveWord already existing in any glossary. [If AW is an ActiveWord to launch an application, the WAIT parameter indicates that ActiveWords should wait until the launched app is up and running to continue analyzing the rest of the Action] |
| 48 | <LAST WORD[:##]> | Retrieves the last word from the list of Last Typed Words (LTW) and places it where the current focus is [or retrieves the ## word from the list of LTW]. |
| 49 | <LAST REPLACED WORD[:##]> | Retrieves the last word from the list of Last Replaced Words (LRW) and places it where the current focus is [or retrieves the ## word from the list of LRW]. |
| 50 | <ERASE LAST WORD[:##]> | Deletes the last word typed [or deletes the ## word from the list of LTW]. |
| 51 | <ERASE LAST REPLACED WORD[:##]> | Deletes the last word replaced [or deletes the ## word from the list of LRW]. |
| 52 | <LAST LINE[:##]> | Retrieves the last line from the list of Last Typed Line (LTL) and places it where the current focus is [or retrieves the ## line from the list of LTL]. |
| 53 | <LAST REPLACED LINE[:##]> | Retrieves the last line from the list of Last Replaced Line |

TABLE 1-continued

| | | |
|---|---|---|
| | | (LRL) and places it where the current focus is [or retrieves the ## line from the list of LRL]. |
| 54 | <LAST APP[:##]> | Retrieves the last application name from the list of Last Applications Used (LAU) and places it where the current focus is [or retrieves the ## application name from the list of LAU]. |
| 55 | <LAST AW[:##]> | Retrieves the ActiveWord from the list of Last Typed ActiveWords (LTAW) and places it where the current focus is [or retrieves the ## ActiveWord from the list of LTAW]. |
| 56 | <LAST NESTED AW[:##]> | Retrieves the ActiveWord from the list of Last Replaced ActiveWords (LRAW) and places it where the current focus is [or retrieves the ## ActiveWord from the list of LRAW]. |
| 57 | <LAST DW[:##]> | Retrieves the DualWord from the list of Last Typed DualWords (LTDW) and places it where the current focus is [or retrieves the ## DualWord from the list of LTDW]. |
| 58 | <MORE INFO> | Retrieves information related with the last AW typed, from the Comments field. |
| 59 | <MORB INFO:COMMENTS> | Same as above. |
| 60 | <MORE INFO:ACTION> | Retrieves information with the last AW typed, from the Action field and writes it as a replacement ignoring Type and MarkUp Language tags. |
| 61 | <MORE INFO:COUNT> | Retrieves information related with the last AW typed, from the Count field. |
| 62 | <MORE INFO:NORMAL> | Retrieves information related with the last AW typed, from the DualWord field. |
| 63 | <MORE INFO:EXTRA> | Retrieves information related with the last AW typed, from the eXtra field. |
| 64 | <MORE INFO:MASK> | Retrieves information related with the last AW typed, from the Mask field. |
| 65 | <MORE INFO:CATEGORY> | Retrieves information related with the last AW typed, from the Category field. |
| 66 | <MORE INFO:XID> | Retrieves information related with the last AW typed, from the Xid field. |
| 67 | <MORE INFO:AWAPP> | Retrieves information related with the last AW typed, from the AWApp field. |
| 68 | <NESTED MORE INFO> | Retrieves information related with the last nested AW, from the Comments field. |
| 69 | <NESTED MORE INFO:COMMENTS> | Same as above. |
| 70 | <NESTED MORE INFO:ACTION> | Retrieves information related with the last nested AW, from the Action field and writes it as a replacement ignoring Type and MarkUp Language tags. |
| 71 | <NEXTED MORE INFO:COUNT> | Retrieves information related with the last nested AW, from the Count field. |
| 72 | <NESTED MORE INFO:NORMAL> | Retrieves information related with the last nested AW, from the DualWord field. |
| 73 | <NESTED MORE INFO:EXTRA> | Retrieves information related with the last nested AW, from the eXtra field. |
| 74 | <NESTED MORE INFO:MASK> | Retrieves information related with the last nested AW, from the Mask field. |
| 75 | <NESTED MORE INFO:CATEGORY> | Retrieves information related with the last nested AW, from the Category field. |
| 76 | <NESTED MORE INFO:XID> | Retrieves information related with the last nested AW, from the Xid field. |
| 77 | <NESTED MORE INFO:AWAPP> | Retrieves information related with the last nested AW, from the AWApp field. |
| 78 | <DW MORE INFO> | Retrieves information related with the last DW typed, from the Comments field. |
| 79 | <DW MORE INFO:COMMENTS> | Same as above. |
| 80 | <DW MORE INFO:ACTION> | Retrieves information related with the last DW typed, from the Action field and writes it as a replacement ignoring Type and MarkUp Language tags. |
| 81 | <DW MORE INFO:COUNT> | Retrieves information related with the last DW typed, from the Count field. |
| 82 | <DW MORE INFO:AW> | Retrieves information related with the last DW typed, from the ActiveWord field. |
| 83 | <DW MORE INFO:EXTRA> | Retrieves information related with the last DW typed, from the eXtra field. |
| 84 | <DW MORE INFO:MASK> | Retrieves information related with the last DW typed, from the Mask field. |
| 85 | <DW MORE INFO:CATEGORY> | Retrieves information related with the last DW typed, from the Category field. |
| 86 | <DW MORE INFO:XID> | Retrieves information related with the last DW typed, from the Xid field. |
| 87 | <DW MORE INFO:AWAPP> | Retrieves information related with the last DW typed, from the AWApp field. |
| 88 | <UNDO> | Undoes the last replacement. |

TABLE 1-continued

| | | |
|---|---|---|
| 89 | <DATE> | Inserts the current date. |
| 90 | <TIME> | Inserts the current time. |
| 91 | <SCRATCH PAD> | Brings up a text capturing window. |
| 92 | <DLL:DllName.dll:Function> | Calls the specified function from a .DLL. The Function parameter is case sensitive. |
| 93 | <LAST something[:N(LIST)][:D]> | Applies to all the "LAST" commands (e.g. word, replaced word, line, etc). When a number is specified, the something in the Nth position is returned (normal behavior). The user can also specify a group of elements through a LIST. This list may have any of the forms:<br>1–3<br>1,2,5<br>4–8<br>1,3,5–10<br>If the last parameter is D, the last something(s) are returned with their respective delimiters. |
| 94 | <NOTIFICATION[:Bannertype][Sound file]> | Indicates that a notification must be presented when the term is hit. The Banner Type can be:<br>GO<br>FIND<br>CLOSE<br>If no Banner Type is specified, the default for all other actions is DEFAULT. The user can specify a sound file other than the default. |
| 95 | <ONLY:App1,App2 ...AppN> | Specifies that the current CW and DW should only be executed if they are being called from one of the specified applications. |
| 96 | <NOT:App1,App2 ...AppN> | Specifies that the current CW and DW should not be executed if they are being called from one of the specified applications. |
| | <USER INPUT[:Question]> | Brings up the ScratchPad as a text capturing window, with a user definable question or message. |
| 97 | <INPUT INFO> | Inserts the information captured by the last call to the <USER INPUT> tag within the current script. |
| 98 | <{VARIABLE}> | Replaces the tag for the value specified by VARIABLE, where VARIABLE can be other tags, such as LAST WORD. The result is a new string to be evaluated. |
| 99 | <ED:{VARIABLE}[WORD1, WORD2 ... WORDN]:CWN1, CW2 ... CWN> | Executes the respective CodeWord in positional order depending on the number obtained resolving the VARIABLE, where if the result is 1 (one) the first CW is executed, if 2 (two) the second CW is executed and so on. If the result from resolving the VARIABLE isn't a number, but instead a word, following should be the same number of words to compare the VARIABLEs value, and once again, depending on which word matches, the corresponding CW in positional order is executed. |
| 100 | <WITH: Word15 ... Word2, Word1 \| Word1> | Executes the rest of the script associated with the item containing the DualWord found, only if the previous words match the parameters. Where Word1 should match with the LastWord Typed and so on. Each word separated by a comma is treated as a Boolean AND. Each word seperated by the \| character is treated as a Boolean OR. |

Obviously, the present invention contemplates that the service script syntax and content will expand and evolve. The present invention is not limited to the service scripts provided in TABLE 1. Rather, TABLE 1 is merely exemplary, as should be readily apparent to those skilled in the art.

Figure 12:
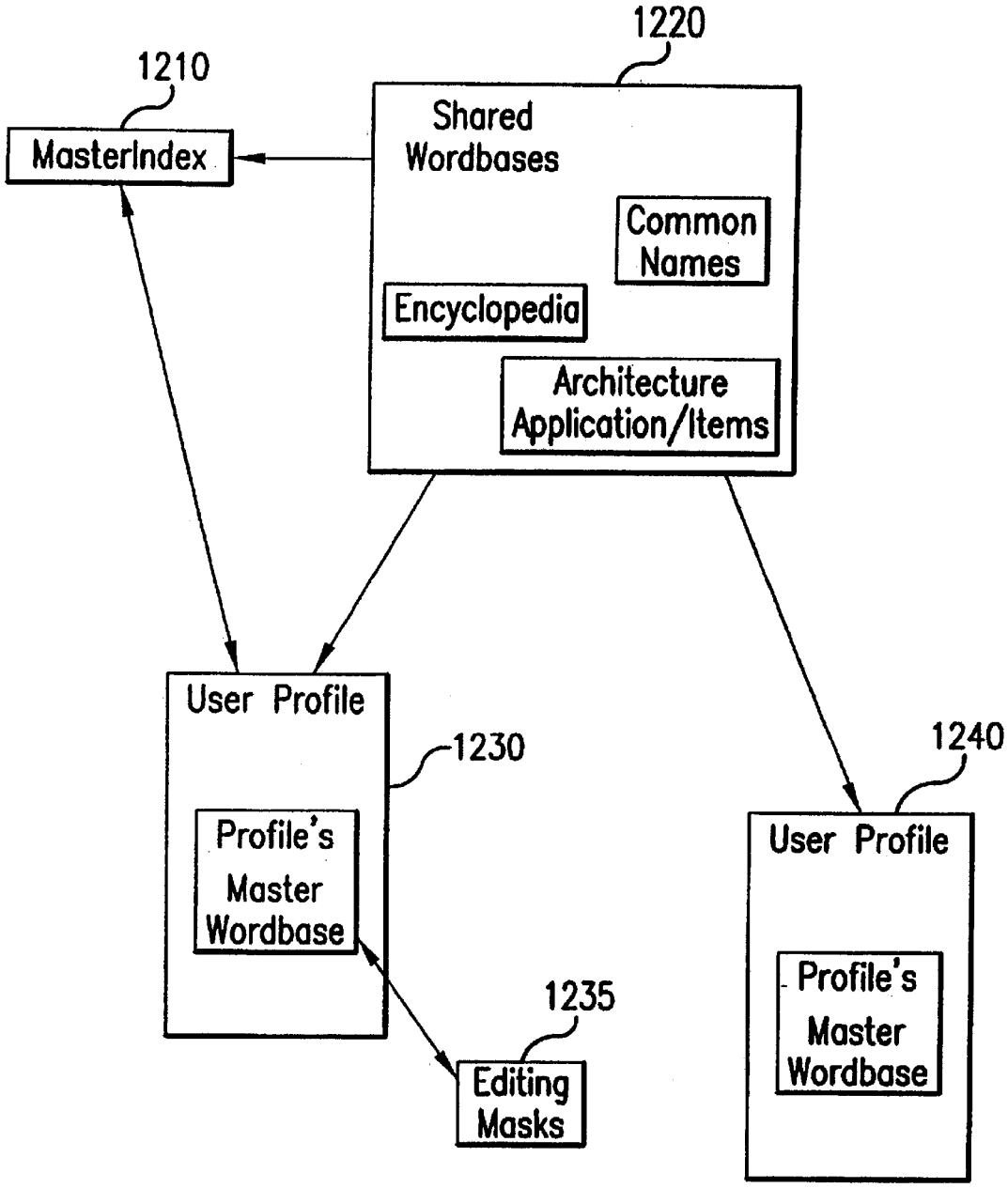
FIG. 12 illustrates the concept of multiple personal profiles.

MIKE 330 supports several users and user profiles. On startup, MIKE 330 checks profiles registry 350. The current user and profile can be changed on-the-fly via either an active word or via an option control associated with monitoring bar 315 (i.e., icon 1470). FIG. 12 is a high level block diagram of a wordbase. It includes two user profiles 1230 and 1240 and a set of shared item records 1220. A list of all the user profiles and shared item records is provided via a master index 1210. The wordbases can be shared among different users on a system. The wordbase 340 may be stored at the network level (e.g., on a server) so that all users can obtain access and are read only. The present invention contemplates that the wordbase 340 will be accessible over a LAN, WAN, as well as other types of networks. Each user profile is a unique view into the shared wordbase that contains everything the user defines as his profile and the settings for these items. An editor 1235 is provided, which can be accessed via a control center 345, as described below, to edit the items contained in the user's profile.

Figure 23:
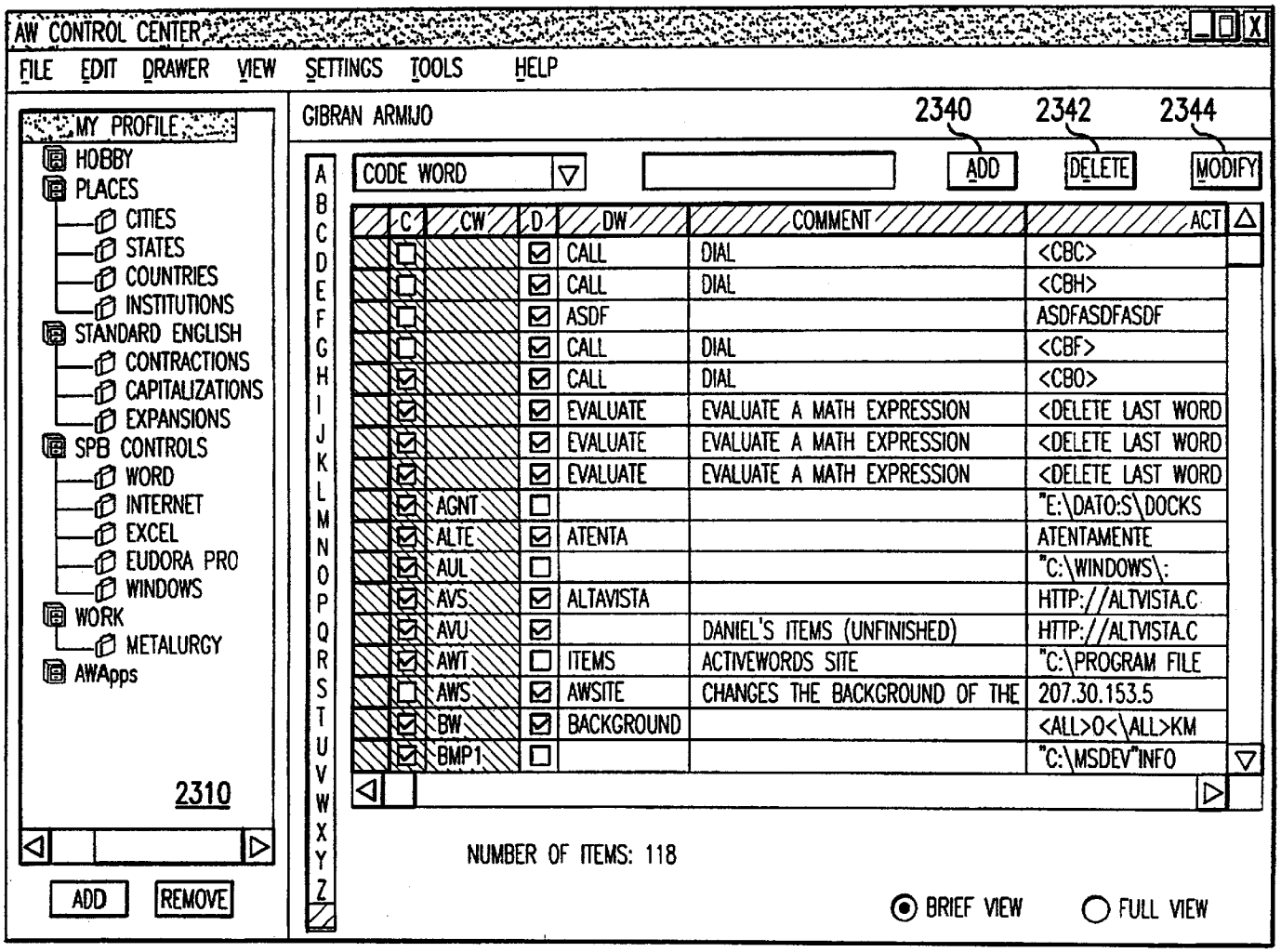

Referring to FIG. 23, a view of wordbase 340 (as displayed by the control center 345) is shown. The master index 1210 is shown in window 2310. The master index 1210 is divided into drawers (e.g., Hobby, Places, etc.) and folders (e.g., Cities, States, etc.). FIG. 23 illustrates only six of the columns within wordbase 340. The columns of the wordbase 340 have bene described with reference to FIG. 21, and for the sake of brevity will not be explained again.

Figure 28:
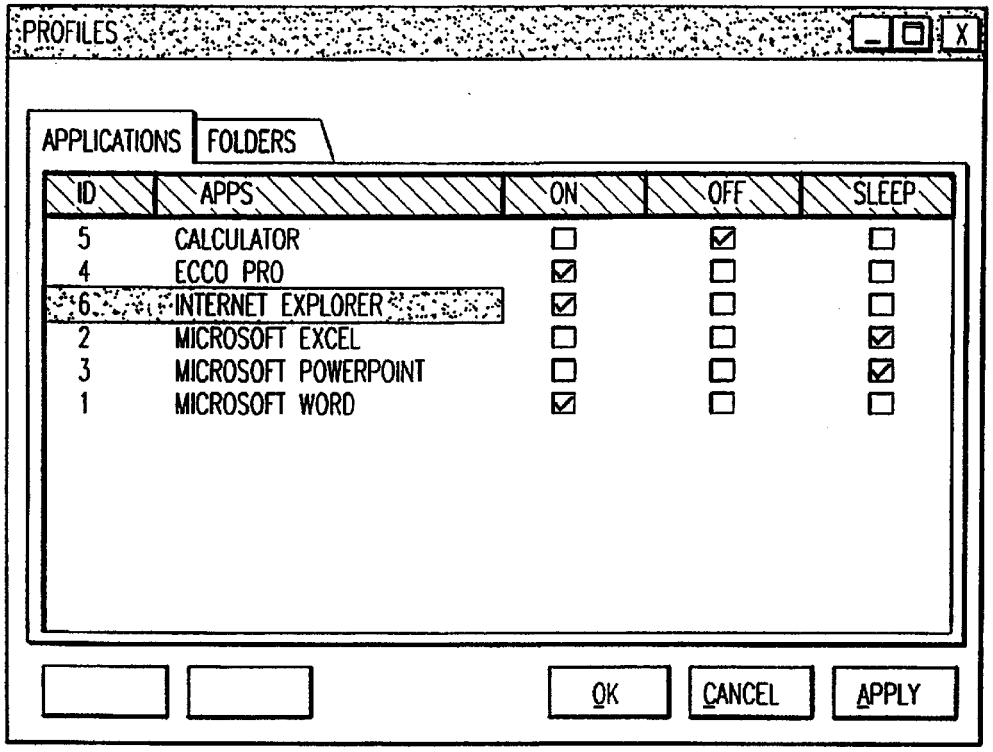

FIG. 28 and FIG. 29 illustrate the concept of user profiles. A user's profile includes a combination of third party applications and wordbase item records, which are located in folders. Different profiles can be created by enabling/disabling the ActiveWords system for certain applications and by turning on/off folders of wordbase item records. Furthermore, drawers and folders can be assigned a priority.

Figure 30:
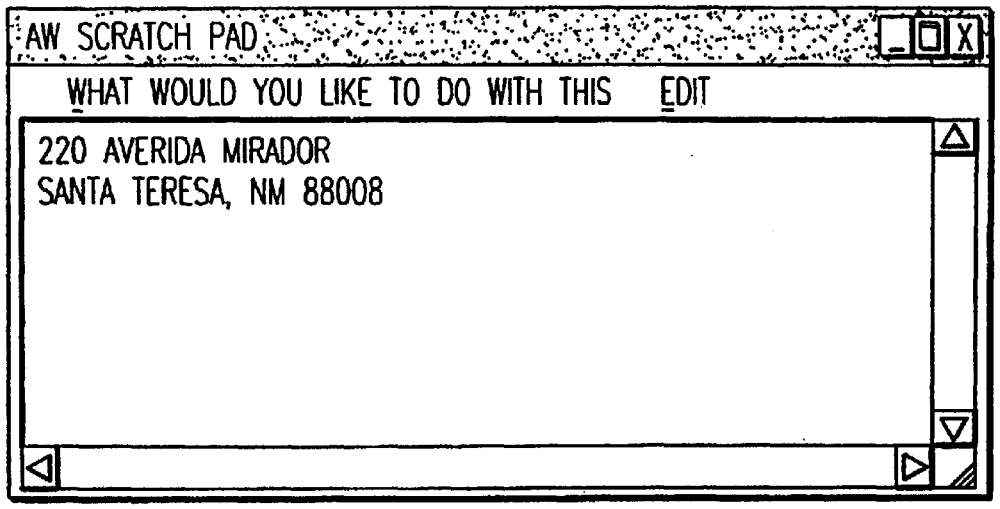
FIG. 30 is a screen shot of the ActiveWords ScratchPad.

FIG. 28 illustrates a list of applications (e.g., Microsoft Word, Ecco Pro, Intranet Explorer, etc.). In a preferred embodiment, the present invention requires a user to configure an application after a user launches the application for the first time. These applications can be configured by the user to be on/off or placed in sleep mode. If an application is on, the ActiveWords system operates as described herein. If the application is off, the ActiveWords system is disabled while the user is using this application, but enabled in other contexts. Sleep mode disables the ActiveWord system, but still allows a user to enter action words via an ActiveWord Scratch Pad (FIG. 30). The Scratch Pad simply provides a text entry field to the user. While in sleep mode, action words entered directly into the application will not be sensed by the ActiveWords system.

FIG. 29 illustrates the drawers and folders that are part of a user profile called "My Profile." Profile names are user assignable. Drawers and folders can be turned on/off. Each folder contains a plurality of wordbase item records. By turning a folder "off," all wordbase item records within the folder are disabled. If a folder is "on" for a given profile, the profile is extended to include the pattern of wordbase item records in the folder that are turned on and off. For example, FIG. 23 illustrates that certain codes words are dual words can be disabled (e.g., the dual word "items" is disabled). Each folder is further assigned a priority. As such, if an code word appears in more than one drawer and folder, the service script within the highest priority drawer/folder will be executed. If a dual word appears in more than one drawer/folder, a preferred embodiment of the present invention provides for multi-item resolution, as described below.

A user can thus create multiple profiles by turning applications, drawers and/or folders on/off and by assigning priorities to each of the drawer/folder combinations. Thus, a user may have several user profiles: one for work, one for entertainment use of his computer, and several for each of his community and hobby interests. The windows shown in FIG. 28 and FIG. 29 are available via the control center 345.

The user profile allows, for example, an English speaking metallurgist who is interested in astronomy, to share a computer with someone having very difficult user profile. His sharing partner may be a French businessman who has an interest in soccer. Their respective user profiles are comprised of different selections (items on or off) and precedence-orders for the Applications in the Word Base.

An English or French user of the ActiveWords system will populate his wordbase 340 with code words and dual words that make sense to him as an English or French speaker. An English speaking metallurgist, for example, would have additional "word-of-art" items records (i.e., action words) related to metallurgy. These metallurgy terms enable the ActiveWords system to provide services tailored to the user's needs as a metallurgist. The user would specify that his metallurgy items records must override any items records that he has in the wordbase 340 for Standard English. Therefore, the service script associated with "steel" in his Metallurgy item record would override the service script associated with "steel" in his wordbase item record for Standard English.

An English [spreading] *speaking* metallurgist would have service scripts associated with the word "mercury" in both his Standard English and Metallurgy Applications. When he is at work, his user profile priority settings tell the ActiveWords system to override associations for "mercury" in his Standard English item record in favor [the] *of his* Metallurgy item record for "mercury." If our English metallurgist is also an amateur astronomer, he might have [an] *a* wordbase item record for [mercury] *Mercury* as part of his ActiveWords Astronomy Application (a hypothetical application). One of his user [profile's] *profiles*, that he uses for his hobby activities, would allow him to give the item records associated with his Astronomy Application precedence over the item records associated with his Standard English and Metallurgy Applications. In that case, any service scripts triggered by the planet name "[mercury] *Mercury*" would take precedence over service scripts triggered by the metal "mercury" in his Metallurgy or Standard English Applications.

In a preferred embodiment, code words and dual words are not sensitive to upper/lower case. As such, "Mercury" and "memory" are handled in exactly the same manner.

The ActiveWords system leverages the precedence-order of words that appear in two or more wordbase items records (i.e., as part of two or more ActiveWords Applications). The system uses the precedence-order in the user profile to determine which service script should be triggered or otherwise given precedence when an action word matches two or more wordbase item records.

In this way, ActiveWords takes the user's universe of meanings and contexts into account, at the level of single-word or multi-word expressions. The ActiveWords system allows the user to designate and manage as many ActiveWords applications and user profiles as he requires.

ActiveWords enables the user to manage and organize his action words. The use of "mercury" above is a good example. In addition to managing its use in three contexts (Standard English, Metallurgy and Astronomy), the user may also wish to have "mercury" capitalized when he uses it as a planet's name. He may also want ActiveWords to substitute "Mercy" for "me." The present invention allows the user to have one place to go and one set of tools for specifying and managing all his uses of a given word or a group of words.

2. Services performed by the ActiveWords System

As discussed above, the ActiveWords system can perform a variety of services in response to an action word, as discussed above. In a preferred embodiment, service scripts are constructed using a combination of these four service types:

(1) Content service—alters the user's text content in some way. Transforming a shorthand word into its longhand form is an example (e.g., typing "ddl" in order to have the ActiveWords system type "due diligence"). The present invention can be set to automatically capitalize the first letter of proper nouns. Hence "tom" is automatically capitalized. Likewise for Washington, January, pluto, easter, lincoln, cobol, etc. From the day the ActiveWords system is installed, the user can forget about capitalizing proper nouns that are common to his natural language and his language(s) of art. Similarly, contractions automatically receive an inserted apostrophe, e.g., can't, won't, couldn't, shouldn't, hadn't, wouldn't, etc. Likewise with hyphenations: user-friendly, client-server, single-keystroke, etc. The ActiveWords system can also automatically corrects double caps at the beginning of a word (occurs when the user accidentally stays on the shift key too long), automatically capitalizes the first letters in sentences, automatically eliminates double spaces between words (if the user wishes) and automatically corrects inadvertent use of the "Caps Lock" key so that "tHIS" is automatically changed to "This."

(2) Information service—assembles and delivers software and information resources to the user's screen (e.g., having the AciveWords system look up a word in a directionary, database or at a website via an internet browser).

(3) Command service—causes an operation to be performed by a software application, a utility program, or by the operating system (e.g., opening a word processor document).

(4) Navigation services—causes navigation within an application or launches an application.

3. MIKE 330

FIG. 4 is a block diagram of MIKE 330. MIKE 330 includes a data manager 410, a fetcher 420, a command interpreter 430, a navigational manager 440, a state table 450 and an agent services modules 460. Once the data has been captured by VID 110, it is sent character by character, to data manager 410. Data can also be entered via a microphone. Three actions occur while the present invention monitors for user input: updating the state table 450, searching for action words and updating an archive (not shown) with the contents of the current text stream.

The data manager 410 is a simple character store that ensures that no character is lost in case the system is busy. It works as a circular or rolling storing list of 200 bytes under a FIFO protocol. Data manager 410 is independent of the stream of inputs stored in an archive (not shown) by the present invention. The purpose of the data manager 410 is to detect an action word. An utterance is cleared by the data manager 410 upon the activation of a delineator. A delineator is a keystroke that signals data manager 410 that a complete set of keystrokes (e.g., word, group of words, number, etc.) has been entered. Example delineators include the pressing of the space bar, change of application context, an end of word punctuation, pressing the right or left buttons on the mouse, or the like. Each time data manager 410 is cleared, it begins monitoring for another action word. The type of delineators used in a preferred embodiment of the present invention is user assignable.

The data manager 410 also sends all characters and special keys (re-transmission of typed characters) from the user's data stream to the command interpreter 430. The command interpreter 430 passes each utterance to fetcher 420. Fetcher 420 is responsible for searching within wordbase 340 for action words. The wordbase 340 is searched after reach delineator (e.g., space, tab comma, other punctuation, etc.) Wordbase 340 is searched to determine whether the utterance is actionable. Paired with each action word in every item record of wordbase 340 is a service script, as described above.

When data is entered via a microphone, the voice signals are recognized by voice recognition software and the generated text is provided to the command interpreter 430 via AW services 460. The present invention further contemplates receiving the translated voice signals via other components and/or drivers. Otherwise, operation of the present invention is analogous to when data is entered via a keyboard or selected via a mouse.

In a preferred embodiment, the fetcher 420 uses the Jet Database Engine to look for utterances inside the wordbase 340. That is, fetcher 420 determines whether the utterance matches an item record within the wordbase 340. If the fetcher 420 finds a match, it sends the action (i.e. service script), type, comments, and information fields associated with the action word to the command interpreter 430.

The command interpreter 430 executes service scripts associated with an action word. The command interpreter 430 sends all keyboard related actions (replacements, special keys, and the like) associated with fetched action words through the VID 110 to the applications 118. For example, when the action word entered by the user requires a substitution (e.g., "June" to "June"), the command interpreter 430 forwards the replacement text to the application program (e.g., wordprocessor) via VID 110.

The data manager 410 can also activate an action box 470. The action box 470 is also referred to herein as a scratch pad (FIG. 30). The action box 470 notifies the data manager 410 when any of its options or related actions are executed. The action box is a dialog feature for general purposes, such as inputting text in response to a request from a service script. In its most common use, the scratch pad is a window that enables a user to enter action words when the user does not want to enter text into his foremost application. The display of a window in which text can be entered and selected is well known in the art.

The data manager 410 sends the typed characters (converted from ScanCodes to characters), feedback messages, control changes, and activity indicators to the monitoring bar 315. The monitoring bar 315 sends notifications of changes to control option settings the user issues to the data manager 410 via the monitoring bar's icons or pull down menu.

The data manager 410 notifies the command interpreter 430 when a delineator is detected. This indicates that the user has completed inputting a complete utterance that needs to be matched against the item records in the wordbase 340 to determine if it is in action word. The command interpreter 430 fir compares each word with a list of integrated action words, which are stored locally within the command interpreter 430. Integrated action words are special action words for controlling various functions directly relating to the user's computer or the ActionWords system, such as temporarily deactivating the present invention for the next word thus preventing the next word from being matched against the wordbase 340. This is referred to as putting the monitoring bar to sleep. The present invention also contemplates designating certain common spelling mistakes or proper nouns as integrated action words. For example "tHe" can be automatically replaced with "The" without having to access the wordbase 340. If it is not an integrated active word, it sends the word to the fetcher 420 so it can check the wordbase 340 for a match with the action word.

If a match is detected by the fetcher 420, the command interpreter 430 notifies the data manager 410 of the type of service script (e.g.,substitution, control, navigation, in-place transformation) associated with the action word. If the service script calls for a text substitution, the command interpreter 430 also sends the replacement text to the data manager 410 for further processing (e.g., to act on another action word embedded in the scrip).

Command interpreter 430 receives the service scripts that fetcher 420 locates within wordbase 340 and proceeds to interpret them. A service script is made up of a series of commands which can range from a simple word replacement to a call to an application program. Scripts also allows the present invention to use the functionality included in agents 370 or application programs 118. For example, a third-party PIM application can directly insert, using Microsoft OCX controls, an appointment into their database using their own insertion function by simply making a call from the service script. This is a powerful and simple way, via the ActiveWords system, for the user to leverage the capabilities of third-party functionality.

Figure 18:
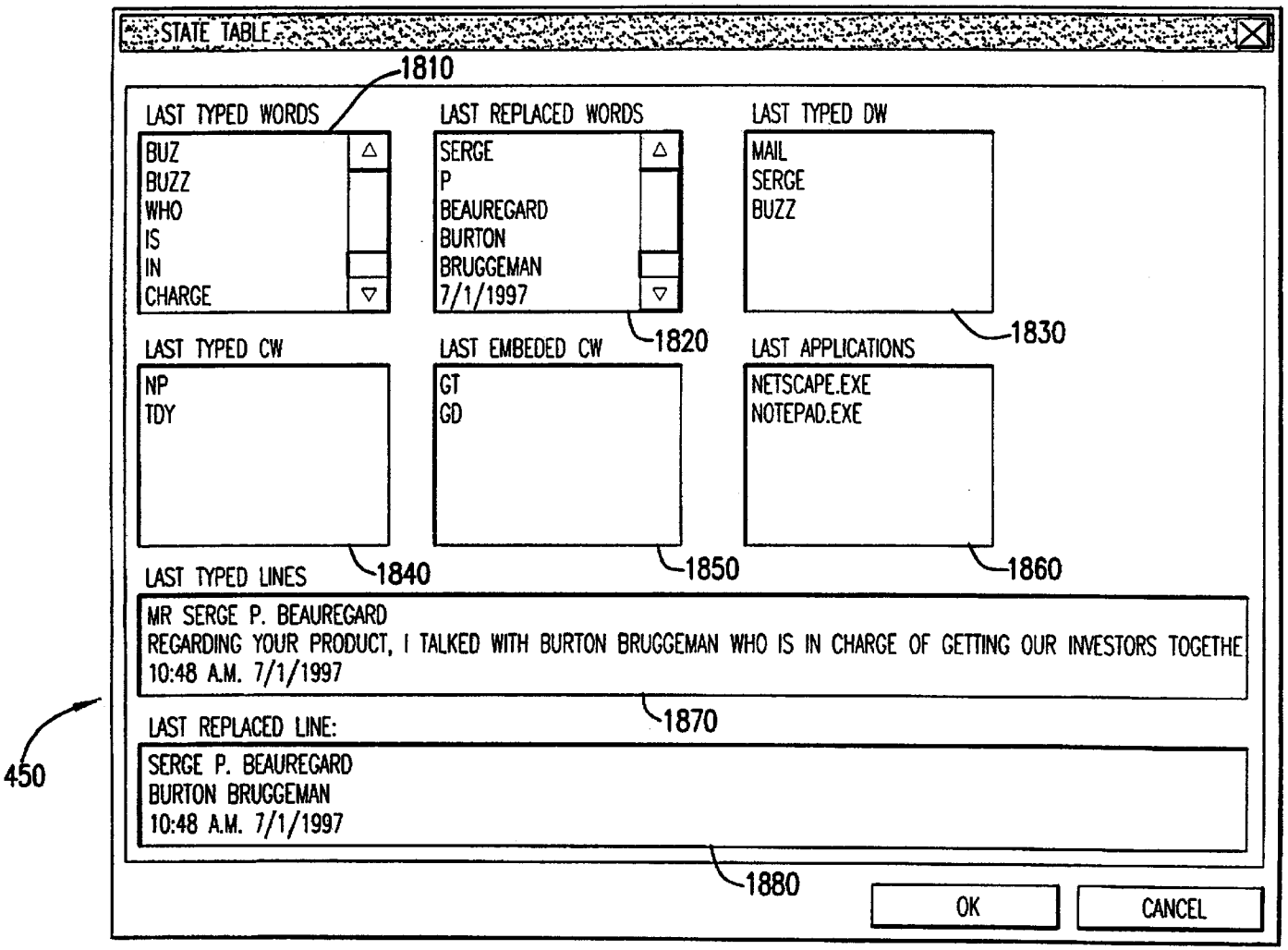
FIG. 18 is a screen shot of a state table in accordance with the present invention.

The state table 450 provides information to application programs 118 and agents 370 via ActiveWords (AW) agent services 460 and Win95 messaging system 405. The information includes data about the user's typed/replaced text stream and the user's foremost environment (e.g., program, window, document) at the time an action word is sensed. It is a circular structure that contains lists of the last W words typed, the last X words replaced, the last Y code words typed or embedded, last Z liens typed or replaced. In a preferred embodiment, W, X and Y are set to 15 and Z is set to 1. However, W, X, Y and Z are user configurable. FIG. 18, which is described in greater detail below, illustrates a screen shot of a window that is displaying the state table 450.

The AW agent services are a set of functions and commands offered by the MIKE 330 to the application programs 118 and agents 370. These functions can retrieve information from MIKE 330, send information to the MIKE 330, set behavior, conditions and settings of MIKE 330. The AW agent services 460 and the agents 370 communicate with each other through the Windows 95 messaging system 405. Agents 370 also communicate with applications 118 (e.g., wordprocessors, spreadsheets, etc.) through the Widnows 95 messaging system 405. Through this channel the agents 370 can request information or execute an action (such as fetch an action word and execute its associated service script or paste text to the current application) from MIKE 330. MIKE 330 further uses the Windows 95 messaging system 405 to act on applications, such as minimizing and maximizing windows.

Navigation manager 440 receives commands from command interpreter 430 regarding the launching, closing, and navigation of documents, applications, folders, links, URL's, and the behavior of windows. Navigational manager 440 communicates with applications via the Win95 Messaging system 405.

4. Monitor 1109

Figure 17:
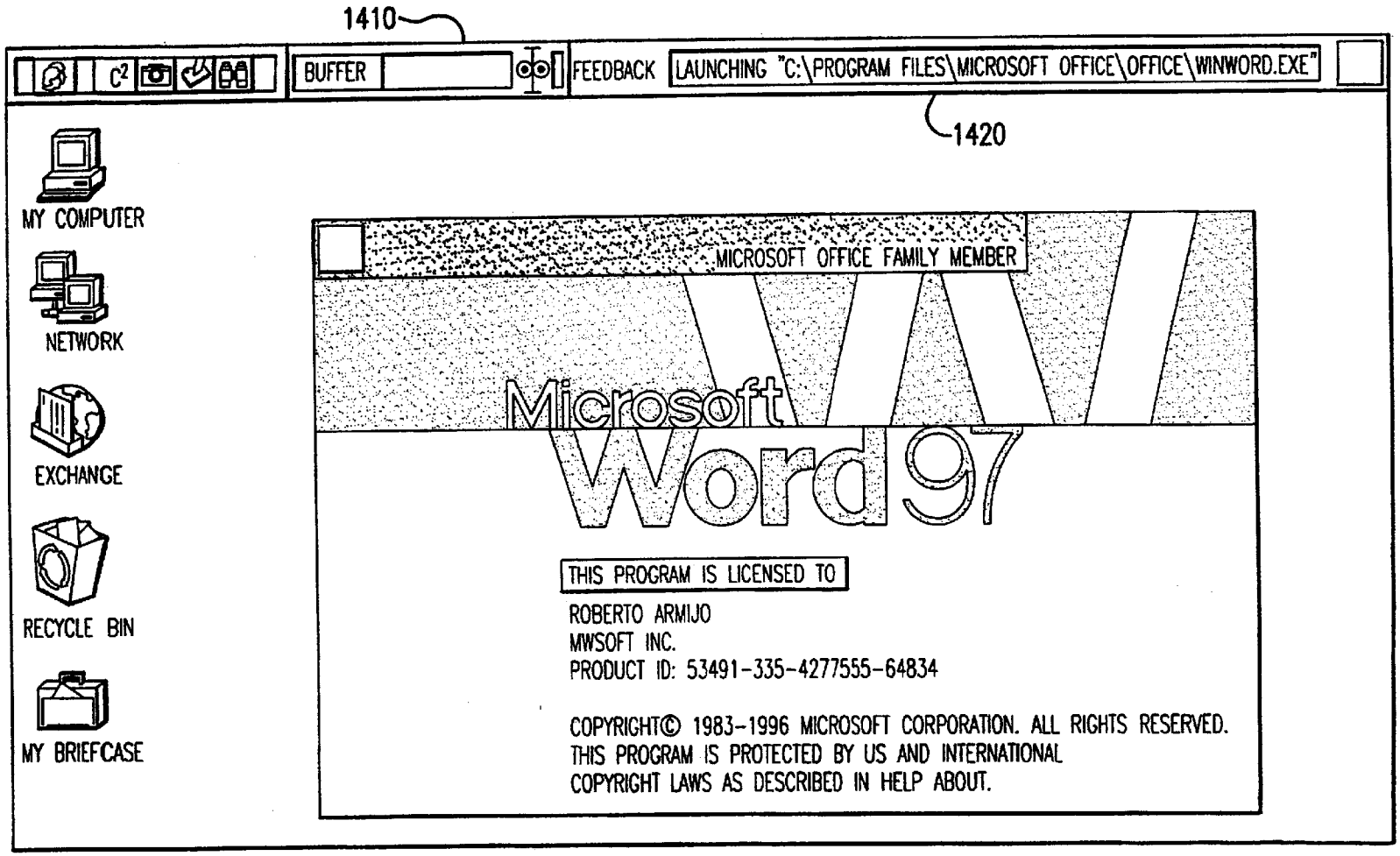
FIG. 17 illustrates the launching of Microsoft Word 97.

Monitor VID 110 is graphically represented to the user in accordance with the present invention via a monitoring bar 315, as shown in FIG. 14. The monitoring bar 315 has two data fields: text field 1410 and feedback field 1420. The text field 1410 contains the symbol, character or word currently typed (i.e., prior to a space bar being pressed by the user or typing any other user-defined delimiter). The feedback field 1420 provides an indication, when appropriate, of the script being executed. The launching of Microsoft Word 97 is shown in FIG. 17. The feedback field 1420 illustrates the a script that is performed to launch this application program. The feedback field 1420 can also be used to display "hints" to the user for using the present invention. For example, the message "use d for and" can be displayed to tell the user that typing the letter "d" can be typed and the ActiveWords system will replace the "d" with "and".

The monitoring bar 315 further includes a number of other icons. Icon 430, shown as $C^c$, provides the user with access to a control center 345, which is described below. Icon 1470 allwos a user to change his user profile.

Icon 1440 provides access to a LightEditor, which is shown in FIG. 19. The LightEditor allows a user to make quick, simple changes to a wordbase 340, such as adding or modifying items in the wordbase 340 or consulting an existing item in the wordbase 340. The LightEditor can also be activated by dragging and dropping a shortcut to file, folder or program onto monitoring bar 315. The user then specifies the action word that, when typed by the user, will launch that file, folder or program.

The LightEditor allows a user to create and add an action word and its service script to the wordbase 340. In a preferred embodiment, the LightEditor is called from the monitoring bar 315, either from an icon 1440 or from an option in the pull-down menu. It can also be called via an action word. The LightEditor is similar to the editing mask in the Control Center 345. It contains several fields for user input, as well as buttons for actions related with the contents of the various field that comprise a wordbase item record. The first two fields 1910 and 1920 are where the user specifies the code word and dual word, respectively, for that item. Each of these fields can be activated or de-activated through a check box 1915 and 1925. If either of these fields are empty, the corresponding check box is not checked. As soon as the user types in an empty field, the corresponding check box is automatically checked. The check mark tells the system to monitor the text stream for that word and to perform the service script when that word is encountered.

The user has to specify in what Drawer/Folder a new item is to be inserted in field 1930. When editing, the user can modify the destination of the item (i.e., move an item from one drawer/folder to another). The LightEditor pre-selects the action type (also referred to as a service type) within field 1940 related with a new action word, depending on how the LightEditor was activated. If the LightEditor was activated via a drag and drop operation by the user, navigation is selected. On the other hand, if it is activated through a icon on the monitoring bar 315, text substitution is selected. The user can change the action type by selecting one of the displayed action type categories via a mouse. When the action type is selected, the wordbase browser software enables the user to find the desired application, document, or link to be associated with that action word. The action type also enables the browser to select the correct editing mask for making additions or changes to that wordbase item record at a later time.

Icon 1450 provides the user with a find function that allwos a user to find any word or set of words stored within his current wordbase 340. FIG. 26 illustrates a window that allows the user to enter one or more words to be located via a searching algorithm. Searching algorithms are well known in the art, and for the sake of brevity will not be described herein. Icon 1480 provides an advanced find feature (FIG. 25), which is available via the control center 345. The advanced find feature allows a more granular level of searching (e.g., searching between two dates). Activation of icon 1480 also launches the control center 345. Icon 1490 allows a user to select text, e.g., from a notepad, spreadsheet, e-mail, word processing document, etc., and search the wordbase 340 for the selected text to determine whether it is an action word.

Figure 15:
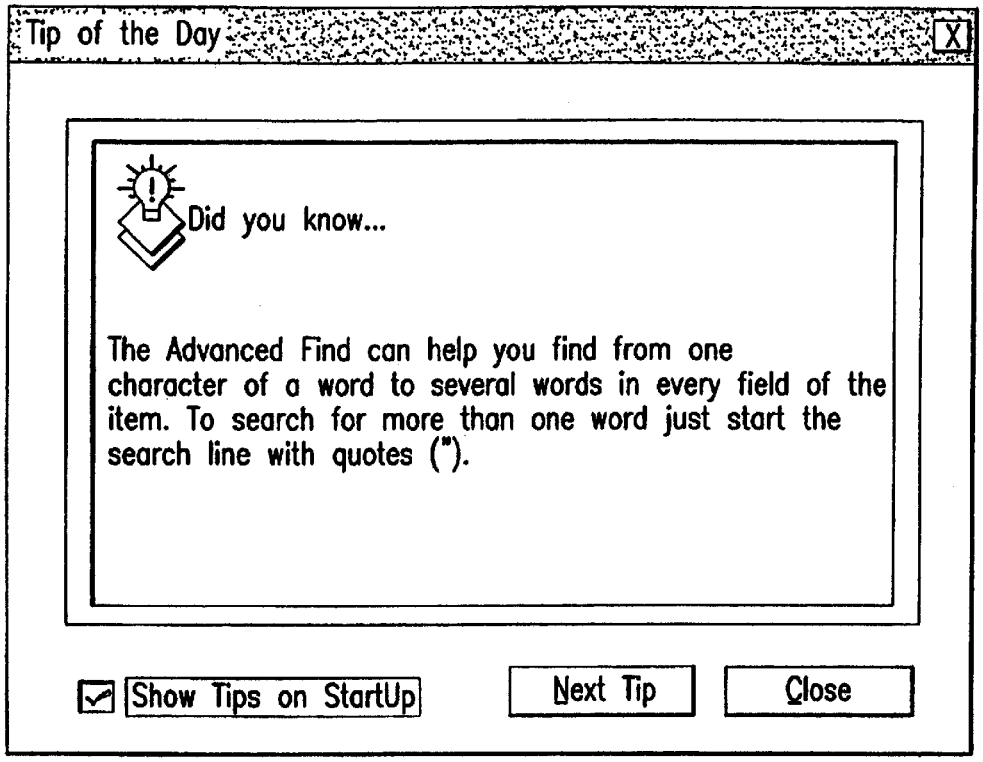
FIG. 15 is a screen shot of a window that displays a "Tip" that allows a user to become acquainted with the functions of the present invention.

Icon 1460 is referred to as a "Mr. IBeam." Mr. IBeam is cartoon character comprised of a vertical line with a pair of graphically displayed eye glasses that cover a pair of eyes that move. Mr. IBeam is designed to be a focal point to provide the user with feedback regarding his text stream and action words. For example, if the feedback field 1420 displays a "hint," the pair of eyes will shift to look towards this field. Icon 1415 provides access to "tips" to aid the user in using the ActiveWords System, as well as Mr. IBeams productivity center. An exemplary tip is shown in FIG. 15.

Figure 11:
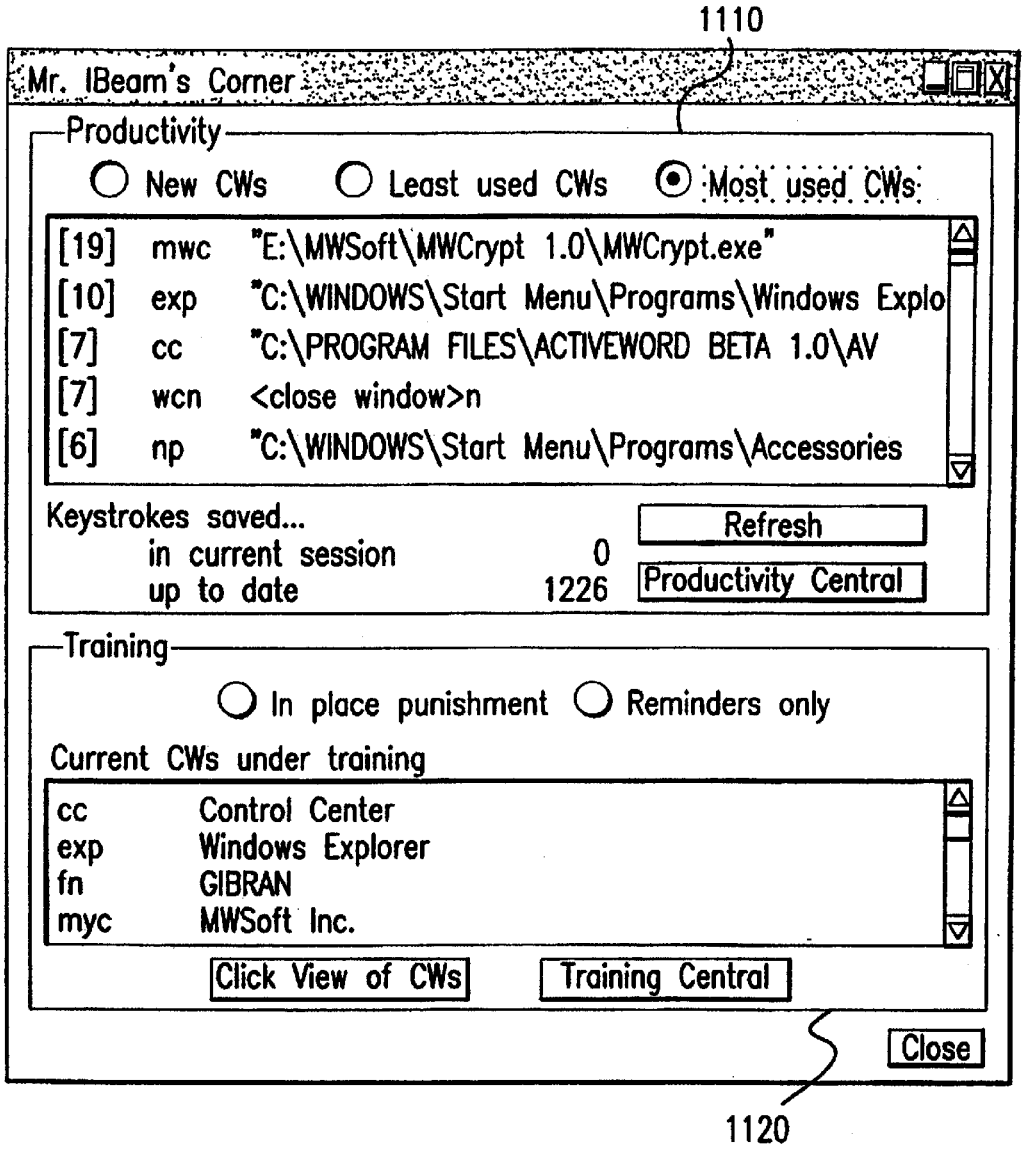
FIG. 11 is a screen shot of a window that displays Mr. IBeams corner, which provides feedback to the user regarding their use of the present invention.

FIG. 11 illustrates Mr. IBeams productivity center, which allows a user to optimize his use of the present invention. Mr. IBeams productivity center has two windows: productivity window 1110 and training window 1120. The productivity window 1110 allows a user to view his least and most used code words. It further allows a user to view his most recently created (new) code words. The productivity window 1110 further shows the number of keystrokes saved as a result of using the text substitution capabilities of the present invention during a current work session, as well as the number of keystrokes saved from the day ActiveWords was installed. Although only code words are shown in FIG. 11, dual words, or action words generally, could also be displayed.

The productivity center can also provide feedback to the user regarding application programs and/or text that do not currently have an action word associated therewith. In other words, the present invention provides feedback to the user regarding which application programs or utterances should be assigned an action word to make the user more productive. For example, the productivity center may inform the user that she used the utterance "productivity" 75 times during a session. Accordingly, the user may want to substitute the code word "prod" to perform a substitution to the word "productivity."

Mr. IBeams productivity center also provides a mechanism for allowing a user to select training option. For example, a user can select a subset of training code words. The system can then be configured to provide "in-place punishment" (e.g., requiring you to erase the inputted text and enter the code word) or just a reminder that a code word is available (e.g., a banner). Training can also be applied to dual words or actions words generally. Training thus conditions the user, using operant training techniques, to utilize the present invention in a reflexive manner.

The present invention is also configured in a preferred embodiment to coach the user about how to leverage its text substitution capabilities. It will tell the user which utterances to abbreviate via code words. It will also analyze documents of his choice to determine which words-of-art should have shorthand equivalents. Each word in his wordbase 340 is assigned a savings index based on how often it occurs in the average text, modified by how often it occurred in the user's text files. The present invention will estimate the keystroke savings that can be achieved by implementing the advice.

A training agent (not shown) is also provided, which enables the user to ask the present invention for help in learning the shorthand, x words at a time. For example, if the user specifies that he wants to learn 3 substitution words at a time, the application will then pick the three words that have the highest savings index and substitute "!Active Word!" each time he types the full text of the words he wants to lean the shorthand for. For example, if he types "this," the present invention will substitute the user's defined shorthand, "!it⇆". He then has to backspace over "!it!" and type "ti" in order to have the ActiveWords system substitute the text "this".

After the user has learned the shorthand for a word, by typing the code word correctly ten times in a row (for example), the present invention will turn the training off for that word. It will then turn training on for the three words that has the next largest savings index value. This process can continue indefinitely.

The user specifies how he wants the training agent to work. He can override the defaults to designate the number of words he wants to learn at a time, the number of correct code words in a row that turn off training for a given word, and the error notification pattern (e.g., "!it!") above the trainer should use when he types the full word instead of it's code word. The training agent will quickly make the user reflexive in his use of code words.

Figure 16:
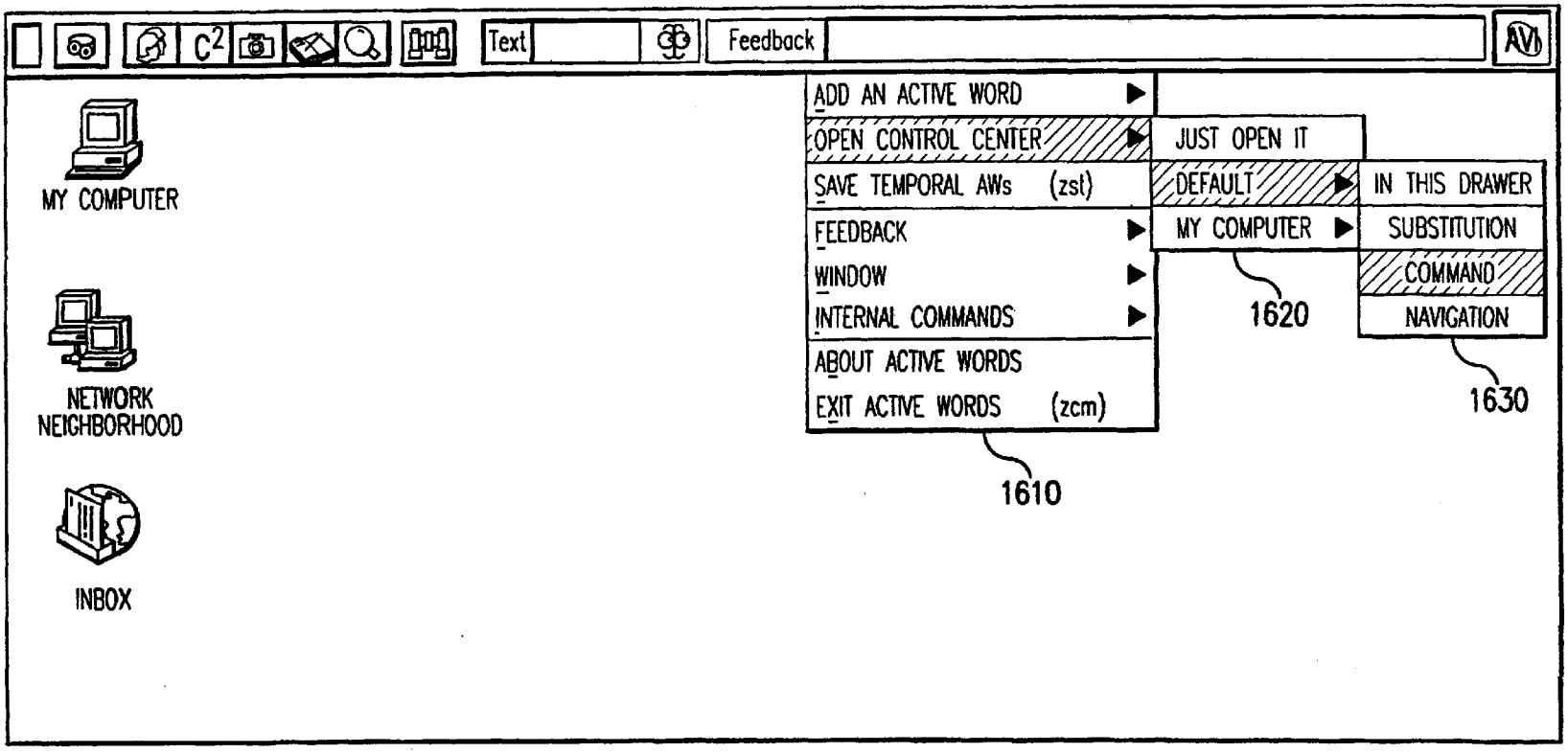
FIG. 16 illustrates a screen shot of the monitoring bar along with a plurality of associated pull-down menus.

FIG. 16 illustrates a set of pull-down window that are associated with the monitoring bar 315 that can be activated, for example, by pressing the right button on a user's mouse. Window 1610 allows a user to add an active word, open the control center 345, save a temporary active words, adjust the feedback mechanism, change the monitoring bar settings, view internal active words, information about active words, and exit the program. Obviously, other menu selections can be provided.

Figure 24:
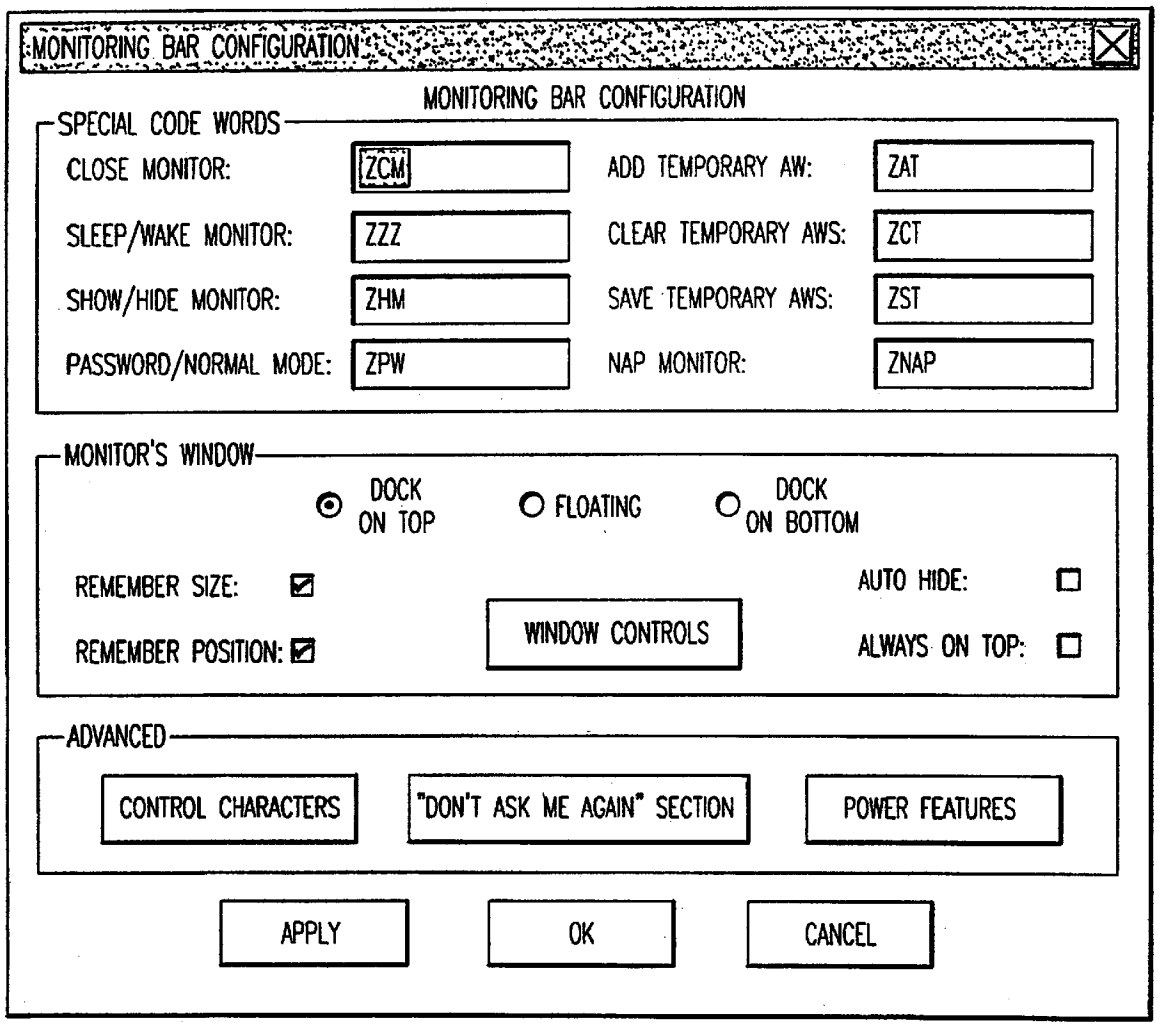
FIG. 24 is a screen shot of a window that allows a user to configure the monitor bar.

FIG. 24 illustrates a window that allows a user to configure the monitoring bar 315. Special code words can be assigned for closing the monitoring bar 315, placing the monitoring bar 315 in sleep mode and hiding the monitoring bar 315. The monitoring bar 315 can also be set so certain words, such as a password. Temporary action words can also be added via the configuration window. Other controls, not relevant to the present invention, can also be provided, as should be readily apparent to one skilled in the art.

5. State Table 450

State table 450 is a storage file of fixed length, storing data that has been entered by a user. The state table 450 is made available to any application program 118 or agent 370. FIG. 18 illustrates state table 450.

Window 1810 displays the last fifteen typed words. Window 1820 displays the last fifteen replaced words. Window 1830 displays the last fifteen typed content words. Window 1840 displays the last fifteen typed action words. Window 1850 displays the last fifteen embedded action word (i.e., an action word that is selected via a mouse). Window 1860 displays the last fifteen applications launched. Window 1870 displays the last fifteen lines of text as entered by the user (including the net result of all substitutions). Window 1880 displays the last fifteen lines that included replaced text.

The state table 450 also stores a list of all end of word punctuation, the name of the foremost application, the name of the foremost document and the time and date of each entry in the state table. The numbers provided above (e.g., last fifteen dual words) are arbitrary. Furthermore, the state table 450 can store other information as should be readily apparent to one skilled in the art.

6. Archiving User Text

The archiving agent (not shown) play a critical role in the overall operation of the present invention. An important part of the personality profile of each user is contained within the archived information. The archive also provides the information upon which all statistical analysis is performed.

The basic block of archived text is that text that is captured during a session. A session is defined to be all the content words and keystrokes input via the user into the computer uninterrupted in an application. Switching from one application to another starts another session and creates another archive block of text. After that, all blocks will be indexed by date (day, week, month and year). (Note that content words are sometimes placed within a text stream via an action word that performs substitution. For example, "wsj" can be a code word for wall street journal. After replacement, the content words "wall street journal" becomes part of the users text stream, and thus part of an archived text block.)

Figure 2:
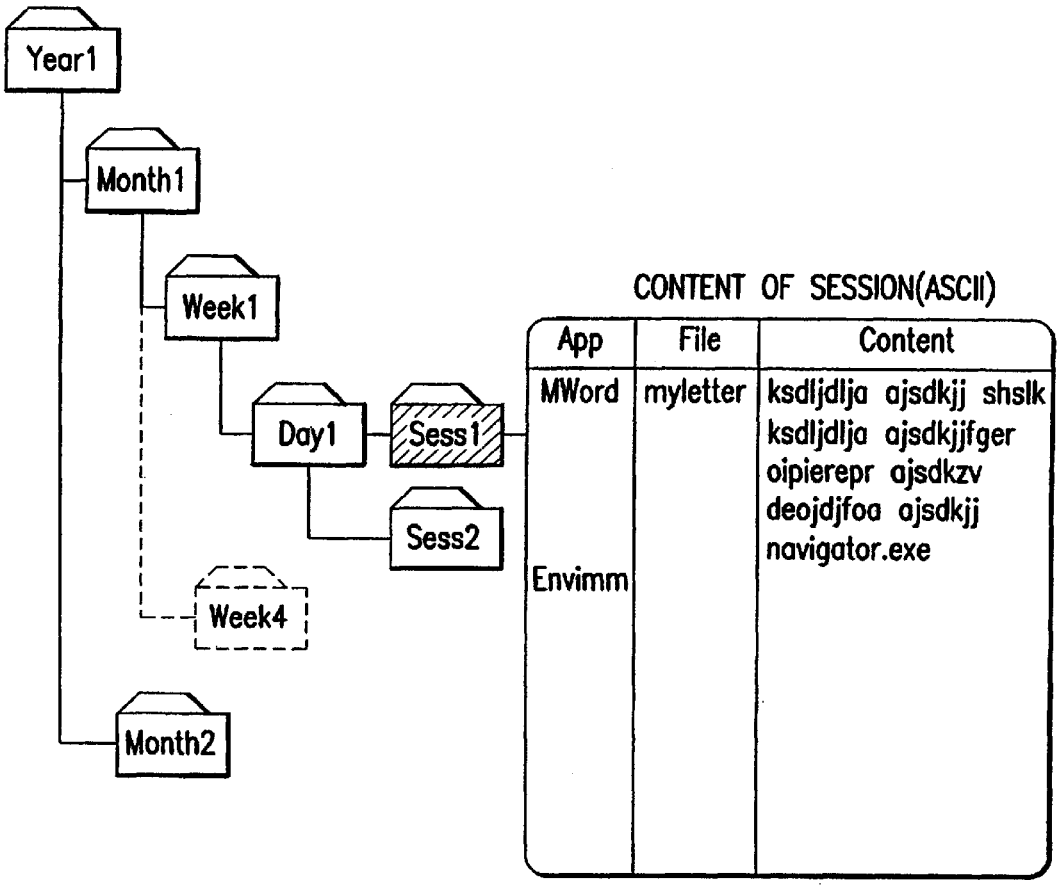
FIG. 2 illustrates an archive generated in accordance with the present invention.

FIG. 2 illustrates the full index hierarchy of the archive. In particular, the contents of the session are stored in records. Each record contains the actual text stream and a tag identifying the application and file that were foremost when the text block was archived. Furthermore, each record has an associated timestamp. Text segments captured during a user's session are thus stored based on these three categories. This data structure permits a user to precisely locate information, oftentimes created months or years before, in a minimum amount of time and effort.

In a preferred embodiment, in the context of the archive tags, a full search capability is provided. Since the information is application stamped, a detailed reference is available. A full sort capability is provided when a user chooses to display the archive as a table.

Figure 13:
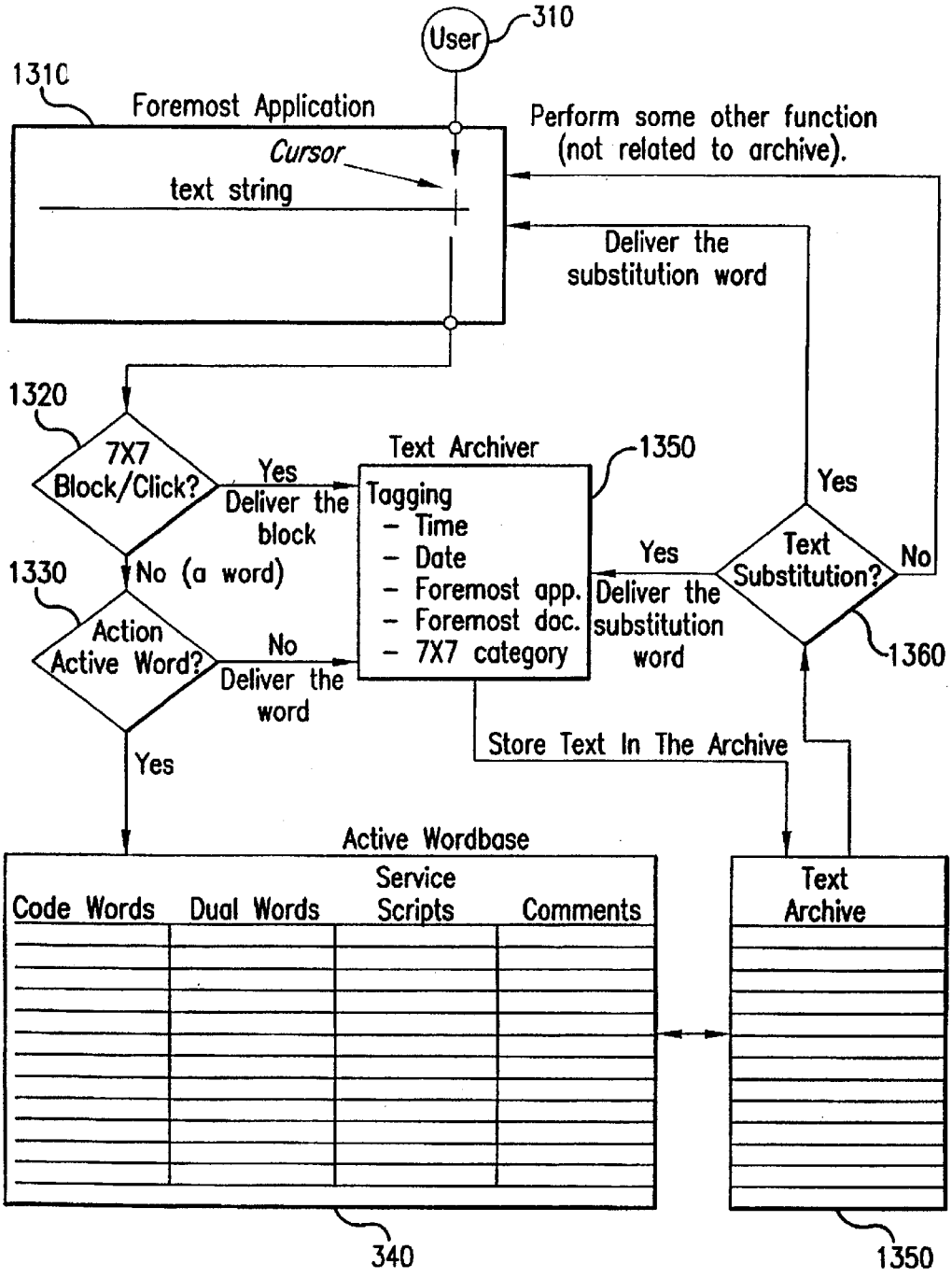
FIG. 13 is a flowchart that illustrates how the ActiveWords archive is populated with data in accordance with the present invention.

FIG. 13 is a block flow diagram that illustrates the concept of the ActiveWords archive. The user 310 enters a text string, as shown in block 1310. First, the present invention determines whether the word should be stored in a 7×7 category in block 1320. If so, the inputted text is stored in the 7×7 category. The present invention provides seven user-assignable categories. Each category, in turn, has seven sub-categories. The ActiveWords system automatically makes a default code word by using the first letter of the category name and the first two letters of the sub-category name. This scheme provides forty-nine (49) user-assignable storage/retrieval files. The user can rapidly model and accomplish his casual filing requirements using his 49 categories. He can change them on a going-forward basis at any time. He may also change the default code words to any action words (code words and/or dual words) he wishes to use.

At any later time, the user can search the 7×7 archive for anyword. The ActiveWords system can indicate where in the text stream that word appears (in the context of text tags) The user can also directly access the 7×7 files and read the entries chronologically, by category/subcategory.

This is a very powerful facility for quickly taking and organizing notes. The user does this for one of two reasons. One, he is not sure if he will ever need that information again but quickly files it away by category just in case. If he had to go to the trouble of accessing an application or utility program to record such notes, he might not take the trouble. A traveling businessman might take casual notes of his sort about the restaurants and hotels he visits in his travels. Two, a field researcher would use this to take note of observations that occur while he is working in different applications in his computer, not wanting to take the time to open a special utility of application for recording the note. He might use some or all of the available forty-nine categories for various aspects of his research projects.

A person may use the 7×7 to stage information for later review and for entry into some other application. A presenter, for example, would rapidly record notes this way while making presentations at client meetings using Microsoft's PowerPoint application. The 7×7 allows him to take quick notes without leaving PowerPoint. In this case, he is quickly staging his notes in a temporary location, 7×7 category/subcategory, for later disposition. Later on, in the evening, he'll review his staged notes and move them to whatever application he wishes for later follow-up. No matter where he moves that information, a permanent record of those notes are maintained and indexed according to the user's 7×7 tags. This information is then available for later retrieval in the ActiveWords archive.

The choice of seven categories and seven sub-categorize is not accidental. Human factors research has established the "Seven Plus or Minus Two Rule." Research has shown that people can only reliably remember on-the-fly information that is chunked in clusters of seven plus or minus two items or categories. That is why, for example, telephone numbers are chucks of three and four digit groupings. The 7×7 Repository was designed to provide the user with a powerful archive and retrieval resource for casual or staged information. Although a 7×7 data repository is used in the preferred embodiment, the present invention contemplates any number of categories or subcategories.

In one embodiment, an icon (not shown) is provided on the monitoring bar 315 for storing information into the archive using the 7×7 category tags. For example, the icon would result in a pull-down menu that allows a user to select a category/subcategory. In an alternated embodiment, one or more action words are used to store text into the 7×7 category/subcategory. For example, a first action word designates a specific category/subcategory, as well as indicating that the ActionWords system should start storing the entered text stream into the specified category/subcategory. A second action word would inform the ActiveWords system to stop storing the entered text stream. Other mechanisms can be provided to select the 7×7 function as should be readily apparent to one skilled in the art.

If 7×7 storage is not selected, the process continues to block 1330. The present invention next determines whether the user's inputted word is an action word, as shown in block 1330. If not, it is a content word intended for the user's application. Accordingly, the word is delivered to text archive 1350. The information archived includes:

(1) All text typed by the user (includes substitutions and does not include any action words text, which the present invention erases from the stream of content words);

(2) A tag identifying the application that received the text;

(3) A tag identifying the document that received the text; and (4) A tag identifying the time and date (strings of words are entered into the archive and time stamped when the user enters or exit's an application).

The information in the archive becomes part of the user profile. The present invention provides tools for searching that archive, which take advantage of the tags it has stored in the archive along with the text. For example, the user can search the archive for the word "Italian," looking for an Italian restaurant he dined at in Vancouver, sometimes last year. Occurrences of "Italian" that appear in conjunction with his expense or calendar applications (tags identify the applications and documents) are good bets for finding a reference to the restaurant he is looking for. He only wants the reference information and has no need to use the applications themselves to search through all his documents.

At this point, no further functions need to be performed and the system begins to monitor for the next letter, symbol or word. If the word was an action word, and it call for a text substitution, the content of the substitution is stored in the archive along with the context tags, as shown by block 1360. Otherwise, the function associated with the action word is performed and nothing is added to the archive.

The information stored in the archive is available for ad hoc retrieval using the context tags recorded along with the users text content. The context information provided by the tags makes for very efficient search and retrieval of the user's historical word product. Recording the input into the archive is automatic, and, therefore, effortless to the user.

7. The Control Center

Figure 5:
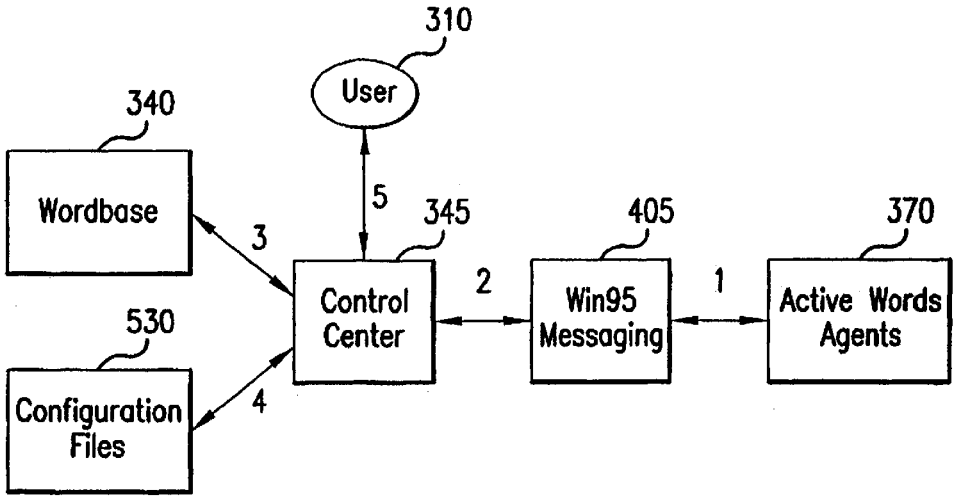
FIG. 5 illustrates the interaction of a control center, which is a central place to manage the present invention, with the other components of the present invention.

The user 310 dan control the operation of the present invention by setting parameters associated with action words and by reading and writing information to the wordbase 340 via a control center 345, as shown in FIG. 5. The control center 345 is a single place to manage the wordbase 340, the wordbase item records an various aspects of the SUI. Wordbase item records can be added, modified or deleted via the control center 345. The control center provides organizing tools and editors for working with item records within the wordbase 340. The control center 345 further allows the user to configure the ActiveWords system.

The control center 345 uses the windows messaging system 405 to receive the actions to perform and to return all the requested data. All agents 370 use the windows messaging system 405 to communicate with the control center 345. The configuration file 530 stores information relating to either default settings and/or a user's unique setting for his system. The configuration file 530, as well as the wordbase 340, is portable from one computer to another.

Figure 6:
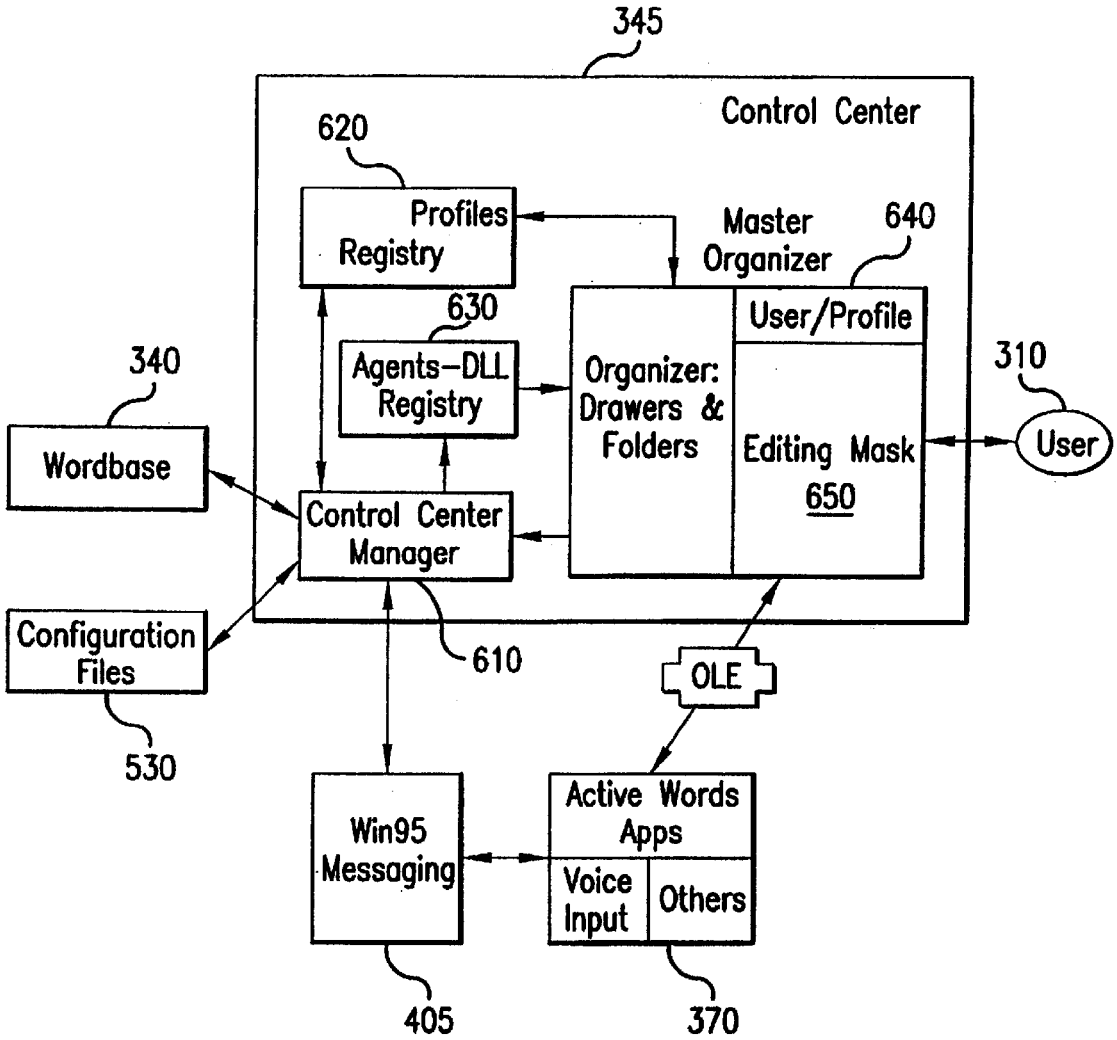
FIG. 6 is a block diagram of the control center.
Figure 20:
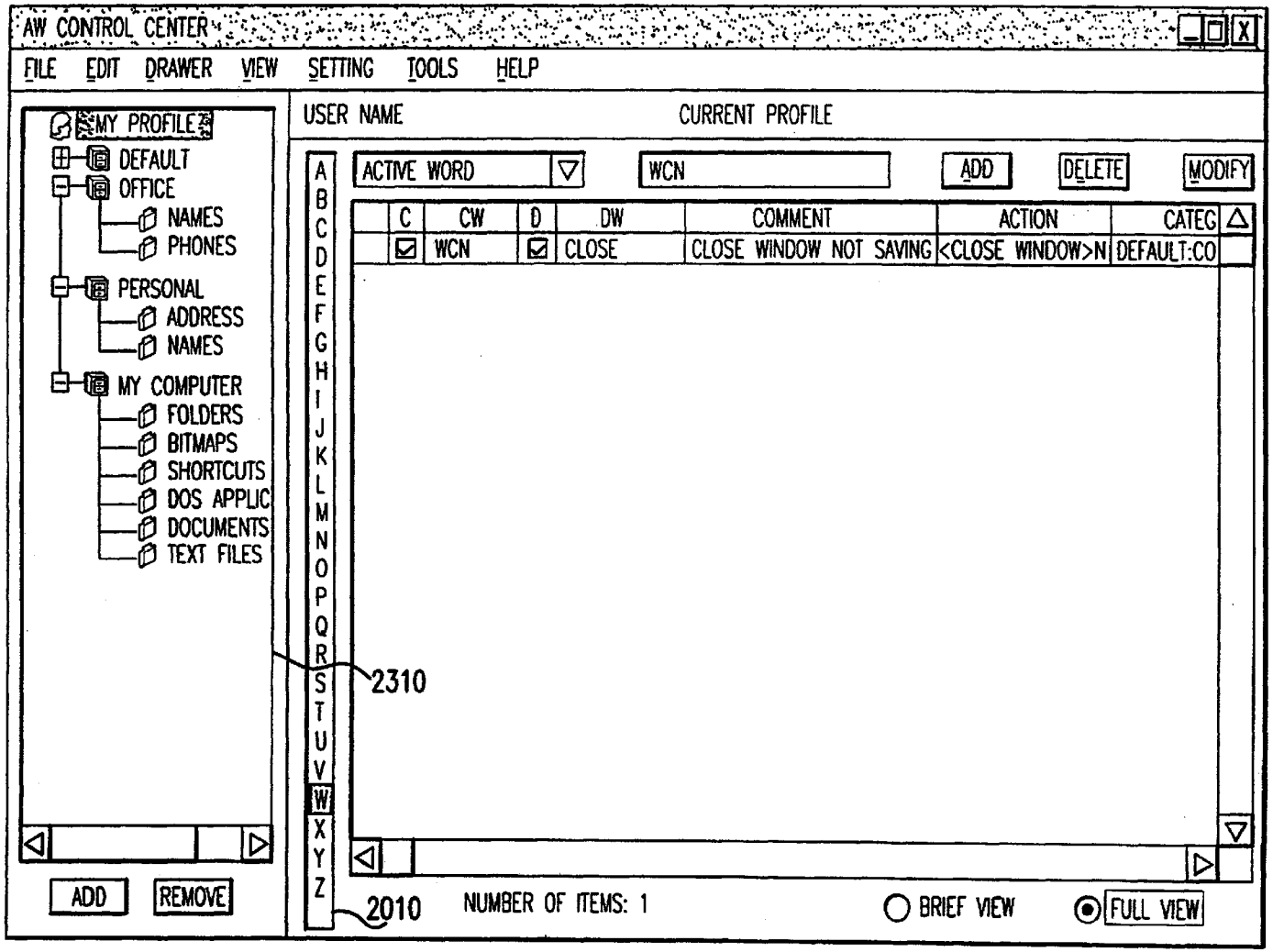
FIGS. 20, 22 and 23 are screen shots of the control center.
Figure 22:
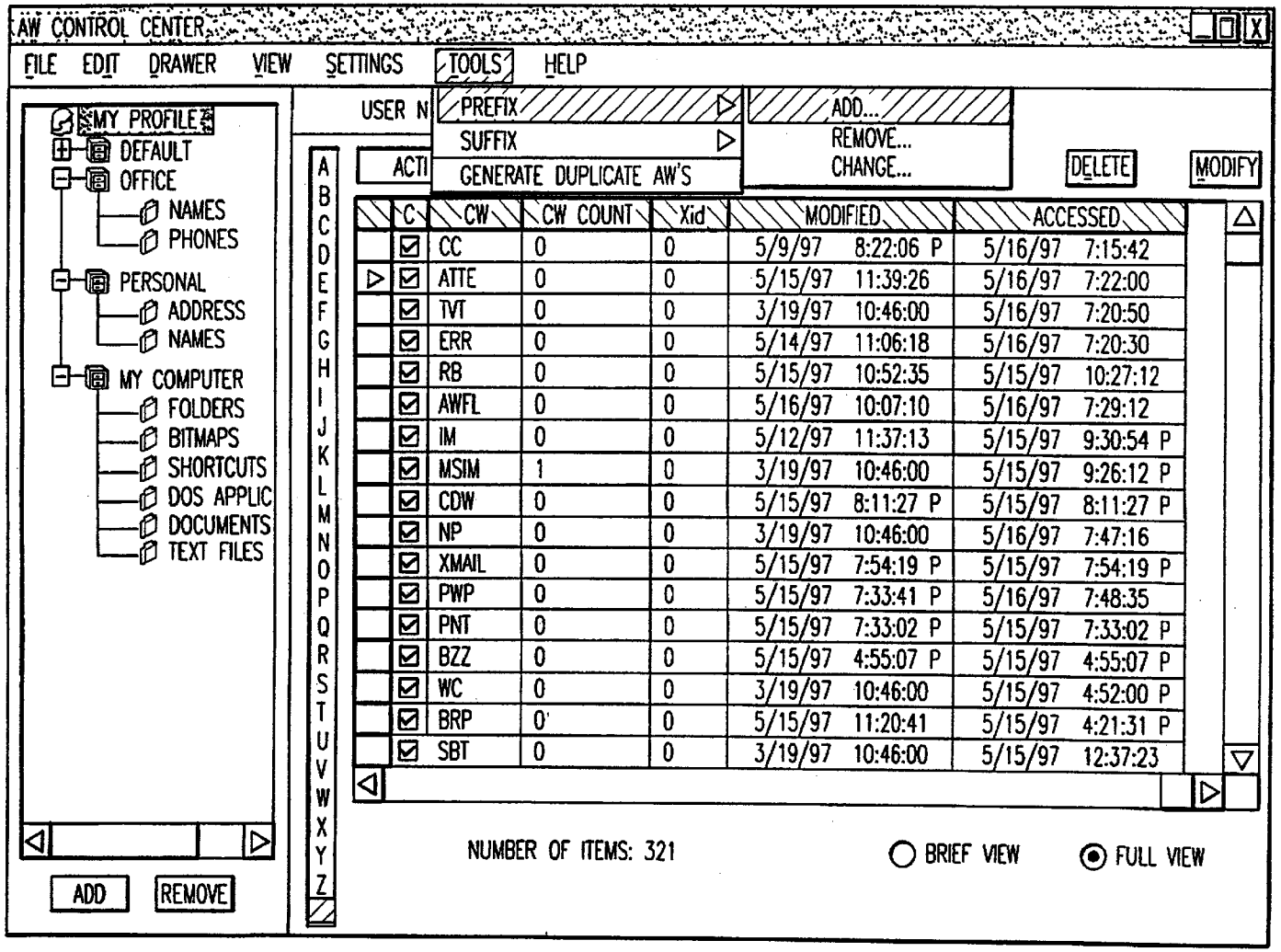

FIG. 6 is a functional block diagram of the control center 345. FIGS. 20, 22 and 23 show some exemplary screen shots that can be displayed via the control center 345. The user 310 can control and manage the ActiveWords system via the control center 345. Some of the services provided by the control center 345 include writing to the wordbase 340, reading from the wordbase 340, deleting from the wordbase 340, changing the configuration files 530, etc.

The control center 345 includes a control center manager 610, profiles registry 620, agents/DLL registry 630 and master organizer 640. At start up, the control center manager 610 reads the wordbase 340 and all the configuration files 530 to create the SUI as defined by the user or by default settings. The user can modify these control settings using the control center 345, and these changes will take effect the next time the system is insulated.

The control center manager 610 reads from the user profiles registry 620 the necessary information to run agents 370 (e.g., Dynamic Link Libraries (DLL's) according to the user's user profile. It also receives and records all changes made to the profiles by the application programs 118 or agents 370 or directly by the user. According to the user defined profiles, the control center 345 enables the appropriate resources and updates and control center display with the appropriate information. The current user and user profile is displayed so that the user can refer to it easily.

The master organizer 640, via an editing mask 650, enables a user to change his user profile, change the active user, organize his drawers and folders, and edit the wordbase 340. These settings can also be changed directly via the monitoring bar 315.

When an application program 118 or agent 370 is installed, its name and the link to its working directory are deposited in the active application registry 630. This information is ready by the control center manager 610 at start up. The control center manager 610 has the ability to change this information as required by the user, application programs 118, the agents 370 and/or DLLs.

FIGS. 20 and 22 and 23 illustrate the control center 345. FIG. 20 illustrates a screen shot of wordbase 340. Action words can be added, deleted or modified via the control center 345. Different action words can be viewed via an alphabetic scale 2010 (i.e., a to z). In this example all action words starting with "w" are illustrated. The wordbase 340 indicates that the function of closing a window without saving its contents can be performed by the code word, wen, or the dual word, close.

FIG. 23 illustrates another view of control center 345. Window 2310 shows a user's profile divided into drawers (e.g., Default) and folders (e.g., substitution). Additionally, the user's active agents and DLL's are displayed. FIG. 23 further illustrates a set of exemplary pull-down menu (e.g., file, edit, drawer, view, setting, tools, help) that allows perform functions on the wordbase 340. For example, the drawer pull-down menu allows a user to insert a new drawer to wordbase 340 and/or add to an existing drawer.

FIG. 23 shows the contents of an exemplary drawer/folder within wordbase 340. In particular, the users wordbase 340 is shown with 118 items. Associated with each code word and dual word is a field labeled "C" and "D," respectively. These fields indicate whether the code word or dual word is currently active (i.e., on/off). Actions words can be added, deleted or modified using icons 2340, 2342 and 2344, respectively.

FIG. 22 illustrates some additional fields within wordbase 340 including the CWCount field, the Xid field and last modified field and the last accessed field.

Figure 7:
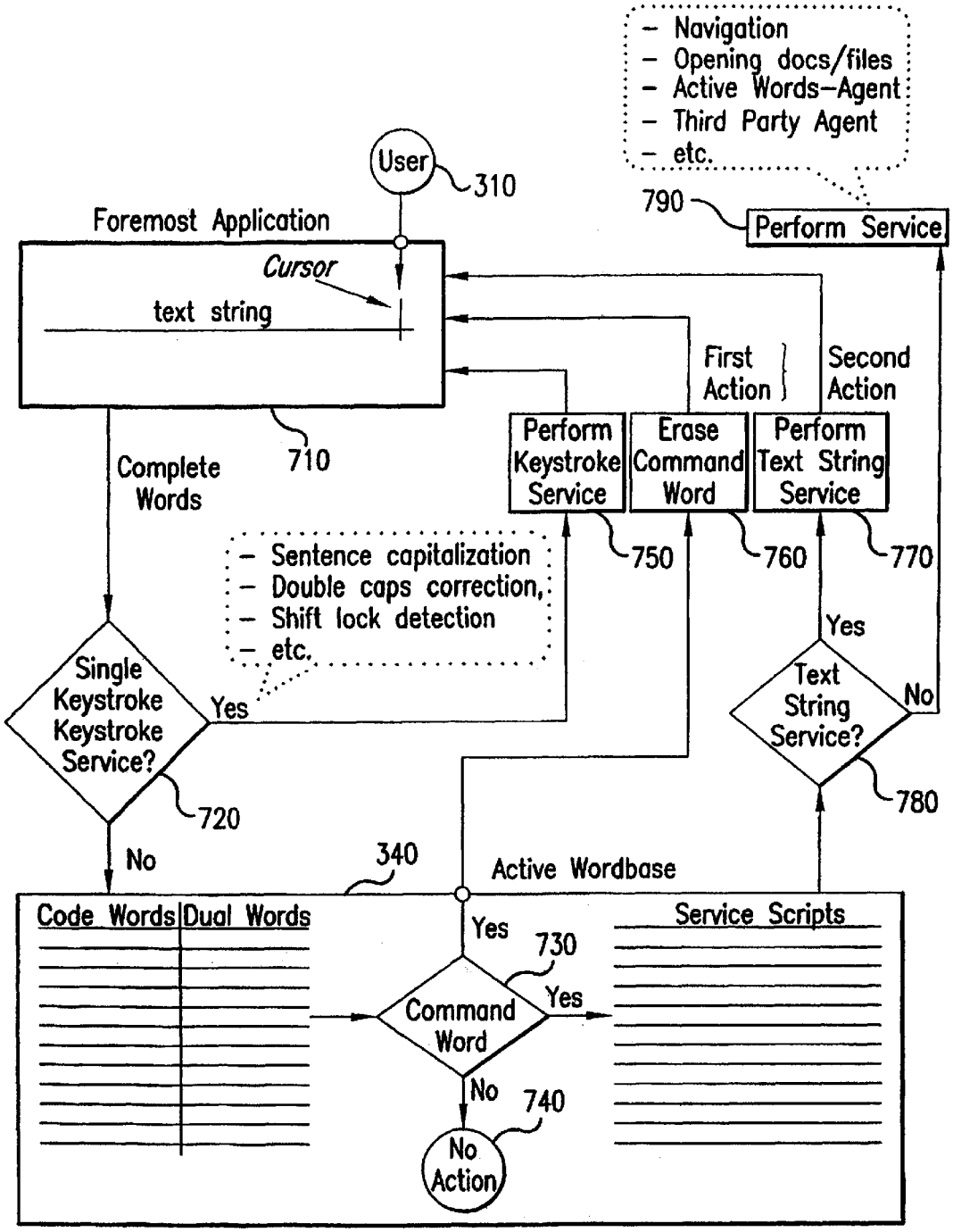
FIG. 7 is a flowchart that illustrates how the present invention checks a wordbase for action words.

8. Run-Time Operation of the ActiveWords System FIG. 7 is an operational flow diagram illustrating some of the run-time functions of the present invention. In a preferred embodiment, the user enters action words at any time and in any context via a keyboard (or alternatively voice-to-text). For example, while the user is typing content into an application document or operating system directory field (e.g., a file name field), he can type an action word at any time and the present invention will sense it as an action word. FIG. 7 illustrates a text string being entered into an application program 710.

The present invention first performs a keystroke service, as shown in block 750. In block 720, the present invention determines whether the user's entry is requires a single keystroke service. Keystroke services include sentence capitalization, correcting double capitals, etc. In a preferred embodiment, keystroke services do not require access to the wordbase 340. The data manager 410 is responsible for providing all the special keystroke services. Other services, such as spell checking, capitalizing proper names, etc., can also be performed prior to checking the wordbase 340.

If a keystroke service is not required, the ActionWords system checks the wordbase 340 to determine whether the user's input matches an action word. No action is performed if there is no match, as shown in block 740. Otherwise, the service script associated with the action word is retrieved. Before executing the related service script, the system will erase the action word from the user's input text, as shown in block 760. Next, the service script is examined to determine whether it requires a text string service, as shown in block 780. If a text string service (e.g., a text replacement) is required, it is performed as shown in block 770. Otherwise, a service, such as launching an application program, navigation, opening a file or document, and the like, is performed, as shown in block 790. Although not shown in FIG. 7, if a dual word was matched with a wordbase item record, the dual word notification procedure is first followed to determine if that word needs to be treated as an action word or ignored as a content word.

If, for any reason, the user does not want to type his action words in the text field provided by the application program, he can call up a Scratch Pad, as shown in FIG. 30, as an alternative to using the text stream in the foremost application 710. In a preferred embodiment, the user does this by pressing the <shift key> twice (i.e., by entering the integrated action word provided for that purpose). The Scratch Pad then stands in for the foremost application. The present invention will then sense any action word(s) the user types into the Scratch Pad. When it senses an action word, the system performs the services associated with the action word.

Furthermore, the present invention can sense action words even when there is no text field present in the foremost window (e.g., some operating system displays offer no text field—contents of a directory when no file name is selected). In that case the monitoring bar 315 will be the only place the user can actually see what he is typing.

In an alternative embodiment, the user may speak his action words and the ActiveWords system will sense his words from the text stream produced by the speech recognition software, instead of sensing them from the text stream provided by the keyboard. Speech recognition is handled by recognition hardware and software systems provided by third parties. These systems typically turn their recognized speech into text, which is then available to any system that "knows" the interface standard.

Instead of being typed or spoken, action words may be selected from text that arrives on the user's screen. These "given" words may arrive via documents, E-mail, over the Internet, or from any other source. Those words were either input by someone else or by the user at some earlier time. These "given" words can be used as action words so long as they can be selected by the user via highlighting. In a preferred embodiment, a user, after selecting a "given" word clicks an icon 1490 located on the monitoring bar 315. This signals the present invention to search the wordbase 340 for the selected given word to determine whether it is an action word.

9. The Toggle function, Pop-Up Windows, Charm Box

Figure 10:
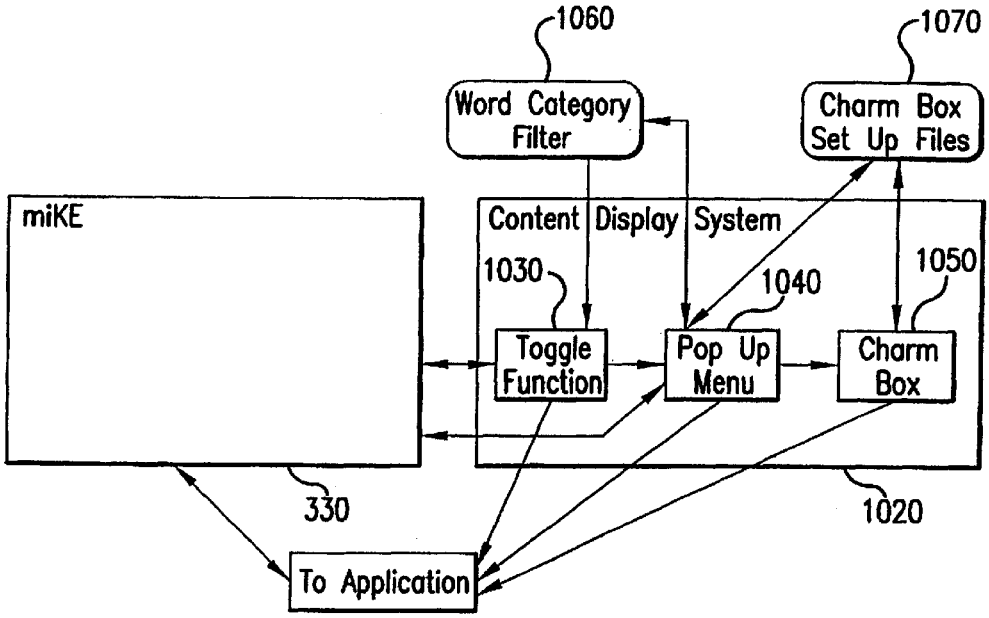
FIG. 10 is a block diagram of the MIKE and a content display system (CDS) in accordance with the present invention.

FIG. 10 illustrates two components. The first component provides the user the ability to enter data via a keyboard or microphone and have the computer system recognize this information and perform functions based on this information from any application currently executing on the computer system. As described above, this first component is MIKE 330. The second component, content display system (CDS) 1020, allows the computer system and user to fully utilize the first feature. The three functions provided in a preferred embodiment of the second component are: the toggle function 1030, the pop-up menu function 1040, and the charm box function 1050.

The toggle function 1030, pop-up menu function 1040 and charm box function 1050 are mechanisms for providing additional information to the user regarding a word or expressing just entered or selected by the user. As discussed above, these features, along with all features of the present invention, are available in all contexts at any time and not just within a single application such as a wordprocessor or spreadsheet program.

In a preferred embodiment, the toggle function 1030 is implemented as part of the CDS 1020. However, the toggle function 1030 can also be implemented as part of the first component 330. In operation, the toggle function 1030 allows a user to select among a plurality of choices for insertion into the text stream. The toggle function 1030 is activated via an action word and operates on the previous word in the text stream. For example, the user types "1/5/97" followed by an action word that represents toggle (e.g., "tog"). The present invention sequentially returns replacement text for the entered text stream—for example, "Jan. 5, 1997," "January 5, 1997," 5/1/97, etc.—, or leaves it unchanged if the word was not recognized. After the CDS component 1020 replaces the typed text with a toggle option, it waits for a specific amount of time and then begins to replace the word with the next replacement option obtained from the wordbase 340 until the user signals that the currently displayed option is selected. As discussed above, the text option inserted into the text stream is also recorded into the archive.

As an alternative to typing an action word calling for the toggle function 1030, the user may request a pop-up menu 1040 of alternatives. The pop-up menu 1040 is a window that contains several options associated with the word, which can be selected by the user via the keyboard or mouse. One of the options may be "go to Charm Box," which in a preferred embodiment is the default. Also in a preferred embodiment, the user always has the option to "close" the pop-up menu 1040, which leaves the user where he was before activating the pop-up menu 1040.

The remaining options are divided into two groups and are displayed according to the user's configuration of the CDS component 1020. The first group of options corresponds to the toggle options of the word. In this case, the wordbase item record associated with an action word may specify that the user be presented with a pop-up menu 1040 that lists all of the options. The user can select the option of his choice via a mouse for insertion into the text stream. The second group of options are the different contexts of information that the Charm Box 1050 can display. For example, the Charm Box 1050 may be configured to display a number of resources relating to that word. Then, a Charm Box 1050 could include a dictionary, a list of equivalent words in another language(s), and list of Internet links (URL's) to cites related to a particular action word.

The pop-up menu 1040 is a program that works in coordination with MIKE 330. When displaying the pop-up window 1040, the CDS component 1020 uses the filtering function to identify the kind of word, and uses functions of MIKE 330 for simulating keyboard input and providing feedback to the user. MIKE 330 detects the fact that an action word ha been entered and passes control to the CDS 1020. In other words, CDS 1020 is an agent 370.

Figure 9:
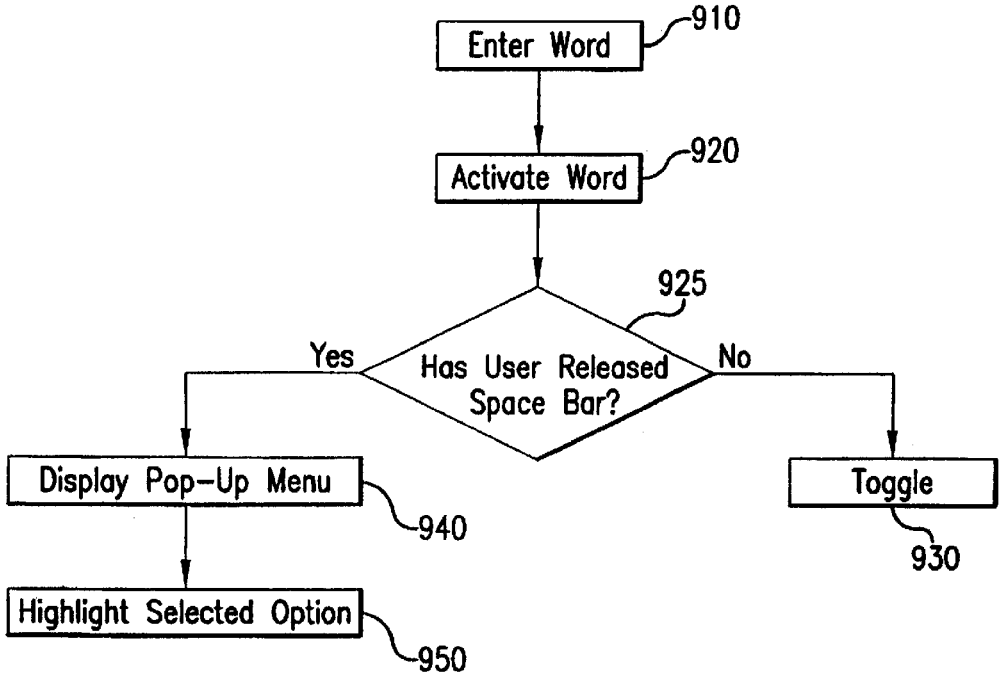
FIG. 9 is a flowchart of the operation of a toggle function and pop-up menu function.

In an alternate embodiment, the toggle function 1030 and pop-up menu 1040 function can be implemented to trigger based on the activation of the space bar. FIG. 9 illustrates how a user activates the toggle and pop-up window in this manner. In block 910, the user types, speaks or selects an utterance. As discussed above, an utterance is any group of characters or words, including, for example, natural language words, non-natural language words, dates, weights and measures, arithmetic expressions, and the like. Using this option instead of an code word (e.g., tog), the user activates the word by pressing the space bar twice, as shown in block 920. Activation can occur by either holding the space bar down on the second press, or by releasing the space bar on the second press. If the user holds the space bar down, the word will begin to change (toggle) into different options according to the word after a specified number of milliseconds (which is user definable), as shown in block 930. The toggling occurs after a short delay. For example, if the word is a date, and the user types 1.1.97, it will change to 1/1/97, January 1, 1997, and so on, until the user releases the space bar. The options that appear for each word are user-configurable. Once the user releases the space bar after a toggle, the CDS sequence is complete.

As shown in block 940, if the user releases the space bar after the double click, or if the CDS component 1020 does not recognize the word or expression as a "toggle-enabled word or expression," a pop-up window will be displayed containing several options. The user highlights the option he wants, as shown in block 950.

The so-called "Charm Box" 1050 is an interface that displays a rich group of information contexts to the user about a selected word. The "charm" metaphor is apt because the present invention uses the user profiles meaning of the word (i.e., it's semantic influence or charm). It can be used to assemble a subset of all the software and information resources available in the user's computational environment (computer and network) that are relevant to a particular word or expression. It automatically places links to those resources and prevent them to the user in a Charm Box 1050 display window. The user can select a link by clicking on his choice, and the present invention will use that link to execute the service. The contents of the Charm Box 1050 are specified by the user via the wordbase item script associated with the word that called the Charm Box 1050 forth in the first place.

Referring to FIG. 10, the charm box set up files 1070 records each user's preferences by setting for distinct information display options. These preferences can be unique for each user and in this way, the look and feel of the Charm Boxes become part of the user's profile.

10. Charm Words

A charm word is special type of dual words. In particular, a charm word is a dual word that, when sensed, will notify the user if there is information available related to that word. In fact, the user may not even know that the dual word exists. (Remember, not all action words are user defined. Some wordbase item records may be defined and/or developed, for example, by third parties.) These dual words may, for example, be stored in the user's wordbase 340 by a server process that automatically populates his wordbase 340 with charm word item records. The ActiveWords system displays a distinctive charm word banner once a charm word has been entered. This distinctive banner is specified by a command in the service script language that identifies the item record as a charm word item. In a preferred embodiment, the banner is a different color than the banner displayed for a typical dual word.

Referring to FIG. 10, the word category filter 1060 allows the present invention to determine if the selected or typed word is a "charm word". In other words, certain words are set aside as having special meaning (i.e., having charm). The present invention thus provides a special filter for these words. For example, the charm word "call" can be used to provide the user with a pop-up menu of everyone in his address book. This, in essence, determines the type of words upon which the system needs to perform charm related actions. The filter 1060 is configured to fit the needs of each individual user.

Suppose that a user goes through his day working on various projects, each of which involve employees, consultants and customers. He receives an e-mail message telling him about a person named John Miller. He has never met Mr. Miller. He selects the text "John Miller" from the incoming address line of the read-only incoming message and clicks "given words" icon on the monitoring bar 315. That tells Active Words to run that name through the wordbase to see if it is an active word. (The user could, alternatively, have typed "John Miller" in the Active Words Scratch Pad or in whatever application he is working at the time.) The ActiveWords system responds by giving a low hum as an audible signal along with a green dual word option banner. This tells the user that information is on file about John Miller. Obviously, if a banner is not displayed, information about Mr. Miller is not available.

The user takes the dual word option by pressing the space bar a second time. Active words executes the script associated with "John Miller," which launches an Internet browser via a URL that also contains "John Miller" as the information request. That URL is for an Internet site/page on the corporate Intranet, in another city. Within moments, he has a web page that includes John Miller's photo, his affiliation (he is a consultant who works for the user's company). He is also provided with a brief biography of John Miller, along with information on how to contact Mr. Miller.

In this example, the "John Miller" item was "pushed" into his wordbase 340 by an Internet tool called Castanet (Marimba, Inc.), which allows users to subscribe to various web site services. In his case, our user subscribes to several databases that have information about people of interest to the staff in his company, including the employee database, the consultant database, the customer database and the visitor database. Each of these sites uses Internet push technology tools to update each subscriber's Active Words wordbase once each day when they first sign onto the corporate Intranet. The updates add and delete wordbase items that are formatted precisely to Active Words standards, each with a script that contains a URL that points to the correct web sites/server/page that contains details about that name. The detailed information is at the web site and the name tag is in each subscriber's wordbase 340.

This allows any persons's name to be a Charm Word candidate for the user. (The system can recognize multi-name charm words by using the <WITH: . . . >service script, as shown in item 100 of TABLE 1.) To learn if his company has any information on file, the user simply types the name he wants information about. If there is information on file, the word has "charm." The script of a Charm Word includes a script element telling it to show the dual word banner in a color that is distinctive for Charm Words. If the name has no charm, nothing happens.

The idea here is to have the computer mimic what happens when one utters a name in a social or business gathering. The interpersonal signaling among a group of people tells the persons who says a name if someone knows that person; perhaps a smile or a raised eyebrow is the telltale. At that point, the speaker can ask that person for further information. The speaker can also usually tell if the name is unknown. Charm Words are a way to make computers name aware in a similar way.

Of course, Charm Words are not limited to names. In an automotive company, a user's wordbase might include Charm Word items related to its products. Thus, when the user typed "Large Trucks," the system would give him a Charm Word sound/banner, inviting him to ask for more information by simply tapping a space bar.

C. The Application Programming Interface

The application programming interface (API) allows a user to extend the original functionality of the preferred embodiment by allowing the inclusion of external programs that operate in conjunction with the core architecture of the present invention. We call such external programs ActiveWords Agents 370. An important part of the ActiveWords system is the capability to enable third parties to create extensions of the basic functionality via Agents and DLL's. A particular important component of third party connectivity is the development and distribution of an OLE Control (OCX) component (i.e., a code object). Its main purpose is to provide programmers easy access to the core of the ActiveWords System functionality and extend its support for their specific applications. The OCX provide, among others things, the services and messages described below:

RegisterProactiveAWApp: Function used to set the ActiveWords system to notify the OCX when one or more of the following events occur (the application must provide the function to act upon notification).

TYPEDWORD—The user typed a word.

REPLACEWORD—The user did a substitution.

TYPEDCW—The user typed a code word.

NESTEDCW—The user executed a service script that contained a CW.

TYPEDDW—The user typed a dual word.

TYPEDLINE—The user finished typing a line.

REPLACEDLINE—the user used a code word or dual word to replace a line.

MrlBeamState: Function used to determine the state of Mr. I-Beam (awake/asleep).

GetAWDir: Retrieves the directory where the ActiveWords system is installed.

SendString: Used to send a string to the current application. The string can contain commands and/or other code words.

FeedbackMessage: Used to send a message through the ActiveWords interface.

SetUser: On a multiple user environment, sets the active user.

SetProfile: Use to select the active profile, if multiple profiles are available.

FetchCW: Used to execute a specific code word.

FetchDW: Used to execute a specific dual word.

GetFetchCW: This function is used when the application wants to obtain information about a certain item. It can be used with one of the following parameters, depending on the information required. ALL_FIELDS, ACTIVE_FIELD, CW_FIELD, DW_FIELD, ACTION_FIELD, COMMENT_FIELD, ACtIONTYPE_FIELD, EDITINGSTYLE_FIELD, COUNT_FIELDs. XID_FIELD, EXTRA_FIELD, and MODIFIED_FIELD, and ACCESSED_FIELD.

GetFetchNW: Same as the previous function, but used to obtain information of a Dual Word instead of the Code Word. The parameters needed are: ALL_FIELDS, ACTIVE_FIELD, CW_FIELD, DW_FIELD, ACTION_FIELD, COMMENT_FIELD, ACTIVETYPE_FIELD, EDITINGSTLE_FIELD, COUNT_FIELDs, XID_FIELD, EXTRA_FIELD, and MODIFIED_FIELD, ACCESSED_FIELD.

GetProfile: Used to obtain the active profile.

GetUser: Used to obtain the current user.

GetLastWord: Used to obtain one of the last fifteen words typed by the user.

GetLastCW: Used to obtain one of the last fifteen code words used.

GetLastDW: Used to obtain one of the last fifteen dual words used.

GetLastLine: Used to obtain one of the last fifteen typed words by the user.

GetLastReplacedWord: Used to obtain one of the last fifteen words that were substituted.

GetLastNestedCW: Obtains one of the last fifteen code words that were contained within executed scripts.

GetLastReplaceLine: Used to obtain one of the last fifteen lines that were substituted using a code or a dual word.

Once the OCX is inserted into a development application that supports OCX-Containment (such as, e.g., Visual Basic, Visual C++, Excel, Word), all the functions are available to the application. The application can provide functions to support the messages the OCX will send when the user performs a certain action. An example of this can be the following:

m_textvariable=The OCX.GetLastWord(5)

Which says the string type variable "m_textvariable" will receive the string that the GetLastWord method of the OCX object returns. This method receives a parameter specifying which last word to return. In this case, it is the fifth word of the user's text stream. (The OCX in the example above is the name of the control, defined by the user. The user is able to use more than one OCX control to communicate with a given application.)

The parameters provided above is the minimal set presently considered essential for an agent to interact with the present invention. Parameters can be added or deleted as should be readily apparent to one skilled in the art.

D. Agents

An agent is any program written to be called by an service script. An agent can be called by a script when an action required by a user is beyond the capabilities of the scripting language. Agents can be provided by third parties so long as the ActiveWords standards and rules are followed. Some agents operate at a VDD level, and allows for multithreading. Other Agents can be simply executable programs or DLL's, depending on the nature of the Agents functional requirements. While other agents can be written in C++ or Visual Basic, for example, so long as they configured to interact with the Active Words system (embedded OCX controls, etc.). Agents typically use some capabilities of the present invention to accomplish their tasks. In a preferred embodiment, the state table 450 is made available to agents 370 by passing a pointer when the agent 370 is registered in the agent registry 360. The preferred embodiment of the present invention includes at least the following agents: archiving, training, telephony, organizer, alarms, calendar, in-place transformations (e.g., arithmetic, weight and measures, etc.).

The agents can be either pro-active or re-active. All active agents are registered in file 360. The registry contains a list of all active agents and the services they provide. When an Active Word or Dual Word is associated with an Active Agent 370, control is passed to the specified re-active agent. When a control character is identified, MIKE 330 checks to see if any pro-active agents are registered, and sends them a message. MIKE 330 also receives messages from the agents through the services they offer. Agents 370 communicate with MIKE 330 through services they offer (e.g., requesting information, sending information, asking MIKE 330 to fetch an Action Word, etc.). Communication is performed via Windows Messaging.

E. Multi-Item Resolution

A user can designate a single action word for two or more services. As such, the present invention provides for multi-item resolution. As discussed above, the wordbase 340 is checked after the entry of each utterance. If multiple item records are found that match the utterance, i.e., the action word, a list is generated and a multi-item resolution window is displayed. This Multi-item resolution window includes the contents of the Comment field in each item record paired with each item's code word and/or dual word.

FIG. 31A illustrates a window that allows a user to select from a list of names in response to the charm word "call." In this case, filter 1060, displays a pop-up menu that includes multiple phone numbers for a set of individuals. In other words, the charm word call activates a telephone directory. FIG. 31B illustrates a multi-item resolution window 3120 that allows a user to select from a list of phone numbers in response to the charm word "John Miller." Window 3120 is a list of multiple phone numbers for John Miller, including his home phone number, office phone number, facsimile number, etc. Alternatively, a dual word, such as "Miller," could have been assigned to each of these wordbase item records. The resulting multi-item resolution window would be identical.

Multi-item resolution will now be described by way of an example. Suppose the user has seven documents in his computer named "Expenses." Each is in a separate folder, most of which are for tracking various projects. Some of those documents are Excel spreadsheets, some are Microsoft Word documents and one is an Ecco (Netmanage, Inc.) document. He uses the drag/drop technique to create wordbase item records and gives each folder the dual word "expenses," which is the most natural word for referring to those documents. In the Comment field of each item record, he identifies its project folder name. He also assigns a code word that is unique for each item.

Later, when he types "expenses," he gets a dual word configuration (e.g., sound/yellow banner) offering him the option to treat it as an action word related to those folders. He takes the dual word option by tapping the space bar a second time. Active words responds by finding all seven items. Since there is more than one in the wordbase 340, it opens a Multi-Item Resolution Box. This Multi-Item Resolution Box includes the contents of the comment field in each item paired with each item's code word. The user selects one of the records using the up/down arrows and presses enter to select the one he wants, and presses enter for that script to be executed. The script associated with the selected item record opens the document. Instead of using the up/down arrows, the user could simply type the code word, shown in the multi-item resolution box, for the item he wants to select. After opening a specific document enough times, he will begin to remember its code and omit the Multi-Item Resolution Box procedure.

The idea behind this feature is to mimic the way people work with names. Lots of people and things have the same names, and using those names is very natural. Likewise, in naming computer objects, process and information, people should have the same flexibility. This Multi-Item Resolution Box mechanism allows the user to use natural names as dual words, without worry. He can point to the item he has in mind when he uses that name.

F. Portability

The present invention is portable via diskettes, e-mail, LAN/WAN connection or over the Internet via upload and download to any computer. In a preferred embodiment, the "user's profile," which includes wordbase 340, agent registry 360, profile registry 350 and archive data, can be transferred to another computer. This enables the user to carry his ActionWord functionality from one real computer to any other computer, so long as the ActiveWords system is installed on each.

The present invention can also be installed on a network server. This would allow a user to maintain his personal SUI as she moves from one workstation to another. The user profile can be kept on the server or copied into the workstation hard drive upon log in. In a preferred embodiment, the user profile is made secure via a password.

Portability will now be explained by way of example. Suppose the user decides to travel for brief work assignment in his company's operation on the other coast. He creates a series of diskettes that will contain his entire user profile. This includes the ActiveWords software, the wordbase 340, all his ActiveWords applications and his archive. Alternatively, he could upload his user profile to a web site so he could download it into his computer at the other office as soon as he arrives there.

Accordingly, when a user arrives in his office on the other coast, he can install his user profile in the computer he will use while he is working in his office; making it fully language aware according to his user profile. Everything works the same as it does on his home-office computer. If a service script refers to some resource (e.g., a file) that is unavailable on this alternative computer, the ActiveWords system simply not execute the service scripts. In one embodiment, the present invention provides a message to the user that the resource is not available. In this simple way, the user can make any computer as personal as his own.

G. Third Party Application Programs

It is contemplated that third parties will produce and market application programs that are based on the present invention. Third Party (or ActiveWords) application programs are defined as including a set of wordbase item records and/or one or more agents 370. As discussed above, agents 370 perform specific functions in response to a call from a service script. Third party application programs allow third parties to create a set of code words and dual words for a suer that relate to a specific subject matter. Thus, the third party application program is a collection of wordbase items records and agents 370 that are related in some way (e.g., action words and service scripts related to finance, engineering, astronomy, Microsoft excel controls, etc.).

The third party wordbase is incorporated into the user's wordbase 340. The user can still add, delete, or edit the action words within the wordbase 340. Furthermore, the user can turn the item records within the third party wordbase on and off, as well as assign a priority to each item record. As discussed above, different user profiles can thus be created. The user profile tailors the ActiveWords system to which ever language the user speaks and the precedence-order his language(s)-of-art (e.g., Metallurgy and Astronomy) should be given in providing him with ActiveWords services.

V. Examples of Using the ActiveWords System

The use of action words allows a user to perform a variety of functions, heretofore accomplished using either a complicated combination of control keys (e.g., Ctrl.,Alt.shft) or point and click technology. For example, the present invention allows a user to define an action word for all the common window operations. Thus, an action word can be used to close, restore, minimize, maximize, move, resize windows within the user's graphical user interface. Furthermore, any document in the PC can be opened with just a single action word, from any place in the work space. Still further, any application can be launched from any place in the PC by just typing the associated action word followed by the space bar. A user can also launch third party macros without having to remember cryptic key combinations (shift+crtl+alt+char). The user merely defines an action word and the present invention will execute the macro.

Provided below are nineteen practical applications for the present invention. Some of the examples discuss hypothetical third party applications, which aid in discussing the broad scope of the present invention.

EXAMPLE 1

Launching and Opening—Command Service

While writing an e-mail message, the user types the word "dial." The present invention immediately responds with a visual and/or audible cue, notifying the user that "dial" is a dual word associated with a service script for launching a phone dialer. Phone dialer applications are presently available from Microsoft Office 97. The user then has two options: activate the dual word or ignore the dual word. In the first option, the user simply presses the space bar again (the space bar was firs pressed after typing the word "dial"). The present invention responds to the user by erasing the word "dial" from his e-mail text (via backspacing) and launches the dialing application. While the service script is launching the dialer, the user continues working in his E-mail message, until the dialer window appears on his screen. Under the second option, if the user intends the word "dial" as a content word for his e-mail message text, he simply continues typing. The ActiveWords system ignores the action word potential of the dual word "dial."

The experienced user will simply type "dial[spacebar/spacebar]", without waiting for the visual/audible signal. In this fashion, action words can be used to launch or open any software application, documents, Windows 95 directory/folder, utility, operating system view. Internet browser, or the like.

Remember, using code words allows the ActiveWords system to automatically assume the user does not intend the code word to be text content in his application document. Accordingly, the user can designate "dl" as his code word to launch the dialer. The present invention automatically erases "dl" and launches the dialer. Any abbreviation, acronym and code can be designated as a code word.

EXAMPLE 2

Text Substitution Services—Content Service

A user can designate "evp" as a code word for a service script that substitutes "E.V.P." in the text string. The user may also use "evpe" ("e" as a suffix for expanded form) as the code word for "Executive Vide President". He can designate any number of such expansions using any nick-naming logic that he finds mnemonically convenient, such as evpe/evpe, ovp.ovpe, ceo/ceoe, coo/cooe, if he favors suffixes, or alternatively, evp/eevp, ovp.eovp, ceo/eceo, coo/eceo, if he favors prefixes.

The user has complete freedom to create a vocabulary of action words. His ability to use any number of dual words to activate a single service script can free himself from remembering which word to use. Here is an example of an approach a user could take. To activate the dialer (Example 1), he can assign three dual words to that one service script—say "dial," "dialer," and "phone. That way, whenever he wants to execute that script, he can guess an obvious word; he is likely to guess one of the three words he designated as triggers. After triggering the dialer a number of times, one of these dual words will automatically come to mind whenever he wants the dialer. He can then delete the other two dual words or leave them unused. Similarly, following the example above, the user can designate both "eevp" and "evpe" as his code words for "Executive Vice President." That way, it doesn't make any difference if he has a prefix or a suffix preference on the day he created his code words. The ability to use any number of words for the same service script makes the present invention very powerful.

EXAMPLE 3

Formatted substitutions of any sort and length—Content Service

A user may type, for example, "nad" as an action word he has designated for his formatted name and address. Thus, typing "JDoe nad" results in the following information being displayed on the screen:

John Doe
1212 Maple Street
Apartment #45
Big City, Big State00000

EXAMPLE 4

In-place Text, Arithmetic and Transformation Services—Content Service

In an outgoing E-mail message, the user types "134×16.7=." The user has designated "=" (tow equal signs) as his code word for performing in-place arithmetic on the preceding expression. In this case the present invention will analyze the "134×16.7, then calculate the result (using an agent), then erase the "134×16.7=" from his text, and finally, substitute the result value, 2237.8 for the original expression.

To add 3 to this value, he would follow the "2237.8" with "p3=", where p represents "plus," and that value would be erased and 2340.8 would be substituted as the new result. And so on, until he has achieved the result he needs. There is always the possibility to include a powerful third party math agent to perform complex calculations. As should be readily apparent, the present invention allows every word, letter, symbol to be an action.

Using the above example, the user could follow the result "2340.8" with "tsft", his code word signaling the present invention to evaluate the preceding word or expression (i.e., 2340.8) and transform it to text. In this case the present invention will erase "2340.8" and substitute "two thousand two hundred forty-two and eight-tenths." Or, the user could type "tsftf" the code word for a transformation of a number into a fractional notation. Obviously, these code words are exemplary only.

Similarly, the present invention allows the user to specify transformations to and from: text and numeric date formats, different weights and measure systems (miles/kilometers), telephone number formats, currency conversion (Dollars/Yen), numeric to spelled out (numbers, currency), etc. The type of transformation is user assignable. The above list of transformations are exemplary only. Other transformations can easily be activated by the present invention as should be readily apparent to a person skilled in the relevant art. Further, third parties can leverage this transformation capability in ways that suit specific groups (e.g., Physicians, Architects, Chemists, Astronomers, Lawyers, etc.).

In order to implement the above, the present invention simply picks up the signal (i.e., the keystrokes) and passes control to the designated software agent (a program/application) that performs a transformation. When it passes control to the agent, the ActiveWords system also passes the contents of the state table 450.

The present invention allows a user to enter keystrokes in any application, and if a predefined mistake is made, have this mistake corrected. For example, the present invention corrects simple spelling mistakes, such as double words, double capital letters, simple spelling mistakes, and the like. The present invention further detects and automatically corrects (user selectable) the most common capitalizations, day names, month names, key holidays, and common first and last names. Still further, if an action word for a transformation is capitalized, the replacement is also capitalized.

By appearing an action word to a number (e.g., "dl" for dollar), the present invention automatically replaces the number with a predefined currency format, like 12870 dl=>$12,870.00. Similar to currency symbols, dates are autoformatted according to the user's favorite format, like 121196 dd=>Dec. 11, 1996, where "dd" is an action word that indicates that a date change is requested by the user.

EXAMPLE 5

Internet Navigation Services—Command Service

An additional feature of the present invention is to combine action words and actual text. For example, an action word, for example "iex," could be used to launch an Internet explorer. Thus a user would type the words to be used in the Internet search, type the action word "iex" and the present invention initiates a web search using the search term that preceeded the action word. In other words, the script associated with the action word "iex" is written to also check the text prior to the action word. As a result, the present invention will connect to the Internet and launch the predefined Web Browser with the result already in it.

The user may make a simple call, for example, to a web site by designating "yho" to launch his favorite browser via Yahoo's URL. In this case, the present invention will erase "yho" and launches the designated browser using the URL.

The user may further call to a web site with a search algorithm. The user could use "exxon fwsj" to take him to the Wall Street Journal's web site and instruct it's search engine to locate articles about Exxon. The user's code word is "fwsj," for "find—Wall Street Journal". The present invention first erases "exxon fwsj," then inserts "exxon" in the search argument location within the URL, and then launches the browser using the URL. The user continues working, as allowed by the multi-processing service of Windows 95/Windows NT (for example), until the operation is complete and the browser is foremost.

EXAMPLE 6

Reference Information and Tools Services—Retrieval and Content Services

In combination with the user profile, the charm box can deliver tools and information to the user that are finely tailored to his purposes and needs. The interface is as simple as they get. The user selects or types a word, then the associated service script assembles the information and software resources he is likely to need.

The user may type "china syn" to ask the present invention to give him a list of the synonyms for the word "China." The present invention begins by erasing "syn, and then looks up "China" in the designated thesaurus. It then presents a Pop-up list of synonyms for "China." The user can select one synonym for placement in the text stream as a replacement for "China."

The user selects the word "steel" with his mouse and presses a designated spot on the monitoring bar 315. His user profile tells the ActiveWords system that he is an English-speaking metallurgist. The present invention immediately assembles the information and software resources that have been specified for "steel" in the wordbase 340 for metallurgy. These resources are assembled and presented in an charm box window.

In this example the Charm Box would include several icons linking to web sites that are useful to metallurgists (e.g., suppliers, availability and market prices), listings from the user's database of technical specifications for metals, a scientific calculator, the E-mail addresses of his suppliers, and any other relevant software or information assets for "steel." The user could have archived the same result as above by typing "steel cb" ("cb" being his code word for Charm Box).

For our French businessman, the Charm Box would include the listing for "acier" (French for "steel") from the standard French application, listings for his French thesaurus, encyclopedia entries and tools. Since he is not a metallurgist, "acier" is not his vocabulary-of-art. The difference in how the Charm Box operates for our two hypothetical users is a good example of the power of the user profile.

A related capability of the present invention is to serve bi- and multi-lingual users. Our French businessman may be French/English bilingual. His wordbase 340 would allow him to express his profile (word choices and precedence) for both French and English.

EXAMPLE 7

Archiving Every Word the User Ever Types—Content and Retrieval Services

Once installed, the present invention archives every word the user types. Accompanying the stored user text are tags that record the context he was working in at the time the text was input. It further keeps a frequency count of how many times the user enters each word. This allows the present invention to determine the productivity benefit the user enjoys from using the word substitution capability of the present invention. (To favor the use of the Archive 1350 for future reference purposes, the present invention archives the substituted word and not the code words.)

At any time, the user can type an action word, whose service script will find any specified word in his archive. For example, the user types "fia" (for find in achive). ActiveWords responds by displaying an Active Words Scratch Pad. The user then types "Italian Restaurant." ActiveWords responds with a display listing all the occurrences of "Italian Restaurant" that he has typed since he installed ActiveWords, which could be years. Since he uses Excel to keep track of his expenses, he <nexts> his way through the list tagged with Excel. He double-clicks on the likely entries, and ActiveWords shows him that segment of the text stream. Once he has located the information he wants, he simply copies it to a clipboard and uses it in any way he wishes.

This also enables the user to jettison the original application documents, themselves and only retain the compressed text in the Archive 1350. The savings in disk space can be enormous. Although he loses the formatting (because the archive is an ASCII format file), all the information and context tags are still there. This also enables the user to work in a document, updating it every day, for months and years and still use the ActiveWords tags stamping to locate information he typed into that document at a central point in time.

EXAMPLE 8

Information Pop-ups—Control Service

Let's assume that a user has defined his user profile to include both English and Spanish. He also has installed a hypothetical ActiveWords application named English/Spanish Bilingual Writer's Helper. He types the word "cow" and receives a visual and/or audible signal telling him a bilingual service is available to him by tapping the space bar a second time (if he keeps typing, the service option goes away). He taps the spacebar a second time and the word cow is erased and replaced with "vaca." There are several interesting ways the present invention can respond.

The user may not use the visual/audible alert method, preferring to call for the bilingual translation service for the previous word using an action word. The user could use "tgl" as his Code Word for the translation toggle (.e.g, "cow" to "vaca") to take place on the previous word he typed. Or he could escalate matters and type "pu" for an ActiveWords Pop-up list display. This display would include the word "Vaca," plus all the grammatical forms, conjugations, and usage rules for the word "vaca." Or, the user could go all the way, typing "chr" to invoke an ActiveWords Charm Box for the word "vaca." This would bring the relevant subset of all his computer's information, software and network resources relevant to his English/Spanish bilingualism to is screen. In this case, those resources include: the "cow/vaca" entries in his bilingual dictionary, the "vaca" entry in his Spanish encyclopedia, the "cow" entries in his English dictionary and encyclopedia, the usage listings in his Spanish usage guide, several icons that will take him to several useful web sites that have English/Spanish bilingualism tools, etc.

Using these Toggle function 1030, Pop-up menu 1040 and Charm Box 1050 mechanisms, our French businessman who is a sports enthusiast, could call forth services related to his unique user profile. For example, assume that the user purchased a hypothetical ActiveWords Soccer Application, which included wordbase item records for a variety of soccer terms and players. Thus, "Pele" would toggle to Pele's full name, the pop-up list might include his key game statistics and the Charm Box would show his picture and include listings from the user's CD/ROM Sports Encyclopedia, and several icons leading to web sites that cater to Soccer fans.

EXAMPLE 9

Agents and the State Table—Control Service

Our user designated "dbp" as his code word for dialing a person's beeper. He types "Smith dbp" and the present invention responds by executing a service script. That script erases the previous word. "Smith", and passes control to a beeper program, which may be in the user's computer or in some remote computer on his network. When control is passed, the present invention also passes the contents of the state table 450, which contains the text of the last word typed (i.e., "Smith"). The service script then dials the beeper number.

EXAMPLE 10

Opening and Closing Directories (folders)—Control Service

The user types "myf" his code word (i.e., My Folder) for opening two folders in his Windows 95 directory. One is called My Computer and the other is My Folders. The present invention responds by executing the service script that opens those folders for him. In this case, the service script the present invention uses to launch those two folders is:

<C:\My Document><C:\My Computer>

EXAMPLE 11

Navigation—Control Service

The user types "msw" to bring Microsoft Word foremost and "msx" to bring Excel foremost. If those programs are not already running, the present invention launches them whenever the user types either "msw" or "msx." The service scripts the present invention uses for those code word are, respectively: <C:\Program Files\Microsoft Office/Microsoft Word.Exe> and <C:\Program Files\Microsoft Office/Microsoft Excel.Exe>

EXAMPLE 12

Launching Macros—Control Service

The user has a utility program, provided by a third party, which enables him to create cross-context macros. Those macros are activated via "F" keys and "control" key combinations. Although there are thousands of possible key combinations, he can't remember more than about 10, because they have no logical consistency. He has created a macro to backup his system. The control key combination he uses to execute the macro is <alt><control><b>.

Using the present invention as his interface (his SUI) to that macro program, he now types "backup", his dual word for executing the service script that launches the macro that performs a complete system backup. The present invention responds by offering an option to trigger the backup. The suer taps the spacebar a second time, which issues the <alt><control><b> key combination that launches the backup macro.

Thus, the present invention turns a cryptic macro capability into a rich resource for triggering hundreds of functions. It allows the user to employ his ActiveWords SUI to make fuller use of his macro utility.

EXAMPLE 13

A market for ActiveWords application—Control, Contend and Retrieval Services

The user, a real estate agent, signs on to www.ActiveWords.com to purchase ActiveWords applications. He browses among the various natural language groupings—French, German, Spanish, English and etc. choosing English. He selects several applications that he thinks will be useful. He downloads the following (hypothetical) ActiveWords application.

In-Place Real Estate Math. It provides in-place arithmetic for real estate specialists (mortgage calculations, etc.).

Real Estate Charm Words. This application provides Toggles, Pop-ups and Charm Boxes that are handy for people working in real estate. The application includes in-place toggles for calculating monthly mortgage payments. It also includes in-place transformations from square feet to square yards, transformations to metric (for European clients), transformations from acres to square meters, and etc.

Real Estate Terms. This application provides substitution words that are specialized for the real estate user. For example, it includes a substitution Wordbase for all the common financial institutions that relate to the real estate market, such as "fhlb" for Federal Home Loan Bank. There are hundreds of such wordbase item records.

Telephone Dialer for Microsoft Outlook97. This application automatically dials the phone numbers that the user stored in Microsoft's Outlook97 telephone directory.

Each of the downloaded application include some or all of the following components: wordbase item records, which include code words, dual words, replacement words, service scripts, calls to agents, and agent software, such as the software designed to dial telephone numbers that appear in the Microsoft Outlook97 telephone directory. This software would use the published OLE controls that Microsoft has published for access to the Outlook 97 directory. Agent software is included where necessary for the application to properly function. An On-line help file could be provided to help the user understand each wordbase item record. A tool-tip file could also be provided (FIG. 15).

The user begins by registering his new ActiveWords application into the present invention. Registration is done via the control center 345. The control center 345 makes sure the ActiveWords applications have the correct serial number for his copy of the present invention. The control center then enters the various application components into the wordbase 340. The editors provided with the applications allow the user to do the following things: Browse the item records for each application to discover when the application can help him do and how he can trigger those functions; Click the On-Line Hep icon provided beside each item to learn more about what it does and how to format, modify and use the accompanying script; Review the tool-tips; and Click on a "Try Me" icon, which causes the script for that item to be executed.

Via the control center 345, the user could further turn wordbase item record on or off, change the action words in the wordbase 340, change the service scripts associated with the wordbase item records, create new items and service scripts, search for and find item records, and sort the items records.

EXAMPLE 14

Active Words Server—Control, Content and Retrieval Services

Your employer has assigned an ActiveWords administrator to maintain a number of up-to-date ActiveWords Directories, including a directory of the official acronyms used throughout the company. He also maintains a number of other directories that users can access via action words. The user types the code word "usafahe," the acronym for U. S. Air Force Attack Helicopter. The "e" suffix makes it an Action Word to substitute the expanded text, "U.S. Air Force Attack Helicopter." ActiveWords responds by looking the word up in its Active Wordbase, on his computer. The Service Script passes control to an ActiveWords network agent, which, in turn, looks the word up on is company's database server via a SQL command.

EXAMPLE 15

7×7 Archive—Content, Control and Retrieval Services

The user wishes to take a quick note related to a person he was introduced to in a human resources meeting at work. His organization charting program is foremost. He presses <spacebar><spacebar> to bring up the ActiveWords Scratch Pad. Then he types his note into the Scratch Pad, including as much text as he wants. He follows that with "bhu," his action word standing for Business Human Resources. The present invention responds by storing the text of his note in the ActiveWords archive, tagged to identify the foremost application, the foremost document and the 7×7 category/subcategory (i.e., Business/Human Resources).

As discussed above, the present invention includes a special 7×7 repository for notes. There are seven user-assignable categories (in this example "Business" is one of the seven categories). Each category, in turn, has seven sub-categories (in this example, Human Resources is one of the seven sub-categories in the Business category). The ActiveWords system automatically makes a default code word by using the first letter of the category name and the first two letters of the sub-category name (hence "bhu," in this example).

If the user is in a word processing application at the time he wants to record something in the 7×7 repository, he can simply use the applications text field to write the note. In a preferred embodiment, he presses <enter>, causing a "return" to a new paragraph, and types his note. He then types "bhu," his code word to capture the note and store it in the 7×7 Archive. This results in everything he has typed since the last return to be stored in the appropriate 7×7 file.

EXAMPLE 16

Internet Setup

The user starts each day by opening his Internet connection, Eudora, and Netscape Navigator. He then checks for new email. The user has defined a service script associated with the code word "si" meaning "start Internet." The service script opens the dialup networking application, inserts the appropriate password, dials the Internet service provider's phone number, opens the Eudora E-mail application, opens the Netscape Navigator browser, makes Eudora the foremost application, and executes the "Get mail" command.

EXAMPLE 17

Stock Symbols—Content and Retrieval Services

The user is an investment advisor who routinely publishes analysis and recommendations for his clients and his newsletter. The investment advisor, as a result of years in the profession, relates stock symbols to equities as a natural language shortcut for communicating with his peers. When writing, however, his audience is general in nature and does not know how to interpret the symbols.

The investment advisor purchases a hypothetical Forbes Stock Symbol and Name conversion application from the ActiveWords web site, since configuring his system to replace all stock symbols with the actual company name would be time consuming. This application contains the symbols and name of every company and mutual fund traded on United States Exchanges, as well as summary information relevant to the advisor such as total shares of Common Stock outstanding. SIC classification, and recent sales/earnings information. This data can be updated monthly on an annual subscription basis.

The advisor is writing an E-mail message to his client base concerning oil industry investments is recommending. He wants to mention several oil companies. He types "RD" which is replaced with "Royal Dutch Petroleum Company (RD." He types "XON" which is replaced with "Exxon Corporation (XON)." He types "OXY" which is replaced with "Occidental Petroleum Corporation (OXY)."

EXAMPLE 18

Active Words Launch Center

The user is copied on an E-mail message addressed to "Rodriguez." He selects the word and clicks on the ActiveWords Information Center icon on the monitoring bar 315, which is docked at the top of his screen. The ActiveWords Information Center Window drops down from the upper right corner of his screen. It includes a text field that has "Rodriguez" in it . Below that, there is a list of several resources he can use: Customers, Employees, Suppliers, and Yahoo. He selects Suppliers by clicking or by typing the code word text that is shown just under Suppliers (let's assume that code word is "xc"). In either case, the present invention searches the wordbase 340 for a match for "xc," finds it and executes it's service script. The service script passes control to an agent that launches an SQL call to return a list of all "Rodriguez" that occur in the company's Supplier database. The agent handles the navigation through his company's LAN/WAN network to handle the query and response. Alternatively, he could have types "Rodriguez" in his application text stream.

EXAMPLE 19

User Input Boxes—All Types of Active Words Services

The user decides to search the company's Intranet web site for a specific product name. He types "find." This is a dual word and the user signals that he wants it to be treated as an action words. The ActiveWords system responds by opening a User Input Box, with the message "Please type what you are looking for." The user types "lock nuts" and presses <enter>. The script in the "find" item launches a browser via a URL pointing to the company's Intranet copy of the Yahoo search engine.

VI. Conclusion

The present invention provides the user with direct access to desired results, eliminating repetitive effort. The user can save more than half his keystrokes, for the rest of his life. He also avoids many runs, endlessly repeated, through the GUI's maze of menus and Windows. The user becomes more productive, accomplishing his work faster. The present invention works with words of the user's choice, all the time and in all contexts. Its use becomes reflexive. The present invention controls the computer in the user's natural language. It mitigates many inefficiencies of the GUI, while preserving it's many benefit's. The present invention keeps a history of the user's text input and helps him discover ways to improve his productivity by using his natural language to create a high personal SUI.

While various embodiments of the present invention have been described above, it should be understood that they have been prepared by way of example only, and not limitation. Thus, the breadth and scope of the present invention should not be limited by any of the above-described exemplary embodiments, but should be defined only in accordance with the following claims and their equivalents.

What is claimed is:

1. A system for permitting a user to implement functionality on a computer, the functionality being provided across a plurality of application programs or within an environment created by an operating system, the computer including a data entry device, comprising:

means for monitoring all data entered [or selected] by a user within [and] *any* one of the plurality of application programs or within an environment created by the operating system, said data including one or more alphabetic letters, symbols and/or words, wherein *a* certain combination[s] of data represent*s an* action word[s];

a wordbase having stored therein a plurality of item records, [each] *wherein an* item record [having an] *corresponds to both said* action word and one of a plurality of associated functions;

means for searching said wordbase for a match [with an] *between said* action word entered by *the* user *and said item record corresponding thereto*; and means for performing said function associated with said action word.

2. The system of claim 1, wherein said data is entered via a microphone, selection device, or keyboard.

3. The system of claim 2, further comprising means for recognizing voice signals input via said microphone to produce recognizable data, wherein said recognizable data is used by said means for searching.

4. The system of claim 1, wherein said data entered by said user may be selected with a selection device by said user.

5. The system of claim 1, wherein a word entered by said user is a dual word, wherein said user diambiguates said dual word to indicate to said means for monitoring that said dual word is an action word.

6. The system of claim 1, wherein said data includes code words, dual words and content words.

7. The system of claim 6, further comprising means for providing feedback to said user when said user enters a dual word.

8. The system of claim 1, further comprising means for providing statistics regarding said user's input activity, including the context said user was operating within at the time of said input activity.

9. The system of claim 1, wherein said data is captured to said means for monitoring prior to the operating system forwarding said data to one of the plurality of application programs.

10. The system of claim 1, further comprising a display device for displaying said data, wherein said data is erased if it represents an action word.

11. The system of claim 1, wherein said data is displayed within the data entry fields of one of the plurality of application programs.

12. The system of claim 1, further comprising means for forwarding said data to one of the plurality of application programs.

13. The system of claim 12, further comprising a state table that stores all information that has been forwarded to said one of the plurality of application programs.

14. The system of claim 1, wherein said action word is a dual word, said system further comprising means for providing a signal that a dual word has just been entered by said user.

15. The system of claim 1, wherein said function can be activated via a plurality of action words.

16. The system of claim 1, wherein said means for monitoring includes a virtual device driver.

17. The system of claim 1, wherein said means for monitoring monitors for a delineator, wherein an action word is always followed by a delineator.

18. The system of claim 17, wherein said delineator *is* a punctuation mark, a special character, entry of a space bar, or a click of a selection device.

19. The system of claim 17, wherein said delineator includes a context switch between application programs.

20. The system of claim 1, further comprising means for forwarding said data to the operating system.

21. The system of claim 1, wherein said wordbase includes a plurality of folders, wherein each folder has a priority associated therewith.

22. The system of claim 21, further comprising means for changing the priority of said plurality of folders.

23. The system of claim 1, further comprising means for displaying a charm box, said charm box having displayed therein information relating to said data entered by said user.

24. The system of claim 1, further comprising a mathematical application program for performing in-place arithmetic, said mathematical application program being triggered by an action word.

25. The system of claim 1, further comprising means for displaying a monitor, said monitor having a field for displaying said data and a field for displaying said function being performed.

26. The system of claim 1, wherein each item record within said wordbase includes a frequency count of dual word matches and code word matches.

27. The system of claim 1, wherein said function is performed by executing a script.

28. The system of claim 1, wherein said wordbase includes an archive of all data entered by said user.

29. The system of claim 28, wherein said archive includes a 7×7 organization of said data.

30. The system of claim 1, wherein said function includes launching an application program, a file or a folder.

31. The system of claim 1, wherein said function includes text substitution, wherein said text is substituted at the position of a displayed [curser] *cursor*.

32. The system of claim 31, further comprising means for toggling between at least two choices for said text substitution.

33. The system of claim 1, wherein at least a subset of said action words are user defined, wherein said user can add, delete and modify said action words within said wordbase.

34. The system of claim 1, wherein said means for monitoring can be toggled between on and off.

35. The system of claim 1, wherein the environment *is* providing a graphical user interface (GUI).

36. The system of claim 35, further comprising means for selecting a block of data that is displayed via said GUI or one of the plurality of application programs, wherein said data can be entered by selecting said block of data.

37. The system of claim 1, wherein said associated function may include calling an agent.

38. The system of claim 1, wherein said wordbase is located on a server connected to a network.

39. The system of claim 1, further comprising means for providing said user with statistical feedback regarding said data.

40. The system of claim 1, wherein a single action word can activate two or more functions, the system further comprising means for selecting between said two or more functions when said single action word is entered by said user.

41. The system of claim 1, wherein said action word is formed by at least two natural language words.

42. The system of claim 1, further comprising means for generating and displaying statistical data regarding the productive use of said action words by said user.

43. The system of claim 1, further comprising a state table that includes a list of said data most recently entered by said user.

44. The system of claim 1, wherein said action words include code words and dual words, the system further comprising means for allowing said user to turn said code words and said dual words on and off within said wordbase.

45. A method for permitting a user to implement functionality on a computer having a graphical user interface and data entry device, comprising:

1) providing a wordbase having a plurality of item records, each item record having stored therein an action word, organizing said item records to define at least one personal profile, wherein said action word comprises natural language or code word or text strings;

2) associating a plurality of agents with said wordbase, wherein each agent performs one of a plurality of functions;

3) associating said action word stored in said wordbase with a function performed by one of said plurality of agents;

4) receiving a data string input by the user within an application program or an operating system environment or data selected by a user within said application program or said operating system environment, wherein said data string selected by the user is displayed on the graphical user interface;

5) determining if said data string input by the user or said data selected by the user is an action word stored in said wordbase; and 6) performing via one of said plurality of agents said function associated with said action word stored in said wordbase.

46. The method of claim 45, wherein performing said function includes launching an application program and passing data to the newly launched application.

47. The method of claim 45, further comprising the step of populating said wordbase with user defined action words.

48. A method for allowing a user to control a computer having an operating system that provides a graphical user interface (GUI), comprising the steps of:

(1) providing a semantic user interface (SUI) that complements the GUI, said semantic user interface seamlessly integrated with the operating system;

(2) allowing a user to enter keystrokes;

(3) monitoring for said keystroke by said SUI; and (4) performing an action associated with said keystrokes, wherein said action can be performed within any application program running on the computer or within an environment created by the operating system.

49. A method for allowing a user to control a computer within a network, comprising the steps of:

(1) providing a semantic user interface (SUI);

(2) allowing a user to enter data, wherein said data can be entered via a microphone, selection device or keyboard;

(3) monitoring for said data by said SUI; and (4) performing an action associated with said [keystroke] *data*, wherein said action can be performed within any application program running on the computer or within an environment created by an operating system, wherein said action is user definable.

50. The method of claim 49, further comprising the step of populating a wordbase, wherein said wordbase includes a plurality of item records, each item record having a one or more keystrokes and an associated action.

51. The method of claim 50, wherein said action is selected from the group of: navigation, information, substitution and control.

52. The method of claim 49, wherein said network includes a server that executes an operating system that provides a graphical user interface (GUI), wherein said SUI complements said GUI.

53. The method of claim 48, wherein said action is selected from the group of: navigation, information, substitution and control.

54. The method of claim 48, further comprising the steps of allowing a user to [entervoice] *enter voice* data via *a* speech recognition unit, [monitored] *monitoring* for said voice data by said SUI, and performing an action associated with said voice data[, wherein said action can be performed within any application program running on the computer or within said environment created by the operating system].

55. The method of claim 48, wherein said keystrokes entered by said user can form a content word, a code word or a dual word, wherein the method further comprises disambiguating a dual word.

56. The method of claim 55, wherein said action is selected from the group of: navigation, information, substitution and control.

57. The method of claim 56, further comprising the step of allowing said user to select said keystrokes that result in said action being performed.

58. The method of claim 55, further comprising the step of providing a signal to said user when said user enters a dual word.

59. The method of claim 55, further comprising the step of erasing a code word or dual word after it is entered by said user.

60. The method of claim 48, wherein said step of monitoring occurs prior to the operating system forwarding said keystrokes to any application program.

61. The method of claim 48, wherein said keystrokes can form two or more words that result in said action being performed.

62. The method of claim 48, wherein the step of monitoring monitors for entry of an action word followed by a delineator.

63. The method of claim 48, further comprising displaying a charm box, said charm box having displayed therein information relating to said keystrokes entered by said user.

64. The method of claim 48, wherein said step of providing said SUI further comprises the step of displaying a monitor, said monitor having a field for displaying said keystrokes and a field for displaying said action being performed.

65. The method of claim 48, wherein said action includes launching an application program, a file or a folder.

66. The method of claim 48, further comprising the steps of:

displaying at least two actions that can be performed;

allowing said user to toggle between said at least two actions; and allowing said user to select one of said at least two actions.

67. The method of claim 48, wherein the step of monitoring can be toggled between on and off.

68. The method of claim 48, further comprising providing statistics regarding said user's input activity, including the context said user was operating within at the time said keystrokes were entered.

69. The system of claim 1, further comprising means for defining at least two personal profiles, wherein each personal profile controls the computer with a different set of action words.

70. The system of claim 1, wherein said wordbase can be shared by more than one user.

71. The system of claim 1, wherein the computer is connected to a server.

72. The system of claim 1, wherein said associated function is selected from the group of: navigation, information, substitution, and control.

73. The system of claim 1, wherein one of said plurality of associated functions includes launching an application program or Internet site.

74. The system of claim 45, wherein said function includes navigation, information, substitution and control.

75. A system for permitting a user to implement functionality on a computer, the functionality being provided across a plurality of application programs or within an environment created by an operating system, the computer including a data entry device, comprising:

means for monitoring all data entered [or selected] by a user within any one of the plurality of application programs or within an environment created by the operating system, said data including one or more alphabetic letters, symbols and/or words, wherein *a* certain [combinations] *combination* of data [represent] *represents an* action [words] *word*;

a wordbase having stored therein a plurality of item records, [each] *wherein an* item record [having an] *corresponds to both said* action word and one of a plurality of associated functions, wherein said [associate] *associated* functions are selected from the group of: information, navigation, control and substitution;

means for searching said wordbase for a match [with an] *between said* action word entered by [said] *the* user *and said item record corresponding thereto*; and means for performing said function associated with said action word.

76. The system of claim 75, wherein said data is entered via a microphone, selection device, or keyboard.

77. The system of claim 75, further comprising means for recognizing voice signals input via said microphone to produce recognizable data, wherein said recognizable data is used by said means for searching.

78. The system of claim 75, wherein said data entered by said user may be selected with a selection device by said user.

79. The system of claim 75, wherein a word entered by said user is a dual word, wherein said user disambiguates said dual word to indicate to said means for monitoring that said dual word is an action word.

80. The system of claim 75, wherein said data includes code words, dual words and content words.

81. The system of claim 80, further comprising means for providing feedback to said user when said user enters a dual word.

82. The system of claim 75, wherein said data is captured by said means for monitoring prior to the operating system forwarding said data to one of the plurality of application programs.

83. The system of claim 75, further comprising a display device for displaying said data, wherein said data is erased if it represents an action word.

84. The system of claim 75, wherein said function can be activated via a plurality of action words.

85. The system of claim 75, wherein said means for mounting monitors for a delineator, wherein [an] *said* action word is always followed by [an] *said* delineator.

86. The system of claim 85, wherein said delineator *is* a punctuation mark, a special character, entry of a space bar, or a click of a selection device.

87. The system of claim 85, wherein said delineator includes a context switch between application programs.

88. The system of claim 75, wherein said function includes launching an application program, a file or a folder.

89. The system of claim 75, wherein said function includes text substitution, wherein said text is substituted at the position of a displayed [curser] *cursor*.

90. The system of claim 89, further comprising means for toggling between at least two choices for said text substitution.

91. The system of claim 75, wherein at least a subset of said action words are user defined, wherein said user can add, delete and modify said action words within said wordbase.

92. The system of claim 75, wherein said means for monitoring can be toggled between on and off.

93. The system of claim 75, wherein said wordbase is located on a server connected to a network.

94. The system of claim 75, wherein a single action word can activate two or more functions, the system further comprising means for selecting between said two or more functions when said single action word is entered by said user.

95. The system of claim 75, wherein said action word is formed by at least two natural language words.

96. The system of claim 75, further comprising means for defining at least two personal profiles, wherein each personal profile controls the computer with a different set of action words.

97. The system of claim 75, wherein said wordbase can be shared by more than one user.

98. The system of claim 75, wherein the computer is connected to a server.

99. The system of claim 75, wherein one of said plurality of associated functions includes launching an application program or Internet site.

100. The system of claim 75, wherein said action words include code words and dual words, the system further comprising means for allowing said user to turn said code words and said dual words on and off within said wordbase.

* * * * *